US012442172B2

(12) United States Patent
Smith et al.

(10) Patent No.: US 12,442,172 B2
(45) Date of Patent: *Oct. 14, 2025

(54) BIDET WASHING APPARATUS WITH DISINFECTANT WASH FEATURE

(71) Applicant: 2 Go Products, LLC, San Diego, CA (US)

(72) Inventors: Jeremy Smith, San Diego, CA (US); Yash Jawanjal, San Diego, CA (US); Anjum Gupta, San Diego, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/239,334

(22) Filed: Aug. 29, 2023

(65) Prior Publication Data

US 2024/0060282 A1 Feb. 22, 2024

Related U.S. Application Data

(63) Continuation-in-part of application No. 18/074,486, filed on Dec. 4, 2022, now Pat. No. 12,378,756, which is a continuation-in-part of application No. 17/863,198, filed on Jul. 12, 2022, now Pat. No. 11,879,243, which is a continuation-in-part of application No. 17/738,469, filed on May 6, 2022, now Pat. No. 11,814,834, which is a continuation-in-part of application No. 17/555,879, filed on Dec. 20, 2021, now Pat. No. 11,692,337, which is a continuation-in-part of application No. 17/473,211, filed on Sep. 13, 2021, now Pat. No. 11,713,566, which is a continuation of application No. 16/567,107, filed on Sep. 11, 2019, now Pat. No. 11,155,987, which is a continuation of application No. 16/374,970, filed on Apr. 4, 2019, now Pat. No. 10,844,586.

(51) Int. Cl.

| | |
|---|---|
| ***E03D 9/08*** | (2006.01) |
| ***B05B 9/03*** | (2006.01) |
| ***B05B 15/55*** | (2018.01) |
| ***E03D 9/00*** | (2006.01) |

(52) U.S. Cl.

CPC .................. *E03D 9/08* (2013.01); *B05B 9/03* (2013.01); *B05B 15/55* (2018.02); *E03D 9/005* (2013.01)

(58) Field of Classification Search

CPC .. E03D 9/08; E03C 2001/1213; E03C 1/0408

USPC ........... 4/443, 444, 445, 446, 447, 448, 420, 4/420.3

See application file for complete search history.

(56) References Cited

U.S. PATENT DOCUMENTS

| | | | | |
|---|---|---|---|---|
| 3,164,846 A * | 1/1965 | Foster | A61M 3/0208 4/420.1 |
| 10,689,836 B1 * | 6/2020 | Simon | A61H 1/00 |
| 11,234,562 B1 * | 2/2022 | Simon | A47K 3/281 |
| 11,814,834 B2 * | 11/2023 | Gupta | B05B 15/16 |

(Continued)

*Primary Examiner* — Lori L Baker

(57) ABSTRACT

A reservoir dispenser for a bidet washing apparatus includes a housing unit having a chamber, wherein the chamber is capable of holding a liquid wash solution; a lid with one or more openings therethrough, wherein the lid is attachable to the chamber; an activator having a proximal handle or a bar, a stem, and a distal stem bottom end piece, wherein activator is located through one of the one or more openings in the lid; and a connecting tube having a water inlet, a choke region, a suction tube, and a water outlet, wherein the connecting tube is permanently or reversibly attachable to the chamber.

22 Claims, 46 Drawing Sheets

(56) References Cited

U.S. PATENT DOCUMENTS

| | | | | |
|---|---|---|---|---|
| 11,879,243 | B2 * | 1/2024 | Gupta | B05B 15/55 |
| 2018/0023276 | A1 * | 1/2018 | Puskas | A47K 10/48 4/444 |
| 2019/0368182 | A1 * | 12/2019 | Ethier | E03D 9/085 |
| 2021/0293013 | A1 * | 9/2021 | Schrant | E03D 9/08 |

* cited by examiner

BIDET WASHING APPARATUS WITH DISINFECTANT WASH FEATURE

CROSS-REFERENCE TO RELATED APPLICATIONS

This application is a continuation-in-part of and claims the benefit of priority under 37 USC § 120 to U.S. patent application Ser. No. 18/074,486, titled: "BIDET WASHING APPARATUS WITH DISINFECTANT WASH FEATURE," filed on Dec. 4, 2022, which is a continuation-in-part of U.S. patent application Ser. No. 17/863,198, titled: "BIDET WASHING APPARATUS WITH DISINFECTANT WASH FEATURE," filed on Jul. 12, 2022, which is a continuation-in-part of U.S. patent application Ser. No. 17/738,469, titled: "BIDET WASHING APPARATUS WITH DISINFECTANT WASH FEATURE," filed on May 6, 2022, which is a continuation-in-part of U.S. patent application Ser. No. 17/555,879, titled: "BIDET WASHING APPARATUS WITH DISINFECTANT WASH FEATURE," filed on Dec. 20, 2021, now U.S. Pat. No. 11,692,337, which is a continuation-in-part of U.S. patent application Ser. No. 17/473,211, titled: BIDET WASHING APPARATUS WITH DISINFECTANT WASH FEATURE," filed on Sep. 13, 2021, now U.S. Pat. No. 11,713,566, which is a continuation of and claims the benefit of priority to U.S. patent application Ser. No. 16/567,107, titled: BIDET WASHING APPARATUS WITH DISINFECTANT WASH FEATURE," filed on Sep. 11, 2019, now U.S. Pat. No. 11,155,987, which is a continuation-in-part of and claims the benefit of priority to U.S. patent application Ser. No. 16/374,970, titled: "BIDET WASHING APPARATUS WITH DISINFECTANT WASH FEATURE," filed on Apr. 4, 2019, now U.S. Pat. No. 10,844,586, the disclosure of each of which is hereby incorporated by reference in their entireties for all purposes.

FIELD OF THE INVENTION

The disclosure generally relates to a bidet washing apparatus, and more particularly to a bidet washing apparatus having a disinfectant wash feature that can store and dispense a cleaning disinfectant with a bidet washing stream.

BACKGROUND OF THE INVENTION

A bidet apparatus for washing and cleaning body parts were initially developed in the form of a bidet that provided a single spray of water and was permanently built into the toilet bowl. However, such bidets were expensive, and a new generation of bidets was developed that was attachable to the toilet and included a plurality of nozzles for multiple water sprays. Such bidets can be attached to the seat of an existing toilet bowl for washing the private parts of a person.

Various bidet designs have addressed some of the desired effects, such as washing, washing with temperature-regulated water, and drying, However, existing bidets fail to address all concerns related to the designs and functions in the general field of bidets. For example, pollution of the outer surface of the nozzles, the bidet, and the toilet during utilization is a common problem and causes aesthetic and hygienic issues. This is particularly important in bidets used, for example, by infirm or sick people who have to be especially cautious about maintaining hygiene and preventing infections.

Currently, there aren't any bidets that include a disinfectant wash feature. Many bidets have a feature to clean the nozzle of the bidet, however, cleaning the nozzle with water causes problems as it could leave behind hard water deposits and not provide adequate cleaning. Hard water deposits on the nozzle could affect the flow of the bidet as it blocks the nozzle holes and not adequately cleaning the bidet raises sanitary concerns. Consumers may also feel that normal water may not provide adequate washing of their body parts. Therefore, there remains a need to provide bidets with a disinfectant wash feature.

SUMMARY OF THE INVENTION

The disclosed embodiments are directed to solving one or more of the problems presented in the prior art, described above, as well as providing additional features that will become readily apparent by reference to the following detailed description when taken in conjunction with the accompanying drawings.

In an embodiment, the disclosure provides a reservoir dispenser for a bidet washing apparatus, having a housing unit having a chamber, wherein the chamber is capable of holding a liquid wash solution; a lid with one or more openings therethrough, wherein the lid is attachable to the chamber; an activator having a proximal handle, or a bar, or a pointer or a knob, a stem, and a distal stem bottom end piece, wherein activator is located through one of the one or more openings in the lid; and a connecting tube having a water inlet, a choke region, a suction tube, and a water outlet, wherein the connecting tube is permanently or reversibly attachable to the chamber.

In one aspect, the disclosure provides a reservoir dispenser, wherein the handle, bar, pointer or knob can be manually turned to lower or raise the stem bottom end piece to cover or uncover the suction tube, respectively.

In another aspect, the disclosure provides a reservoir dispenser, wherein the chamber is in fluid communication with the suction tube when the handle, bar, pointer or knob is turned or raised; and wherein the chamber is not in fluid communication with the suction tube when the handle, bar, pointer or knob is turned or lowered.

In another aspect, the disclosure provides a reservoir dispenser, wherein the one of the one or more openings in the lid where the activator is located through includes internal threads, and the stem of the activator includes external threads.

In another aspect, the disclosure provides a reservoir dispenser, wherein another of the one or more openings in the lid allows for refilling the reservoir dispenser with the liquid wash solution without removing the lid from the chamber.

In another aspect, the disclosure provides a reservoir dispenser, wherein the connecting tube includes an attachable V-shaped pipe including the water inlet, the choke region, the suction tube, and the water outlet.

In another aspect, the disclosure provides a reservoir dispenser, wherein the suction tube is vertically inclined relative to the choke region.

In another aspect, the disclosure provides a reservoir dispenser, wherein the stem bottom end piece includes a rubber gasket.

In another aspect, the disclosure provides a reservoir dispenser, wherein when the external handle, bar, pointer or knob of the activator is manually turned to raise the stem and stem bottom end piece to uncover the suction tube, water flowing through the choke region causes a reduced pressure in the choke region causing the liquid wash solution present in the chamber to be pulled into the suction tube, the choke region, and the water outlet of the connecting pipe.

In another aspect, the disclosure provides a reservoir dispenser, wherein when the external handle, bar, pointer or knob of the activator is manually turned to lower the stem and stem bottom end piece to cover the suction tube, the liquid wash solution present in the chamber cannot be pulled into the suction tube, the choke region, and the water outlet of the connecting pipe.

In another embodiment, the disclosure provides a reservoir dispenser for a bidet washing apparatus, having a housing unit having a chamber, wherein the chamber is capable of holding a liquid wash solution; a lid, wherein the lid is attachable to the chamber; a stem having a stem head unit and a stem bottom end piece within the chamber, wherein the stem head unit is in communication with the lid; a hollow ring attachable to an inner wall of the chamber, wherein the stem head unit is located within the hollowed ring; and a connecting tube having a water inlet, a choke region, a suction tube, and a water outlet, wherein the connecting tube is permanently or reversibly attachable to the chamber.

In one aspect, the disclosure provides a reservoir dispenser, wherein the hollow ring is attachable to an inner wall of the chamber through a plurality of ring support arms, or through a support mesh, or through a drain cover.

In another aspect, the disclosure provides a reservoir dispenser, wherein a ceiling of the lid includes a plurality of circularly arranged posts, and the stem head unit includes a plurality of circularly arranged slots, wherein the plurality of circularly arranged posts on the ceiling of the lid can be secured to the plurality of circularly arranged slots on the stem head unit.

In another aspect, the disclosure provides a reservoir dispenser, further comprising the lid having an internal track on an inner wall of the lid, and wherein a tab on an outer side wall of the chamber can run along the track when the lid is turned.

In another aspect, the disclosure provides a reservoir dispenser, wherein the hollow ring includes internal threads, and the stem head unit includes external threads.

In another aspect, the disclosure provides a reservoir dispenser, wherein turning the lid causes the stem and stem bottom end piece to move up or down in the chamber.

In another aspect, the disclosure provides a reservoir dispenser, wherein the lid can be manually turned to lower or raise the stem and stem bottom end piece to cover or uncover the suction tube, respectively.

In another aspect, the disclosure provides a reservoir dispenser, wherein the chamber is in fluid communication with the suction tube when the stem and stem bottom end piece are raised by turning the lid in a first direction, and wherein the chamber is not in fluid communication with the suction tube when the stem and stem bottom end piece are lowered by turning the lid in a second direction.

In another aspect, the disclosure provides a reservoir dispenser, wherein the connecting tube includes an attachable V-shaped pipe including the water inlet, the choke region, the suction tube, and the water outlet.

In another aspect, the disclosure provides a reservoir dispenser, wherein the stem bottom end piece includes a rubber gasket.

In another aspect, the disclosure provides a reservoir dispenser, wherein when the lid can be manually turned to raise the stem and stem bottom end piece to uncover the suction tube, and water flowing through the choke region causes a reduced pressure in the choke region causing the liquid wash solution present in the chamber to be pulled into the suction tube, the choke region, and the water outlet of the connecting pipe.

In another aspect, the disclosure provides a reservoir dispenser, wherein when the lid can be manually turned to lower the stem and stem bottom end piece to cover the suction tube, and the liquid wash solution present in the chamber cannot be pulled into the suction tube, the choke region, and the water outlet of the connecting pipe.

Further features and advantages of the disclosure, as well as the structure and operation of various embodiments of the disclosure, are described in detail below concerning the accompanying drawings.

BRIEF DESCRIPTION OF THE DRAWINGS

The disclosure, by one or more various embodiments, is described in detail concerning the following figures, The drawings are provided for purposes of illustration only and merely depict exemplary embodiments of the disclosure. These drawings are provided to facilitate the reader's understanding of the disclosure and should not be considered limiting the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
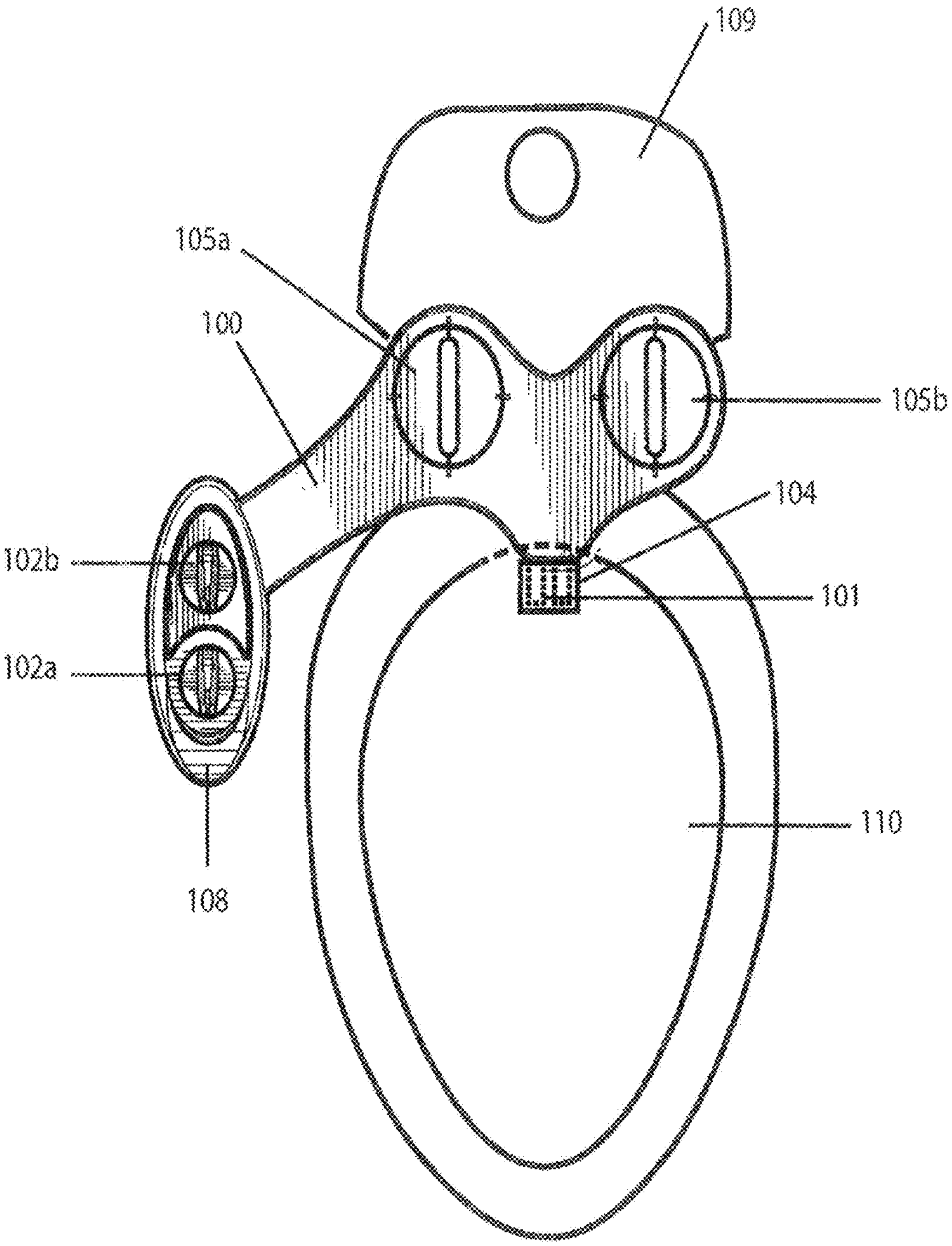
FIG. 1 illustrates an embodiment of a perspective view of an exemplary bidet washing apparatus installed on an existing toilet seat, with a seat cover-up.

The following description is presented to enable a person of ordinary skill in the art to make and use embodiments described herein. Descriptions of specific devices, techniques. and applications are provided only as examples. Various modifications to the examples described herein will be readily apparent to those of ordinary skill in the art, and the general principles defined herein may be applied to other examples and applications without departing from the spirit and scope of the disclosure. Thus, the disclosure is not intended to be limited to the examples described herein and shown but is to be accorded the scope consistent with the claims.

The word "exemplary" is used herein to mean "serving as an example illustration," Any aspect or design described herein as "exemplary" is not necessarily to be construed as preferred or advantageous over other aspects or designs.

Reference will now be made in detail to aspects of the subject technology, examples of which are illustrated in the accompanying drawings, wherein reference numerals refer to like elements throughout.

It should be understood that the specific order or hierarchy of steps in the process disclosed herein is an example of exemplary approaches. Based upon design preferences, it is understood that the specific order or hierarchy of steps in the processes can be rearranged while remaining within the scope of the disclosure. Any accompanying method claims present elements of the various steps in, a sample order, and are not meant to be limited to the specific order or hierarchy presented.

The embodiments disclosed herein describe a new, clean and hygienic washing bidet. The various embodiments include one or a plurality of water inlets, a control means housing one or a plurality of control valves to control the flow of water from the water inlets to one or a plurality of water tubes, one or a plurality of washing nozzles, a protective shield gate, and securing unit configured to securing the sanitary washing device to the toilet seat.

The disclosed embodiments directed to clean and hygienic bidet washing apparatus 100 attachable to an existing toilet, for cleaning the body parts of the user sitting on or near the toilet.

As described herein, a "bidet" is a toilet attachment for cleaning the body parts of the user.

As described herein, the term "water inlet" means any structure that may provide water to the bidet washing apparatus.

As described herein, a "control unit" (aka "control panel") is the housing which has "control switch(s)" thereon controlling the various functionalities of the bidet, including but, not limited to, the flow of water, adjusting the angle of the nozzles, and opening and closing the protective shield gate.

As described herein, "control valves" are, controller parts located inside the control panel housing which control the flow of water or other fluids from the water inlet(s) to one or more "water tubes" by opening, closing, or partially obstructing various passageways.

As described herein, "water tubes" are channels that connect the control valves to a "nozzle assembly," wherein, the "nozzle assembly" includes a single nozzle or a collection of nozzles including at least one "washing nozzle."

As described herein, a "nozzle" is a device designed to eject water or other fluids into the surrounding medium as a coherently controlled spray.

As described herein, the "washing nozzle" is the nozzle that can be used to wash the body parts of a user.

As described herein, the "nozzle assembly" may also have other types of nozzles such as a "self-cleaning nozzle," which is used to clean the nozzle assembly itself, a "toilet cleaning nozzle," which is used to clean the bidet and/or the toilet, and a "shield cleaning nozzle," which is used for cleaning the "protective shield gate."

As described herein, the "protective shield gate" is a structure placed at least partially in front of the nozzle assembly (e.g., between the user and the nozzle assembly) to protect the nozzle assembly from pollutants.

As described herein, the "protective shield gate" has a "hinged" edge. The term "hinged" here means a joint that allows the turning or pivoting of the gate, by any conventional turning or pivoting mechanism.

As described herein, the term "fluidically coupled" means a connection or a passageway that allows fluid to flow therethrough.

As described herein, the term "reservoir" means a fluid holding tank.

Accordingly, in one embodiment the disclosure provides a bidet washing apparatus attachable to a toilet bowl for cleaning one or more body parts of a user. The apparatus can include one or more water inlets configured to supply water, and a control unit, housing one or more valves fluidically connected to the one or more water inlets, including one or more control switches configured to operate the one or more valves. As such, one or more valves can control water flow from one or more water inlets. The apparatus can further include a nozzle assembly including at least one washing nozzle, fluidically connected to at least one of the one or more valves with one or more water tubes. At least one washing nozzle can be positioned for directing water to one or more body parts of the user. The apparatus can also include a protective shield gate covering at least a portion of at least one washing nozzle, where the protective shield gate is rotatably coupled to the bidet washing apparatus.

According to various embodiments, the protective shield gate can be rotatably coupled to the apparatus along a side or top edge via a hinge, for example, to allow for the manual or electrical opening and closing of the protective shield gate. In this matter, the nozzle(s) are easily accessible for cleaning, removal, replacement, or another adjustment while the protective shield gate is open. In an alternative embodiment, the protective shield gate can be completely removed to similarly provide access to the nozzle(s).

According to another embodiment, the water inlet(s) can be fluidically connected to one or more valves via a single-body connector without any intervening parts or joints, which results in a more robust, long-lasting, bidet washing apparatus, since leaks or other damage to the fluidic couplings are less likely to occur.

Figure 2:
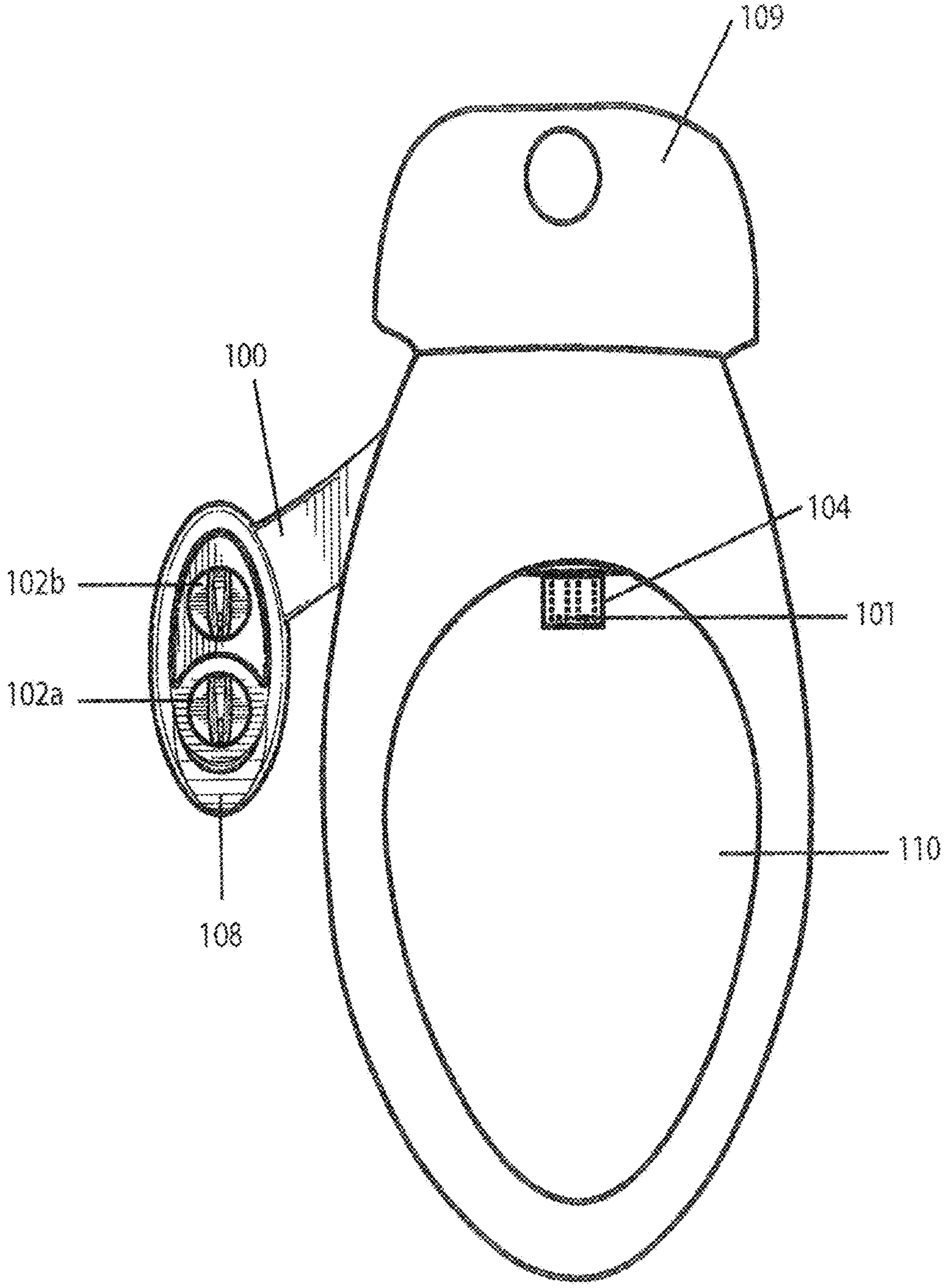
FIG. 2 illustrates an embodiment of a perspective view of a bidet washing apparatus installed on an existing toilet seat, with a seat cover down.

Referring to FIG. 1 and FIG. 2, the bidet washing apparatus 100 of the disclosure can be mounted on a toilet bowl 110 using securing mechanisms 105*a* and 105*b*. Any conventional securing unit can be implemented, e.g., one or more screws. A toilet seat 112 can pivot around and can be connected to a rear portion of the toilet bowl 110. On the rear portion of the toilet bowl, 110 can be mounted a refillable toilet tank 109, in which an amount of water can be stored. In certain embodiments, toilet tank 109 can be used as the water source for the bidet washing apparatus 100 by a fluidic connection. On the bidet washing apparatus, 100 can be mounted a nozzle assembly 101, which includes at least one washing nozzle (not shown) for washing the body parts of the user sitting on or near the toilet bowl 110. The body of the bidet washing apparatus can be made of any suitable material, including but not limited to, plastics, polymers, reinforced polymeric materials, wood, metal and the like, and any combination thereof.

Figure 3:
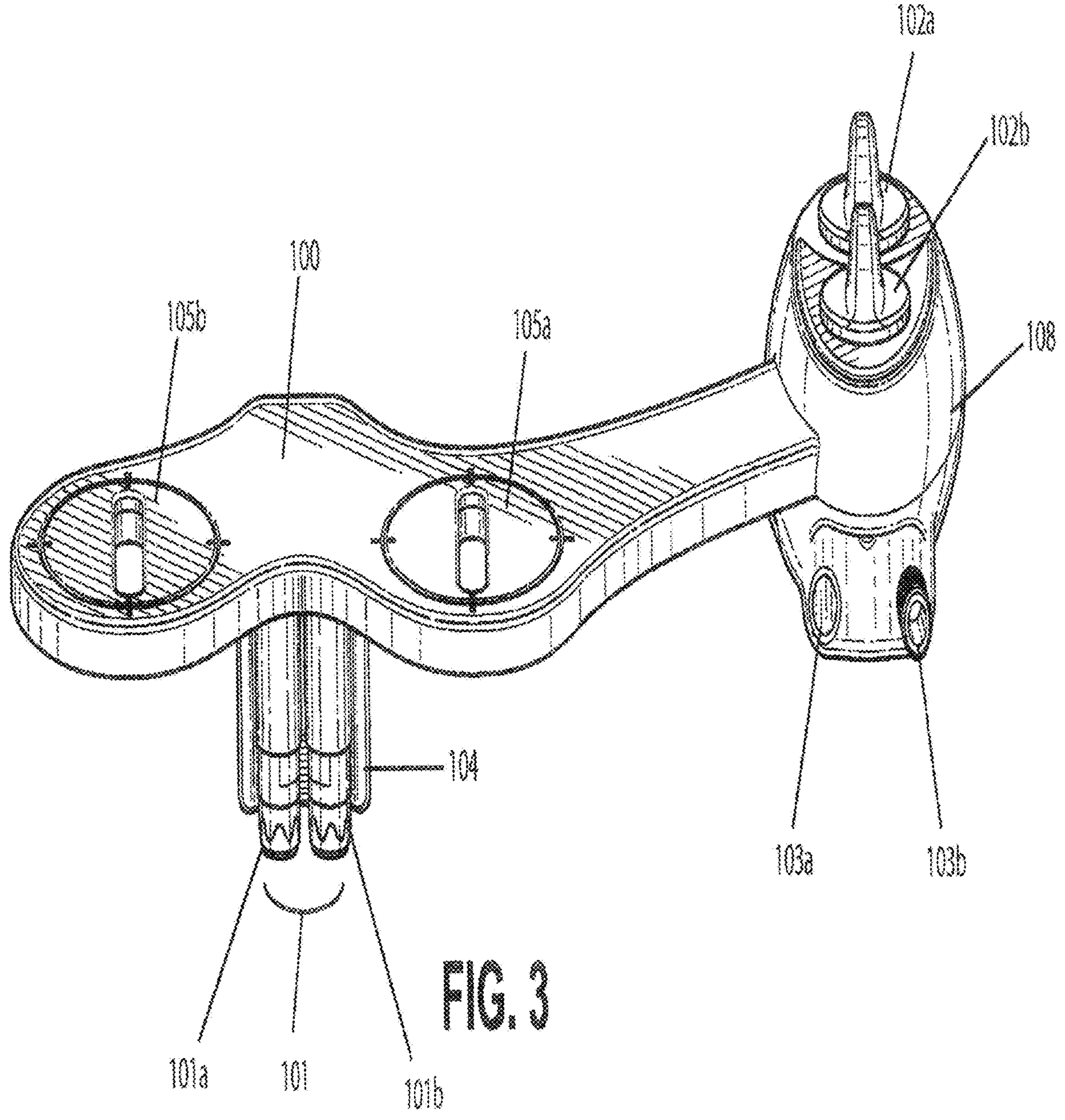
FIG. 3 illustrates an embodiment of a perspective view of an exemplary bidet washing apparatus.

FIG. 3 shows one exemplary embodiment of a bidet washing apparatus 100 with two washing nozzles 101*a* and 101*b*, respectively. However, in an installation, a lesser or greater number of nozzles can be used. Each washing nozzle can spray a stream of water upwardly and inwardly, according to various embodiments.

As shown in FIG. 2 and FIG. 3, a control unit 108 can be provided the easy access for the user, and houses control switches 102*a* and 102*b* for providing operational instructions to the bidet washing apparatus 100. The depicted example shows two switches 102*a* and 102*b*; however, one of ordinary skill in the art would realize that any number of switches can be provided for performing various operations without departing from the scope of the disclosure. Some examples of operational instructions include, but are not limited to, controlling the flow of water from the water inlet, changing the angle of the washing nozzles, and opening and closing the protective shield gate (described in further detail below). The type of control switches can be selected from a group including knobs, dials, levers, depressible buttons, or any conventional control mechanism, An installation may have all similar control switches where both control switches 102*a* and 102*b* are knobs.

Figure 9:
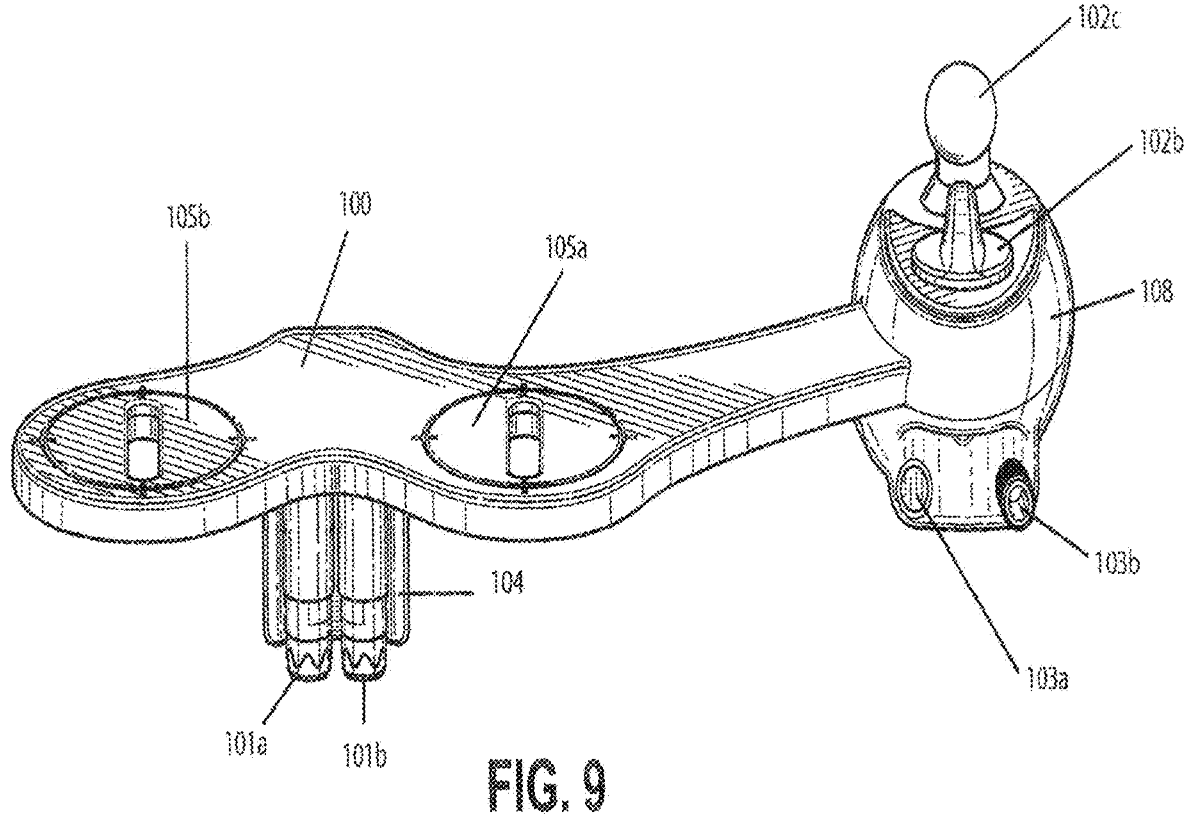
FIG. 9 illustrates an embodiment of a perspective view of an exemplary bidet washing apparatus.

On the other hand, FIG. 9 shows an embodiment of the disclosure where one of the control switches 102*b* is a knob and the other control switch 102*c* is a lever.

Furthermore, as shown in FIG. 1 and FIG. 2, the nozzle assembly 101 can have a protective shield gate 104 substantially or partially in front of it. The position of the protective shield gate 104 is such that it can act as a shield between the user's body and/or water in the toilet bowl 110 and the nozzle assembly 101 thus protecting the nozzle assembly 101 from pollutants during use.

Certain aspects of the bidet washing apparatus will be detailed hereinafter concerning FIGS. 3-9.

FIG. 3 shows a front perspective view of one embodiment described herein. Referring to FIG. 3, the bidet washing apparatus 100 includes the water inlets 103*a* and 103*b* to feed water into the bidet. The water inlet can be controlled by the user using the control switches 102*a* and 102*b* situated on the control unit 108. The water from the water inlets 103*a* and 103*b* can be ultimately provided to the nozzle assembly 101 via tubes (as described in greater detail concerning FIG. 7, for example). The nozzle assembly shown in this aspect of the disclosure has two washing nozzles 101*a* and 101*b*. The protective shield gate 104 protects the nozzle assembly 101 from excrement and pollutants as described above. In this example, the protective shield gate 104 is positioned in front of the nozzle assembly 101 of the bidet such that it is between the user sitting on the toilet seat, for example, and the nozzle assembly. Hence, when the user is using, the toilet, the nozzles are shielded behind the protective shield gate 104 and do not become polluted.

Figure 5:
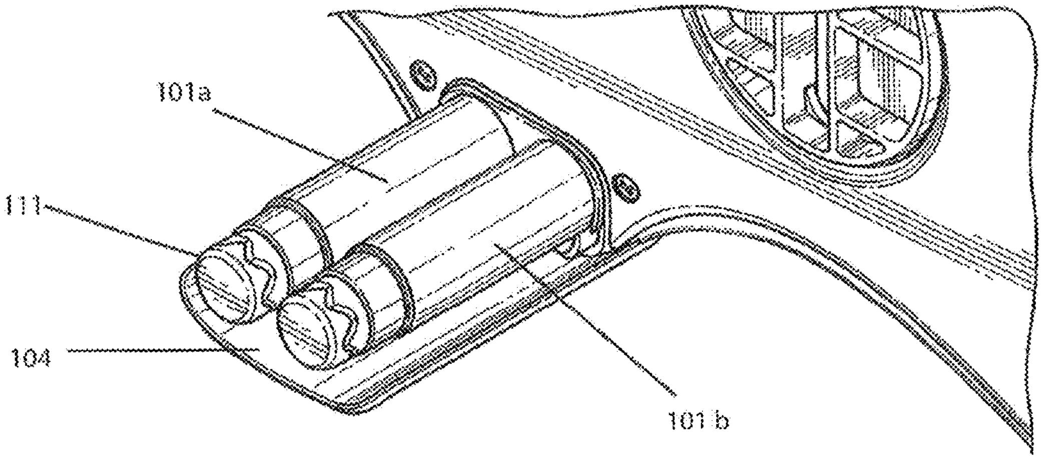
FIG. 5 illustrates an embodiment of a fragmentary view of an exemplary bidet washing apparatus illustrating a gate shield protecting the nozzle assembly in a closed position.
Figure 6:
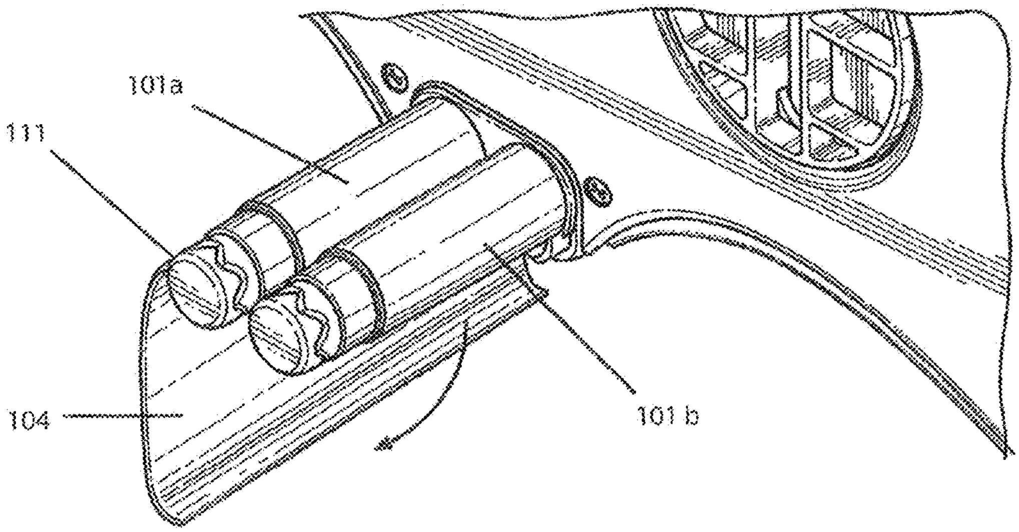
FIG. 6 illustrates an embodiment of a fragmentary view of an exemplary bidet washing apparatus illustrating a shield gate protecting the nozzle assembly in an open position.

Referring to FIGS. 5-6, the protective shield gate 104 can be movable along a hinged edge 111 to provide for further hygiene. The protective shield gate 104 rotates and thus can be manual, for example, opened (FIG. 6) and closed (FIG. 5), after using the toilet to clean any minute leftover pollutants on the outer covering of the nozzle assembly to ensure complete cleanliness. In the embodiment, the user can open and close the gate manually and, thus, the gate can stay in the opened or closed position that the user places the gate. In certain embodiments, the gate can be opened and dosed by an electrical signal using a control switch located on the control unit 108, which can allow the gate to remain open until the user closes the gate via the control switch, so the user can clean the nozzle. In other embodiments, the hinged edge 111 is on the top of the protective shield gate 104, and not, on the side edge as shown in the illustrative FIGS. 5-6. hi. yet other embodiments, the user may be able to completely remove the protective shield gate 104 for cleaning the nozzle(s) and reattach it after cleaning. Of course, one of ordinary skill in the art would understand that the hinged edge could comprise any rotatable joint mechanism that allows for, the rotation of the protective shield gate 104 to provide efficient access to the nozzle(s). If the protective shield gate 104 is completely removable, a grooved and slideable mechanism can be employed so that the protective shield gate 104 can slide in and out to be attached and removed. Of course, other mechanisms can be utilized for removably attaching the protective shield gate 104, e.g., a magnet or a snap structure.

In certain embodiments, the protective shield gate 104 has a flap portion perpendicular to the protective shield gate 104 such that it covers the bottom of the nozzle assembly 101. Additionally, the flap can have a spring mechanism such that it is pushed out and aligns with the protective shield gate 104 by the force of the water stream when water flows out of the nozzle assembly 101. When the water flow stops, the flap can spring hack into its original position perpendicular to the shield gate 101.

The protective shield gate 104 of the disclosure can be made from a material selected from plastic, metal, a material having anti-microbial properties, and material with increased pollutant repellant properties.

In certain embodiments, the angle of the washing noz7ies can be adjusted using a control switch located on the control unit 108. Thus, when a user wants to clean certain body parts, water can be sprayed on the desired body part by adjusting the angle of the washing nozzle(s). As shown in FIG. 3, the height of the protective shield gate is such that it allows for an uninterrupted spray of water from the nozzle assembly 101, since the nozzle assembly 101 can extend beyond the bottom edge of the protective shield gate 104.

Figure 4:
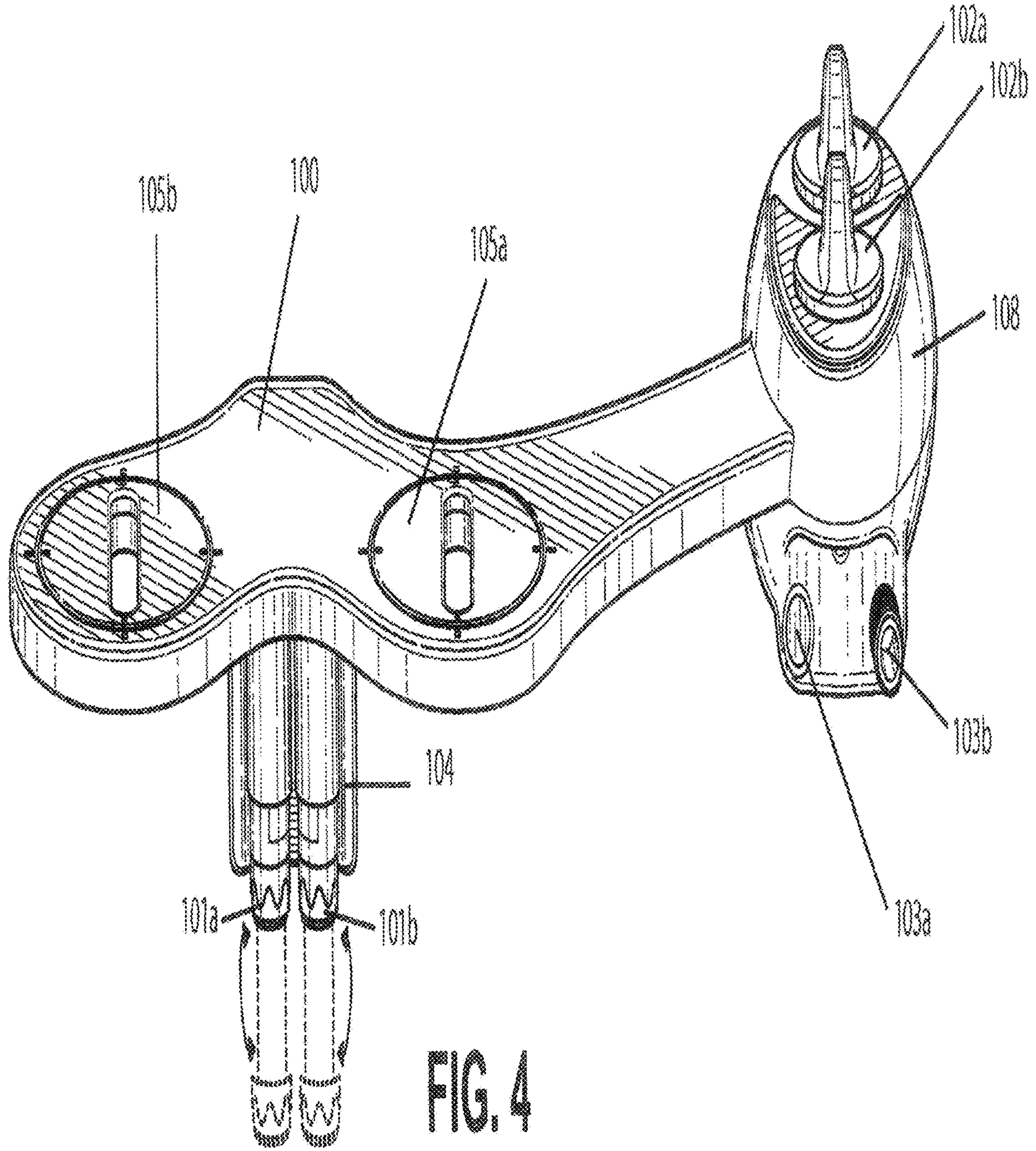
FIG. 4 illustrates an embodiment of a perspective view of an exemplary bidet washing apparatus, with dotted lines showing nozzles extended outwards.

FIG. 4 shows another embodiment wherein the height of the protective shield gate is equal to or greater than that of the washing nozzles 101*a* and 101*b*. Here, the washing nozzles 101*a* and 101*b* are housed within an outer covering including a spring mechanism for pushing the washing nozzles out when water flows through the washing nozzles such that the water flow is not interrupted by the protective shield gate 104. Each washing nozzle includes an outer covering and an inner nozzle operated slidably hack and firth with hydraulic pressure of the supplied washing water by an instruction from the control unit 108. During the use of the washing nozzles, the nozzles are extended from their outer covering below the length of the shield gate by the hydraulic force of the washing water, and water is sprayed on the user for cleaning purposes. After use, when the water flow is stopped, the nozzles are retracted in their outer covering which is hidden behind the shield gate. In certain other embodiments, the user may control the movement of the washing nozzle by using the control unit 108, instead of the hydraulic pressure. When an instruction of a washing operation is given by the control unit 108, a washing nozzle driving unit is activated to advance the nozzle. The washing nozzle angle can also be adjusted by an instruction given by the control unit 108 to position the nozzle for cleaning. Thus, the washing nozzle can reach the user's desired washing position by the combined advancement of the nozzle and/or the angular positioning.

According to the embodiment, nozzle assembly 101 includes at least one washing nozzle in yet another embodiment, the bidet washing apparatus 100 further includes a self-cleaning cleaning nozzle for cleaning the nozzle assembly itself. The self-cleaning nozzle can be positioned to spray water onto the nozzle assembly 101 and/or washing nozzle(s) before and/or after the usage for additional hygiene. The self-cleaning nozzle can be adapted to be controlled by the control unit 108, and thus provides an additional hygiene level.

Another embodiment includes a toilet cleaning nozzle for cleaning the toilet and the bidet before and after use of the toilet. The toilet cleaning nozzle can be positioned to spray water on the toilet bowl 110 and/or the bidet washing apparatus 100 and can be controlled by the control unit to provide additional hygiene. Yet, another embodiment includes a shield cleaning nozzle for cleaning the protective shield gate 104. The shield cleaning nozzle can be similarly controlled by the control unit 108. Additionally, the shield cleaning nozzle can be positioned to clean the protective shield gate 104 in an open and/or closed position.

Any or all of the washing nozzles can be connected to the nozzle assembly 101 via a ball joint, for example. which could allow the user to manually swivel a washing nozzle around 360 degrees, to direct the spray of water in a desired and precise direction. Of course, other types of joints and connectors could be implemented to allow for the manual swivel or direction correction, as desired by the user to spray water to the desired body part, for example.

Moreover, according to an exemplary embodiment, e or more of the washing nozzle(s) 101*a* and 101*b* can be connected to the nozzle assembly 101 by a mechanism allowing for the easy removal of the nozzle(s) 101*a* and 101*b*. For example, the washing nozzle(s) 101*a* and 101*b* can slide into place via a grooved portion of the nozzle assembly 101 or could otherwise snap into place. Any conventional mechanism of removably attaching the nozzle (s) 101*a* and 101*b* can be implemented, so that the user can swap the nozzle(s) 101*a* and 101*b* with other nozzles or increase or reduce the number of washing nozzle(s) 101*a* and 101*b* connected to the nozzle assembly 101.

Figure 7:
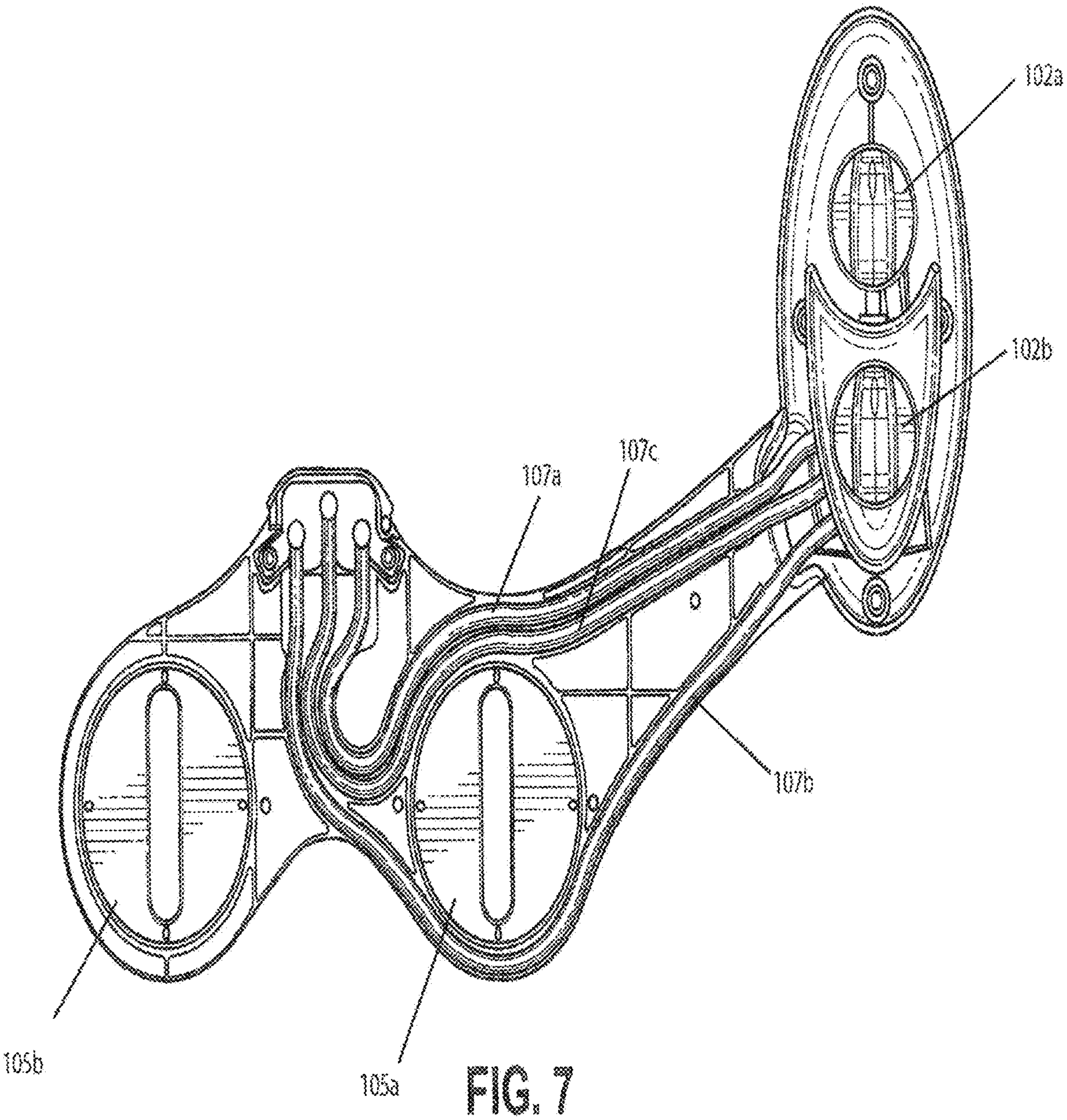
FIG. 7 illustrates an embodiment of a top plan view of an exemplary embodiment.
Figure 8:
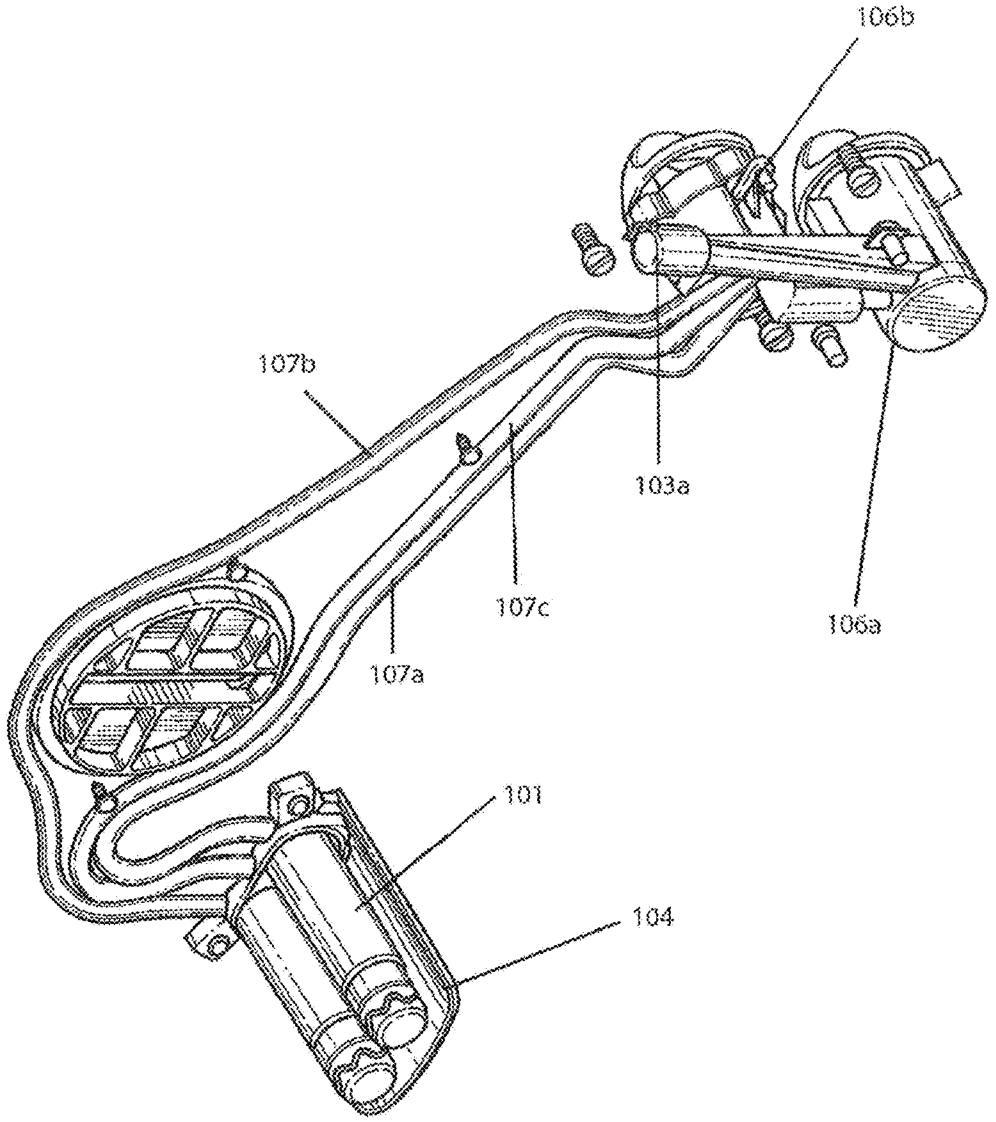
FIG. 8 illustrates an embodiment of a bottom plan view of a perspective view of a bidet washing apparatus.

An exemplary water supply system to the nozzle assembly 101 will be detailed hereinafter concerning FIGS. 7-8. The control unit 108 can house the control valves 106*a* and 106*b* (as shown in FIG. 8), to control the flow of water to the water tubes and has the control switches 102*a* and 102*b*, for giving instructions to the control valves. Two control valves and control switches are depicted for exemplary purposes, but it should be understood that any number of control valves and corresponding switches can be employed.

The control valves 106*a* and 106*b* can be situated at the entrance to the water tubes 107*a*, 107*b*, and 107*c* in this example. The control valves 106*a* and 106*b* are designed to open, close, or partially obstruct the water inlet 103*a* opening into the water tubes 107*a*, 107*b*, and 107*c*, such that the volume of the water flowing through any tube at any given time can be easily controlled by the user by giving simple instructions through the control switches. The water tubes 107*a*, 107*b*, and 107*c* connect the control valves 106*a* and 106*b* at one end to the nozzle assembly 101 at the other end. Thus, the control valves 106*a* and 106*b* can effectively control the volume of water flowing to the nozzle assembly 101. In the embodiment, one water tube 107*b* passes through the back of the bidet washing apparatus 100, and two water tubes 107*a* and 107*c* pass through the front of the bidet washing apparatus 100. However, it is to be noted that in an embodiment, more than one water tube could pass through the back of the bidet washing apparatus 100, and the number of water tubes passing through the front of the bidet washing apparatus 100 could be more or less than two.

According to an embodiment, the bidet washing apparatus 100 can include a vacuum breaker (not depicted), which can be situated at various locations within the bidet washing apparatus 100. The vacuum breaker can be located anywhere between the water supply (e.g., the water tank supplying water to the toilet bowl) and the washing nozzle(s) e.g., 101*a* and 101*b*) output. The vacuum breaker can be intended to halt the flow of water that is not expelled by the washing nozzle(s) back into the water supply. According to one exemplary embodiment, the vacuum breaker(s) can be housed within the control unit 108, located between a valve 106*a* and 106*b* and the nozzle assembly 101; however, one of ordinary skill in the art would realize that various locations of one or more vacuum breakers can be implemented within the scope of this disclosure to perform the desired function.

Figure 10:
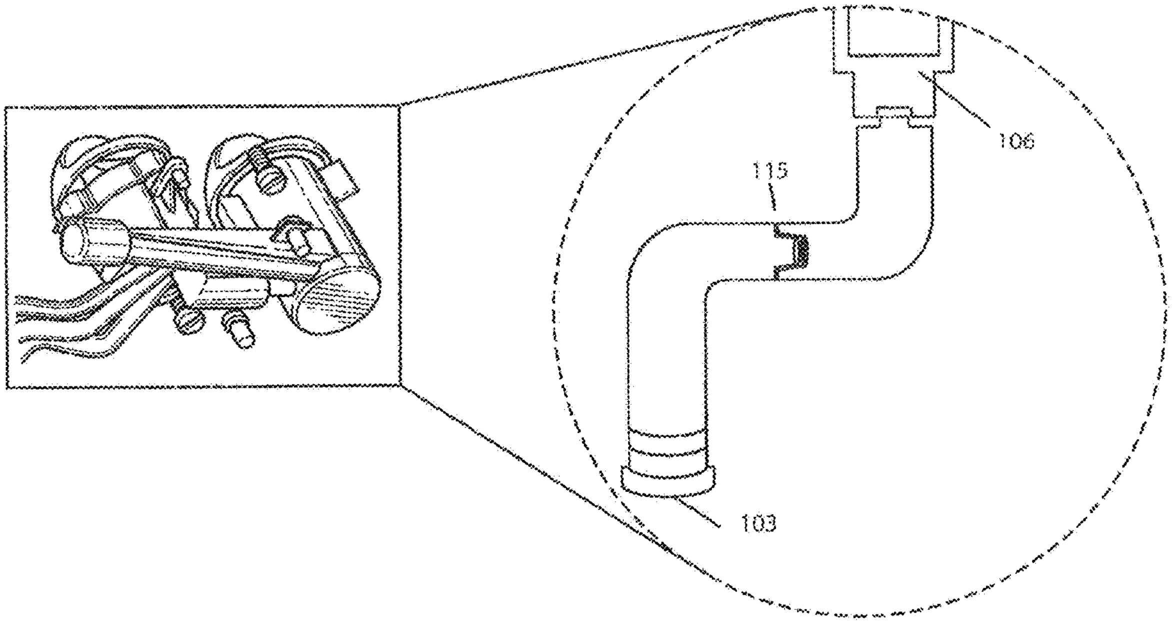
FIG. 10 illustrates an embodiment of a schematic showing a single connection between a water inlet and a control valve inside a control, panel.

In one exemplary embodiment, each water inlet 103*a* and 103*b* is connected to a control valve 106*a* and 106*b* by a single, non-jointed, connection 115 (see FIG. 10) thereby removing any intervening parts and extra connections, which can considerably increase the durability and lifetime of the bidet system. Of course, multiple water inlets 103*a* and 103*b* could be connected to a single control valve; however, each connection between the water inlets 103*a* and 103*b* and the single control valve can be a single-body structure, according to one embodiment.

In an embodiment, the washing nozzle can be replaced with a nozzle that is configured to hold materials such as soap, disinfectant, or any cleaning or medicinal, a substance that can be expelled along with water as it flows through the nozzle. For example, such materials could be in a solid, semi-solid, or liquid form, which dissolves at a predetermined and desired rate, as the water flows through the nozzle and is carried out of the nozzle by the spraying water.

In another embodiment, the bidet washing apparatus can contain one or more reservoir dispensers or chambers, which can be configured to hold materials such as soap, disinfectant, or any cleaning or medicinal substance that can be expelled along with water through one or more water tubes to the nozzle assembly and car be carried out of one or more nozzles by the spraying water. As before, the above-mentioned materials are provided merely for exemplary purposes and are not intended to limit the disclosure in any way. Other known substances and/or materials could be held and/or stored in a nozzle or reservoir dispenser to be expelled with water through the nozzle.

Figure 11:
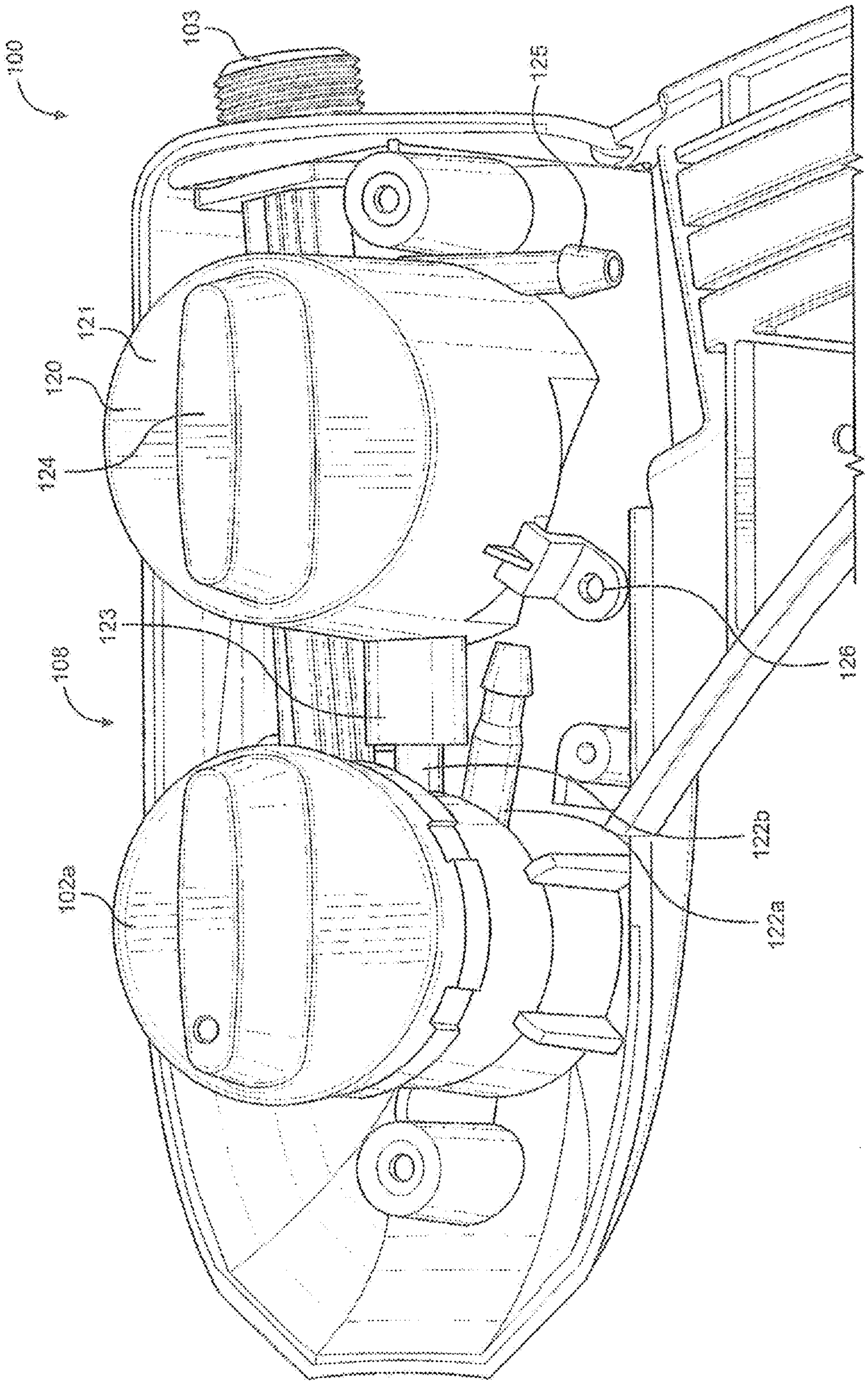
FIG. 11 illustrates a cut-away view fan embodiment of a top view of a bidet washing apparatus.

FIG. 11 illustrates a cut-away view of an embodiment of a top view of a bidet washing apparatus 100, i.e., without showing the entire body of the apparatus. In this figure, the apparatus includes water inlet 103*a*, which is fluidically connected to control unit 108 to supply water. The control unit includes control unit switch 102*a*, which is configured to operate one or more control unit valves or openings (not shown) for controlling water flow from the water inlet and control unit outlets 122*a* and 122*b*.

As shown, the apparatus also includes a reservoir dispenser 120 having one or more compartments (not shown) with a removable lid 121 for holding soap and/or disinfectant. The control unit outlets, 122*a* and 122*b* allow for the transfer of water from the control unit to the nozzle assembly 101 via water tube 107*a* and/or 107*c* (see FIGS. 3-9); and to a reservoir dispenser 120 via reservoir dispenser inlet 123, respectively.

The reservoir dispenser 120 allows for mixing of the transferred water with the soap and/or disinfectant present in the one or more compartments of the dispenser to provide a soapy and/or disinfectant solution or mixture. The reservoir dispenser 120 includes reservoir dispenser switch 124, which is configured to operate one or more reservoir dispenser valves or openings (not shown) for controlling water flow from the control unit and/or from reservoir dispenser outlet 125.

Once mixed, the solution or mixture in the one or more compartments of the reservoir dispenser 120 can be transferred through the reservoir dispenser outlet 125 to the nozzle assembly 101 via water tube 107*a*, 107*b*, or 107*c* (see FIG. 9), and provide the solution or mixture for washing and cleaning the nozzle assembly and shield gate.

Also shown in this figure is a plurality of tabs with openings 126, which can be used as a securing mechanism for securing the control unit and reservoir dispenser to the body of the apparatus using screws, bolts, snaps, and the like.

Figure 12:
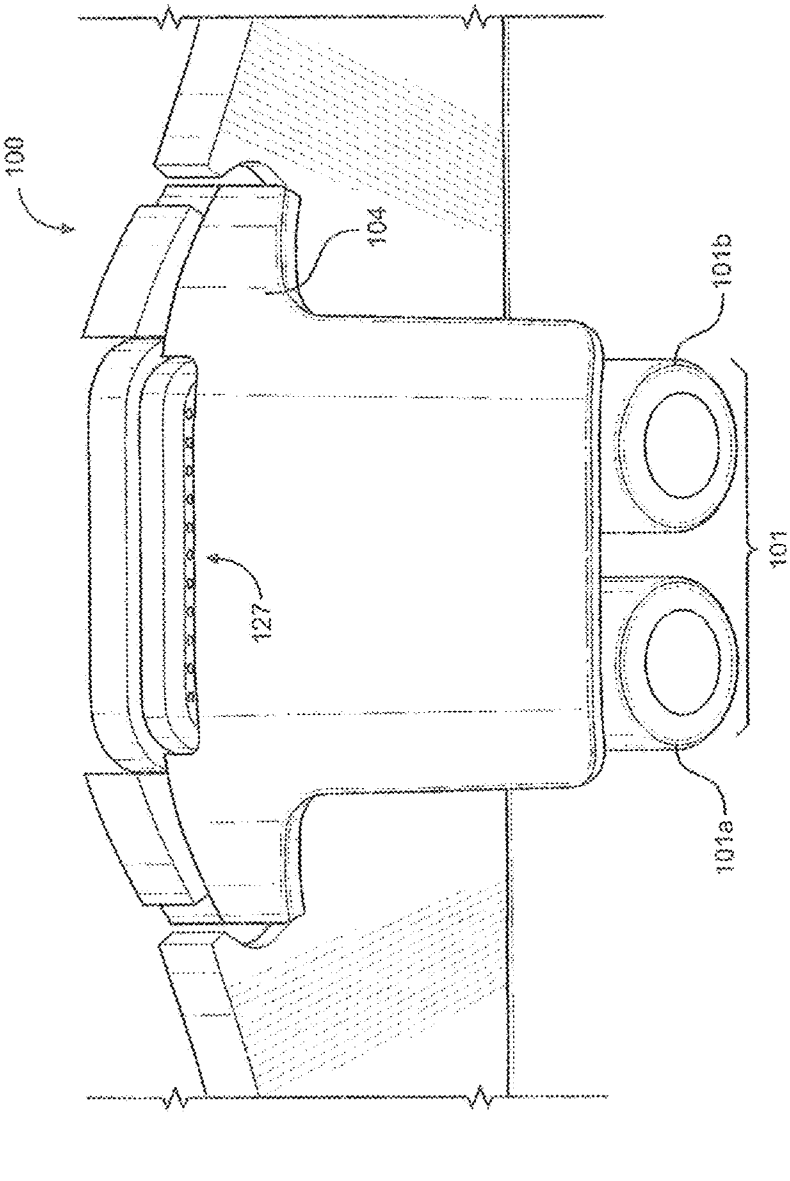
FIG. 12 illustrates a cut-away view of an embodiment of a bottom view of a bidet washing apparatus, showing nozzle assembly including washing nozzles and a shield gate.

FIG. 12 illustrates a cut-away view of an embodiment of a bottom view of a bidet washing apparatus 100, showing nozzle assembly 101 including washing nozzles 101*a* and 101*b*, and protective shield gate 104. This figure also illustrates one or more water openings 127 located above the nozzle assembly, which allow the solution or mixture transferred through water tube 107*a*, 107*b*, or 107*c* to wash and/or clean the nozzle assembly and shield gate.

Figure 13A:
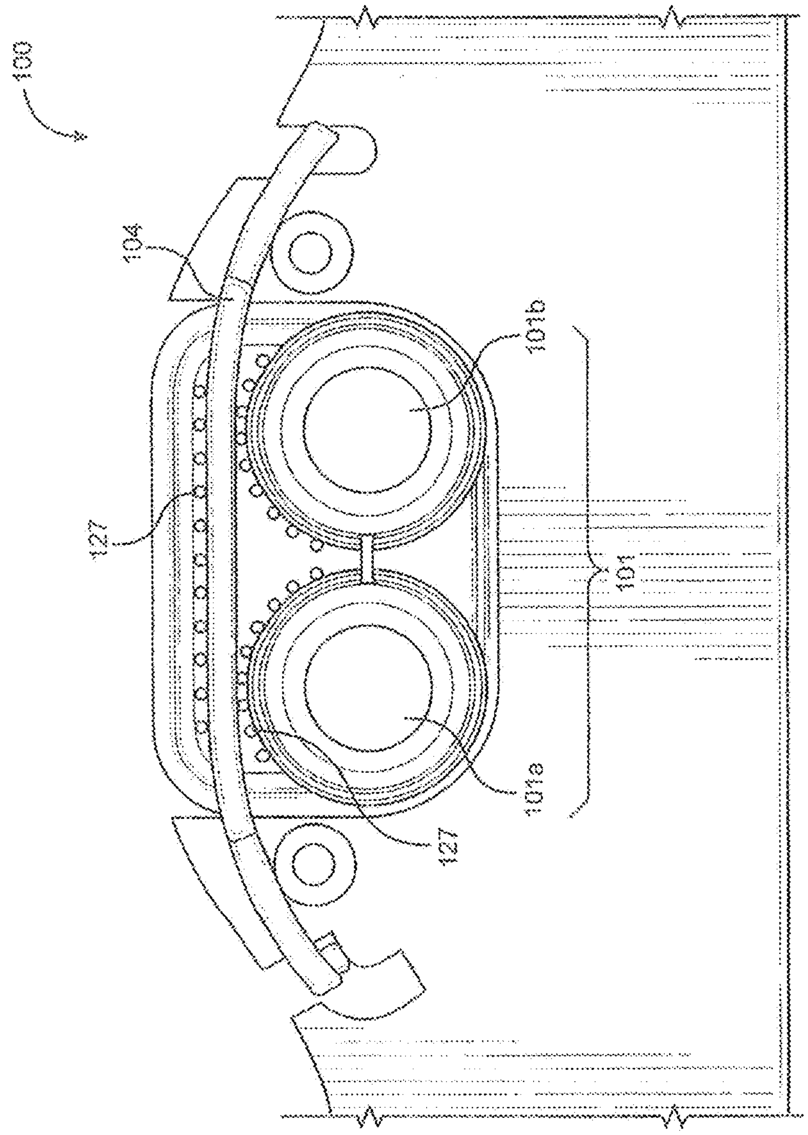
FIGS. 13*a* and 13*b* illustrate a cut-away view of an embodiment of a bottom view of the nozzle assembly, washing nozzles, and one or more openings with and without a shield gate.
Figure 13B:
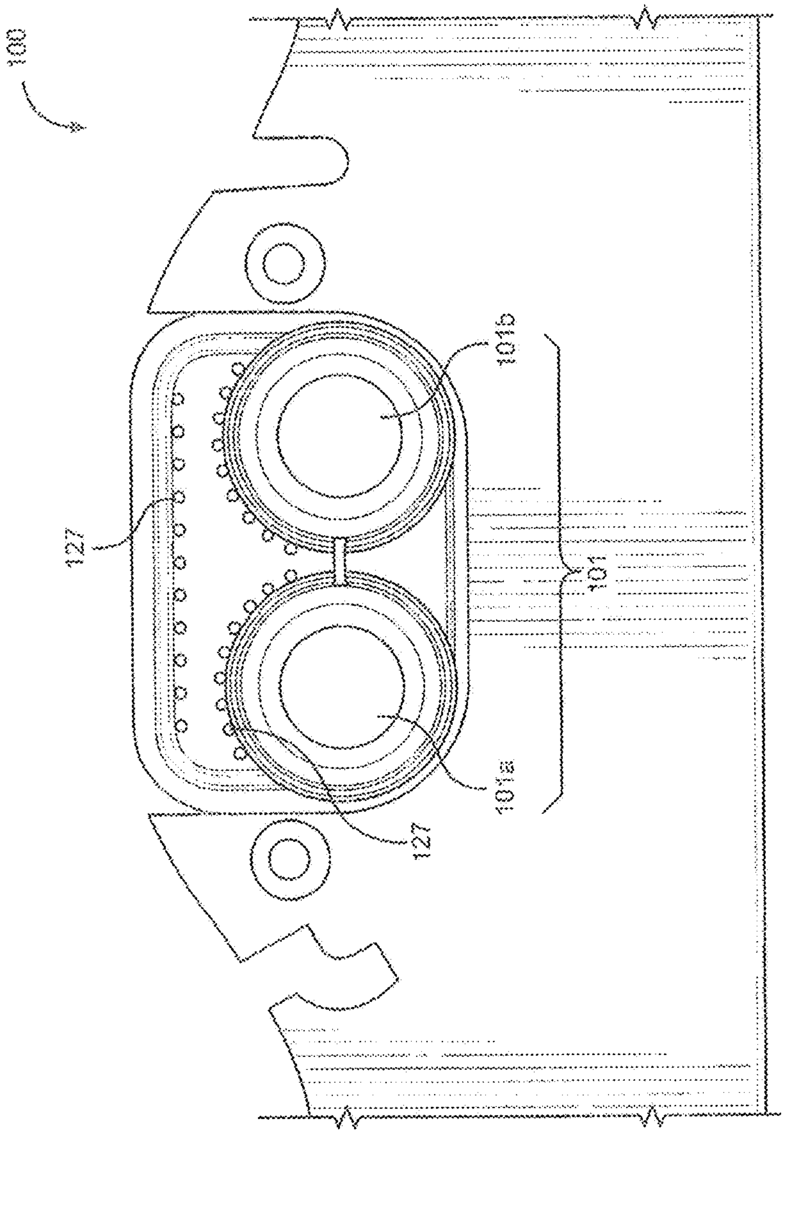

FIGS. 13*a* and 13*b* illustrate a cut-away view of an embodiment of a bottom view of the nozzle assembly 101, washing nozzles 101*a* and 101*b*, and the one or more water openings 127 with and without the protective shield gate 104, respectively. As shown in these figures, one or more openings can be configured to wash one or both sides of the shield gate.

Figure 14:
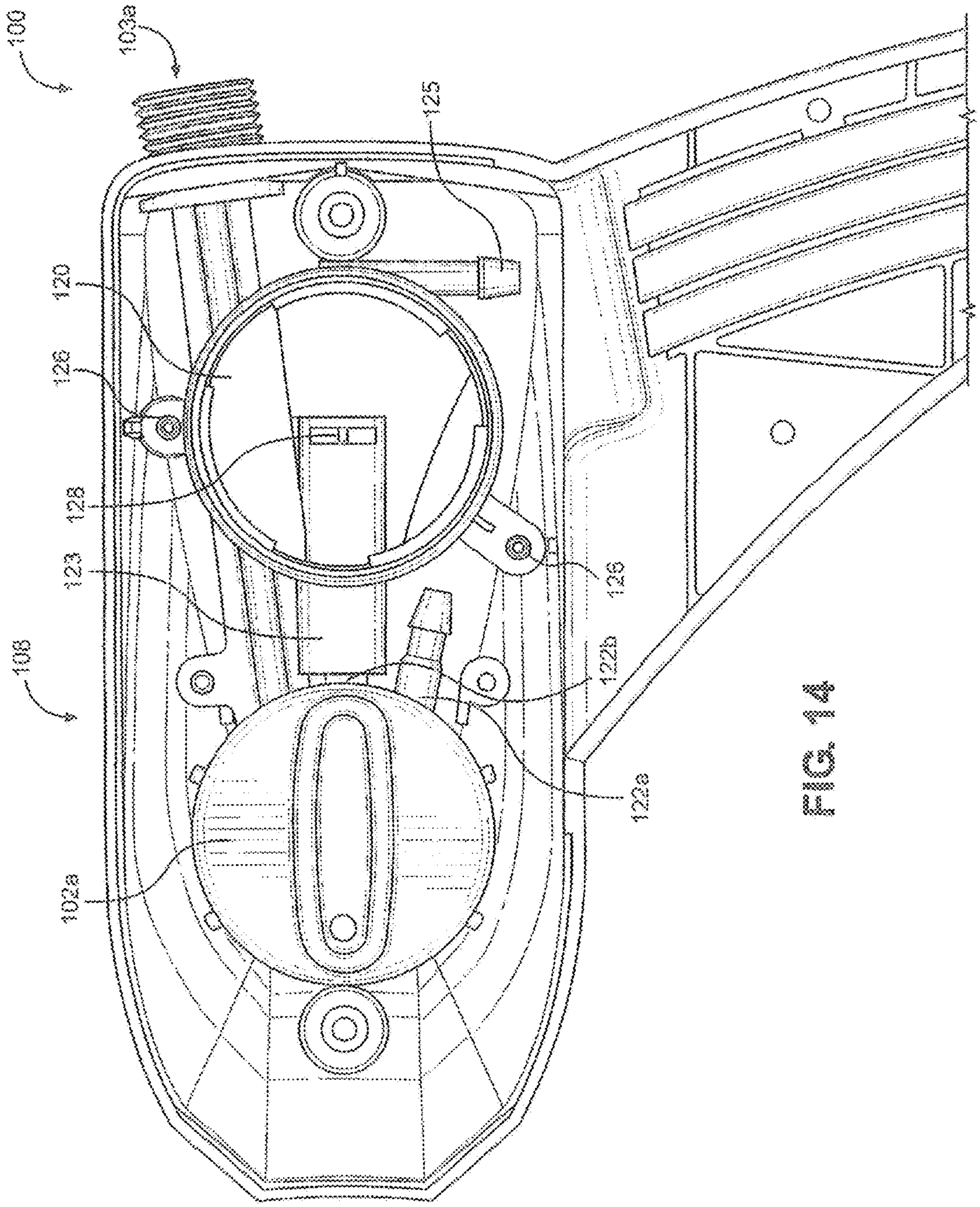
FIG. 14 illustrates a cut-away view of an embodiment of a top view of a bidet washing apparatus, showing a one compartment reservoir dispenser with a lid removed.

FIG. 14 illustrates a cut-away view of an embodiment of a top view of a bidet washing apparatus 100, showing a one compartment reservoir dispenser 120 with the lid removed.

As shown, inside the reservoir dispenser 120 is an opening 128 in the reservoir dispenser inlet 123, which allows for the flow of water from the control unit switch 102*a* into the compartment of the reservoir dispenser.

Also shown in this figure are the water inlet 103*a*, control unit 108, control unit outlets 122*a* and 122*b*, reservoir dispenser inlet 123 reservoir dispenser outlet 125, and securing mechanisms 126.

Figure 15:
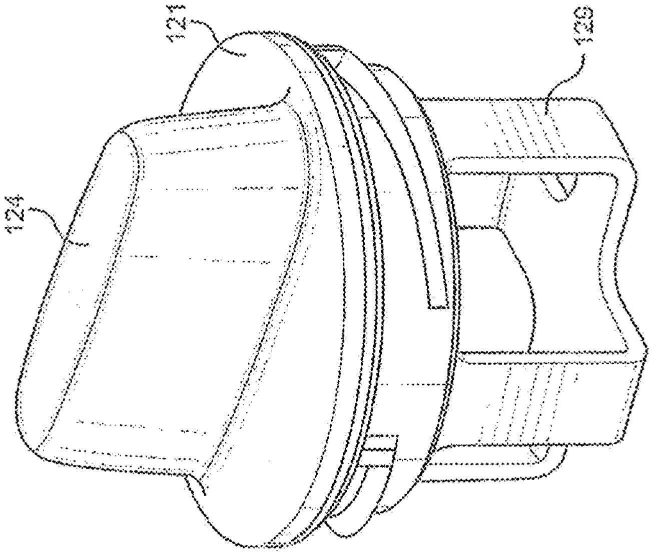
FIG. 15 illustrates a view of a lid, which can be removably attached to a reservoir dispenser.

FIG. 15 illustrates a view of lid 121, which can be removably attached to the reservoir dispenser. The lid 121 can include the reservoir dispenser switch 124 and a lower securing gate 129 for securing cleaning and/or disinfection materials in solid or tablet form. Alternatively, the lower securing gate can include one or more filters or screens for securing the cleaning material, which can allow water to flow over the cleaning and/or disinfection materials to provide the desired solution.

The reservoir dispenser and lid can be of any type of complementary securing device to make up the dispenser, e.g. a threaded dispenser and screw-on lid, a dispenser with a snap-on lid, etc. In addition, the dispenser and or lid can include one or more washers or O-rings (not shown), or any other similar type of device for securing a water-tight seal between the dispenser and lid.

Figure 16:
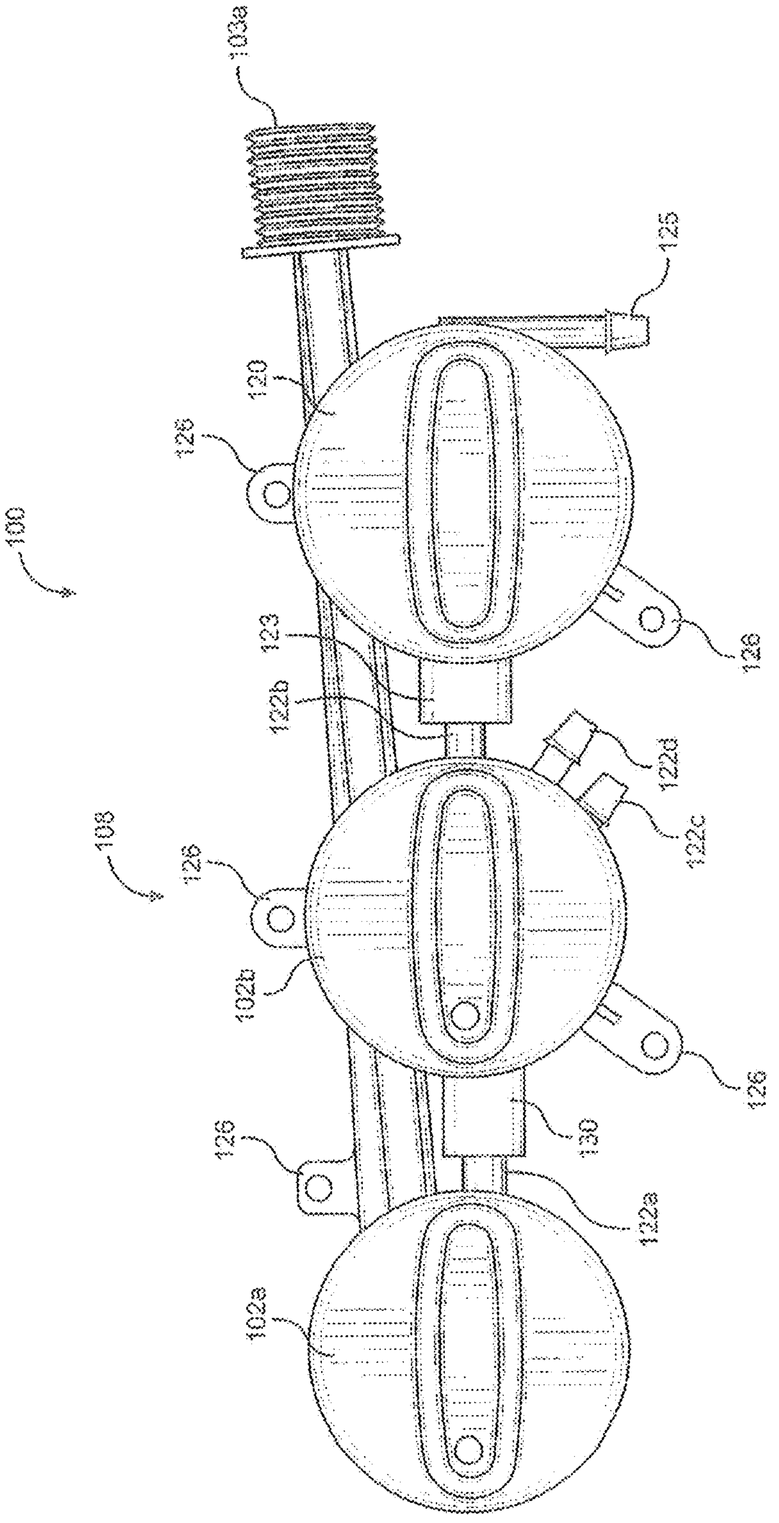
FIG. 16 illustrates a cut-away view of an embodiment of a bidet washing apparatus with a reservoir dispenser and, a removable lid.

FIG. 16 illustrates a cut-away view of an embodiment of a bidet washing apparatus 100 with a reservoir dispenser 120 and a removable lid 121. In this figure, the apparatus includes water inlet 103*a* connected to control unit 108 having control switch 102*a*. The first control switch can act as an on/off switch for the incoming and outgoing water. In the on position, water can be transferred from the first control switch to control switch 102*b* via control unit outlet 122*a* and control unit inlet 130. The control switch 102*b* includes two water outlets 122*c* and 122*d* for transferring water to the nozzle assembly 101 via water tubes 107*a*, 107*b*, or 107*c*. The control switch 102*b* also includes a water outlet 122*b* (not shown) for transferring water to the reservoir dispenser 120 via reservoir dispenser inlet 123. Ultimately, the resulting solution or mixture in the reservoir dispenser can be transferred, to nozzle assembly 101 for cleaning purposes via reservoir dispenser outlet 125 and water tube 107*a*, 107*b*, or 107*c* (not shown).

Figure 17:
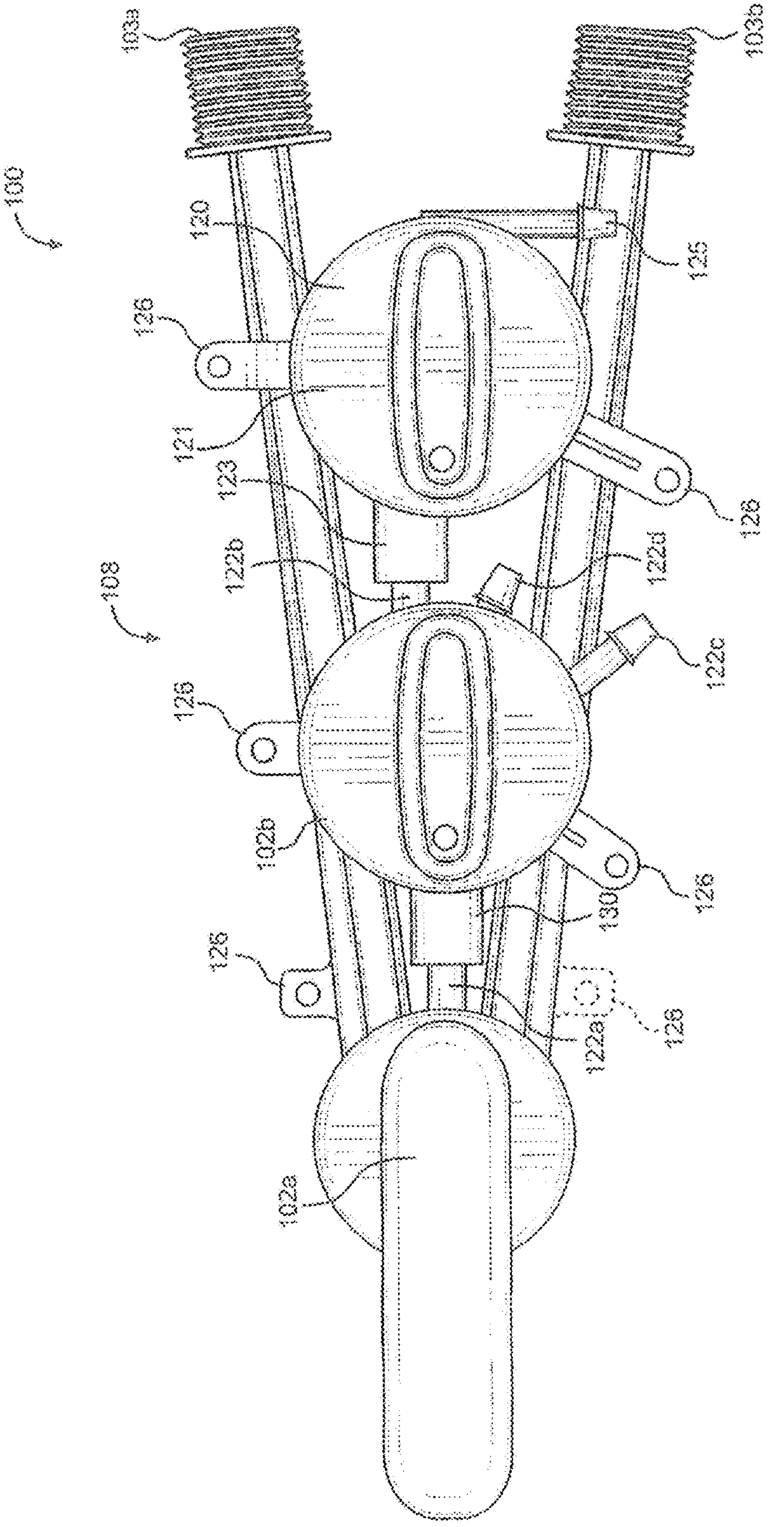
FIG. 17 illustrates a cut-away view of an embodiment of a bidet washing apparatus with a reservoir dispenser and a removable lid.

FIG. 17 illustrates a cut-away view of an embodiment of a bidet washing apparatus 100 with a reservoir dispenser 120 and a removable lid 121. In this figure, the apparatus includes separate water inlets 103*a* and 103*b*, which can be used for transporting cold and/or hot water to the control switch 102*a*. The apparatus also includes water inlet 103*a* connected to control unit 108 having control switch 102*a*, which can be configured as a handle or lever. As before, the first control switch can act as an on/off switch for the incoming and outgoing water. In the on position, water can be transferred from the first control switch to control switch 102*b* via water outlet 122*a* and water inlet 130. The control switch 102*b* includes two water outlets 122*c* and 122*d* for transferring water to the nozzle assembly 101 via water tubes 107*a*, 107*b*, or 107*c*. The control switch 102*b* also includes a water outlet 122*b* (not shown) for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlet 125 and water tube 107*a*, 107*b*, or 107*c* (not shown).

Figure 18:
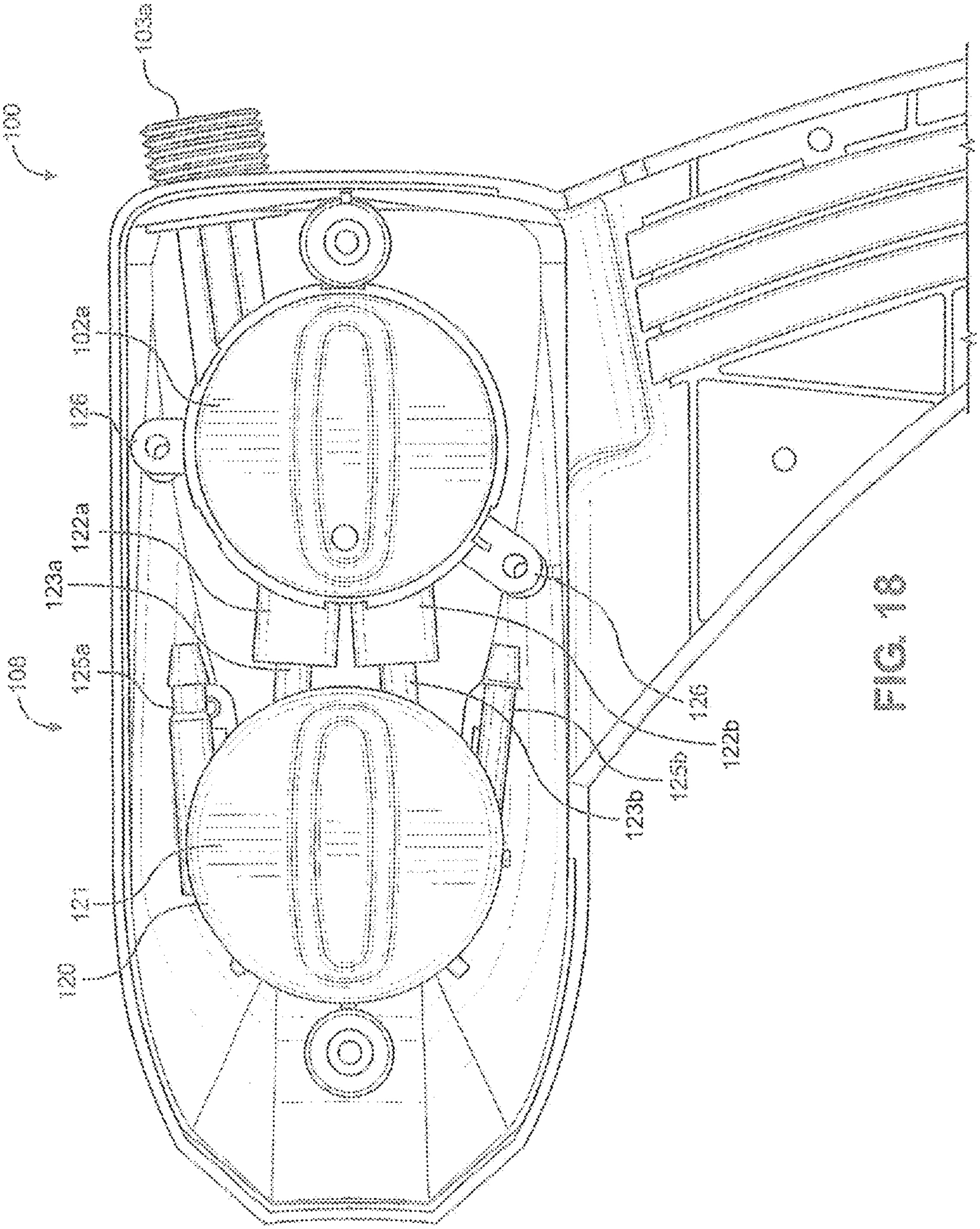
FIG. 18 illustrates, a cut-away view of an embodiment of a bidet washing apparatus with a reservoir dispenser and a removable lid.

FIG. 18 illustrates a cut-away view of an embodiment of a bidet washing apparatus 100 with, a reservoir dispenser 120 and a removable lid 121. In this figure, the apparatus includes water inlet 103*a* or 103*b* connected to control unit 108 with control switch 102*a*. In the on position, water can be independently transferred from control unit 108 to the reservoir dispenser 120 via first water outlets 122*a* and 122*b* (now shown) and reservoir dispenser nlets 123*a* and 123*b*, respectively. Here, the reservoir dispenser 120 includes two separate compartments 120*a* and 120*b* (see, FIG. 19), in which each compartment can independently contain soap and/or disinfectant. The resulting solution and mixture in each of these compartments can be transferred to nozzle assembly 101 for cleaning purposes via the reservoir dispenser switch 124, reservoir dispenser outlets 125*a* and 125*b*, and water tubes 107*c* and 107*d* (not shown), respectively.

Figure 19:
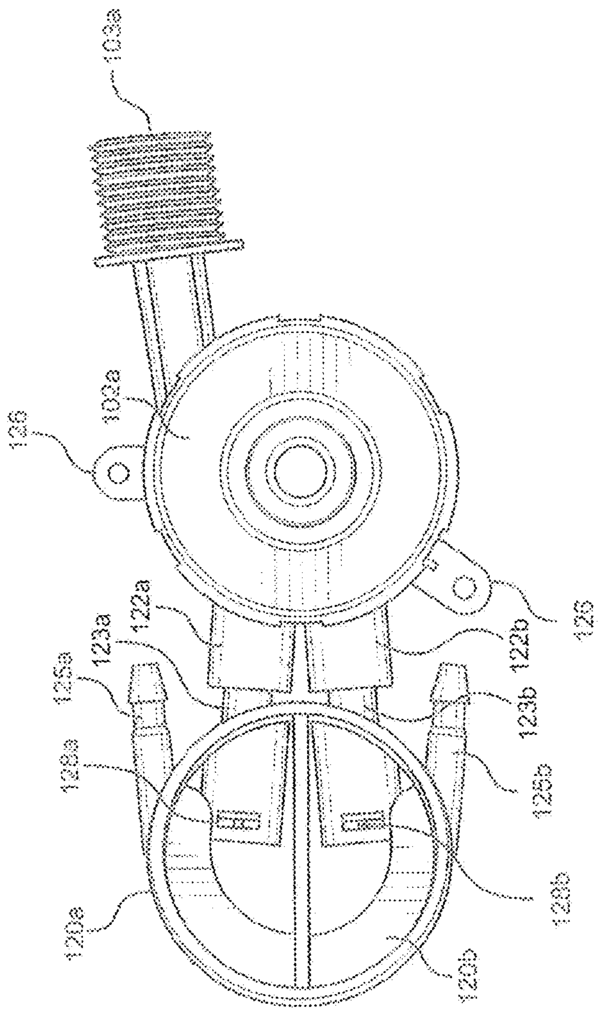
FIG. 19 illustrates a cut-away view of an embodiment of a bidet washing apparatus with a reservoir dispenser without a removable lid.

FIG. 19 illustrates a cut-away view of an embodiment of a bidet washing apparatus 100 with a reservoir dispenser 120 the removable lid removed. In this figure, the apparatus includes water inlet 103*a* or 103*b* connected to control unit 108 with control switch 102*a*, in the on position, water can be independently transferred from control unit 108 to the reservoir dispenser 120 via first water outlets 122*a* and 122*b* (now shown) and reservoir dispenser inlets 123*a* and 123*b*, respectively. Here, the reservoir dispenser 120 includes two separate compartments 121*a* and 121*b*, in which each compartment can independently contain soap and/or disinfectant. The resulting solution or mixture in each of these compartments can be transferred to nozzle assembly 101 for cleaning purposes via the reservoir dispenser switch 124, reservoir dispenser outlets 125*a* and 125*b*, and water tubes 107*e* and 107*d* (not shown), respectively.

Figure 20:
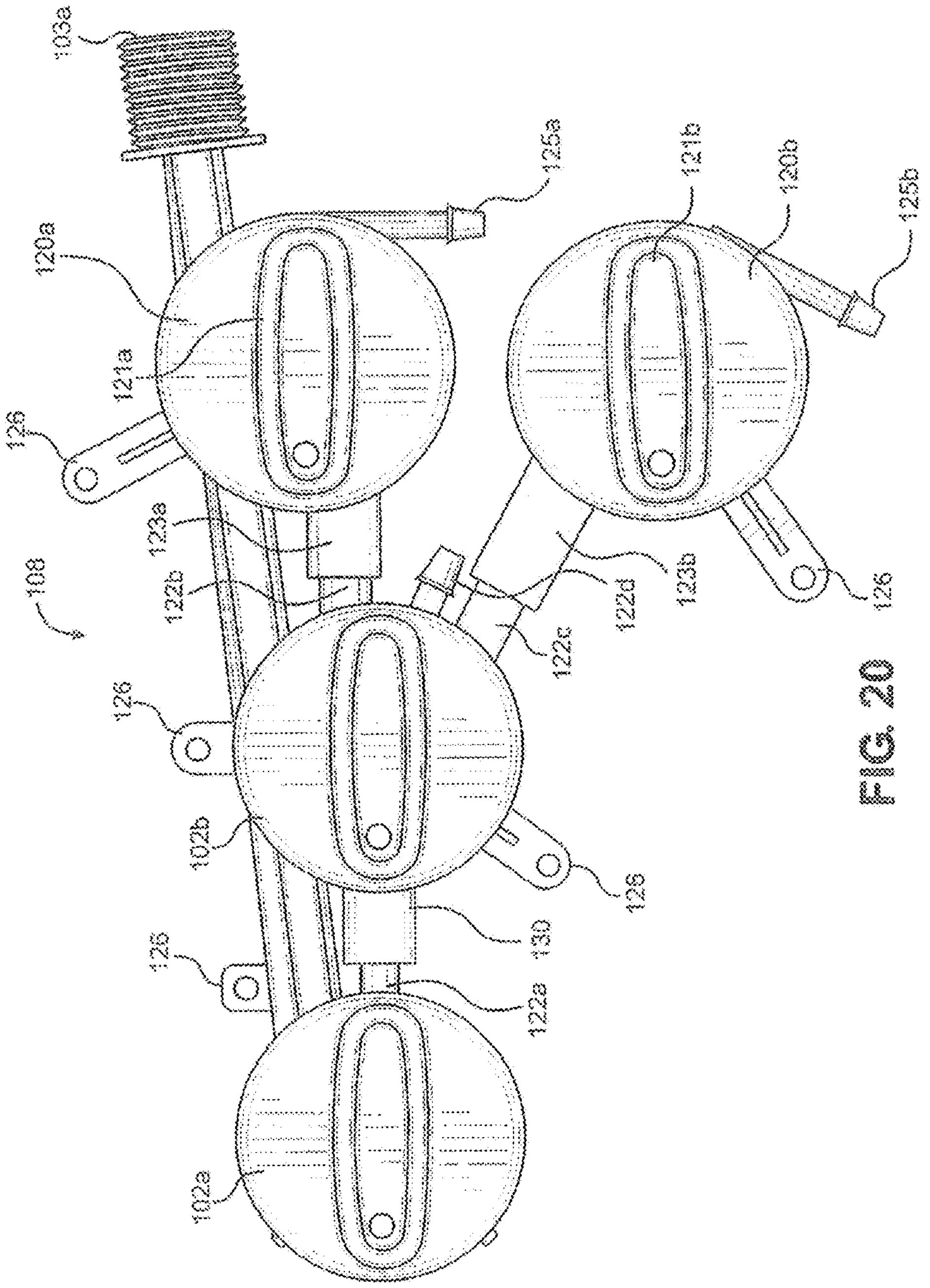
FIG. 20 illustrates a cut-away view of an embodiment of a bidet washing apparatus with two reservoir dispensers with removable lids.

FIG. 20 illustrates a cut-away view of an embodiment of a bidet washing apparatus 100 with reservoir dispensers 120*a* and 120*b* with a removable lid 122*a* and 120*b*, respectively. In this figure, the apparatus includes water inlet 103*a* connected to control unit 108 with control switch 102*a*. Control switch 102*a* can act as an on/off switch for the incoming and outgoing water. In the on position, water can be transferred from control switch 102*a* to control switch 102*b* via water outlet 122*a* and water inlet 130. The control switch 102*b* includes water outlet 122*b* for transferring water to the reservoir dispenser 120 via reservoir dispenser inlet 123*a*. The control switch 102*b* further includes water outlet 122*c* liar transferring water to the reservoir dispenser 120*b* via reservoir dispenser inlet 123*b*. Ultimately, the resulting solution or mixture in the reservoir dispensers can be transferred to nozzle assembly 101 for cleaning purposes via reservoir dispenser outlets 125*a* and/or 125*d*. Finally, the control switch 102*b* also includes water outlet 122*d*, which can transfer water to the nozzle assembly directly.

Figure 21:
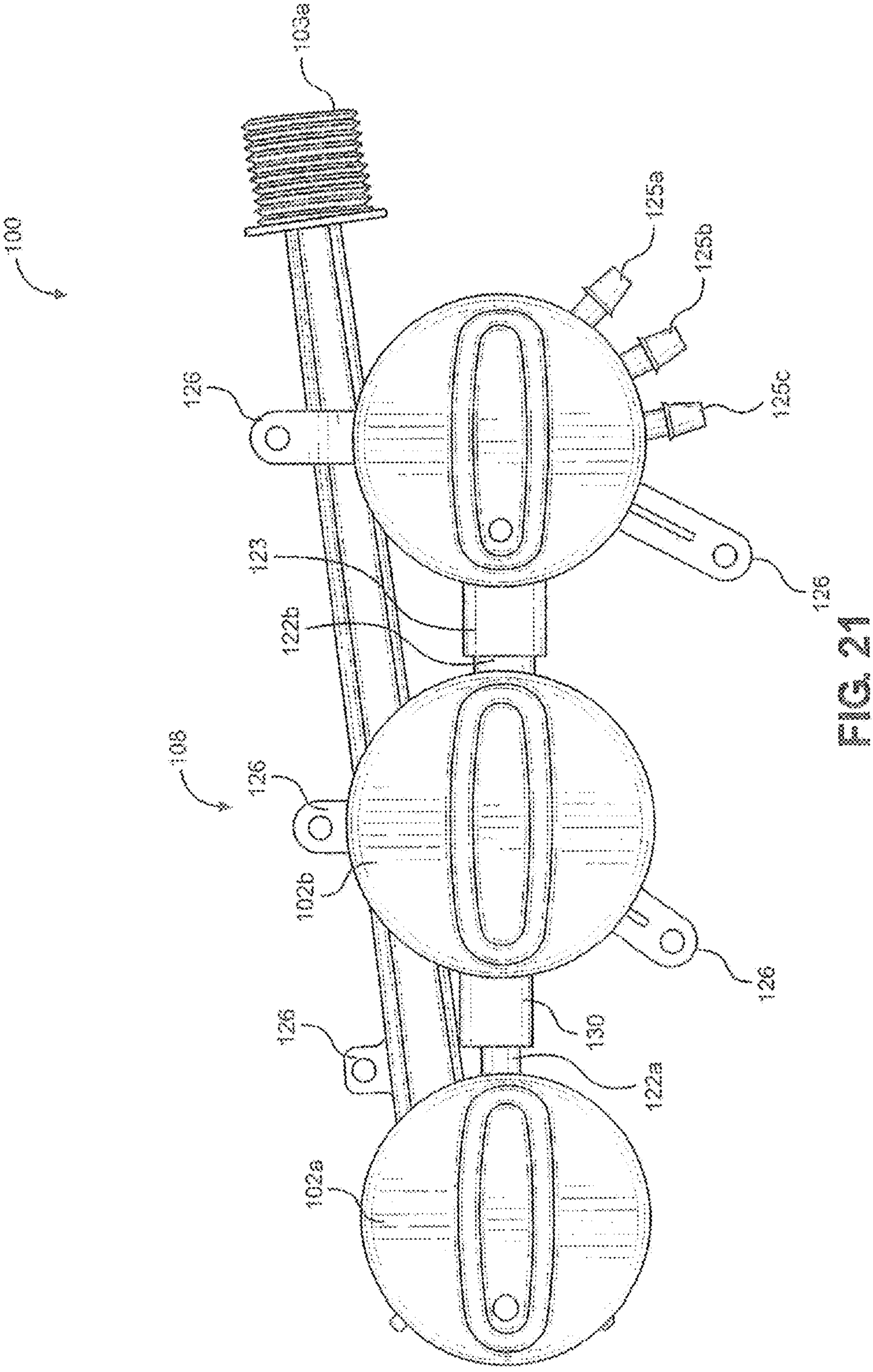
FIG. 21 illustrates a cut-away view of an embodiment of a bidet washing apparatus with a reservoir dispenser with a removable lid.

FIG. 21 illustrates a cut-away view of an embodiment of a bidet washing apparatus 100 with a reservoir dispenser 120 with a removable lid 121. In this figure, the apparatus includes water inlet 103*a* connected to control unit 108 with control switch 102*a*. Control switch 102*a* can act as an on/off switch for the incoming and outgoing water. In the on position, water can be transferred from control switch 102*a* to control switch 102*b* via water outlet 122*a* and water inlet 130. The control switch 102*b* includes water outlet 122*b* for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlets 125*a*, 125*b*, and/or 125*c*.

Figure 22:
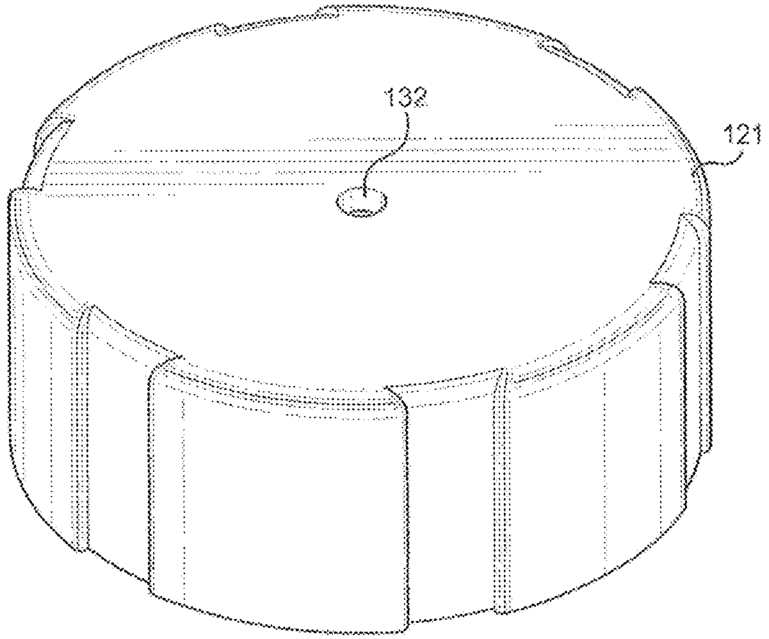
FIG. 22 illustrates an embodiment of a reservoir dispenser lid with a built-in check valve and air vent for securing a reservoir dispenser of a bidet washing apparatus.

FIG. 22 illustrates an embodiment of a reservoir dispenser lid with a built-in check valve system 131 and air vent 132 for securing the reservoir dispenser of a bidet washing apparatus.

A check valve (clack valve, non-return valve, reflux valve, retention valve, or a one-way valve) is a valve that normally allows fluid to flow through it in only one direction. Check valves are two-port valves, meaning they have two openings in the body, one for air or fluid to enter and the other for air or fluid to leave. Check valves work automatically and are not controlled by a person or any external control; accordingly, most check valves do not have any valve handle or stem. The bodies (external shells) of most check valves are typically made of plastic or metal but can be made of any suitable material.

A reservoir dispenser lid with a built-in check valve allows the reservoir dispenser system described herein to vent when the bidet washing apparatus is not in use. A check valve allows the flow of air or liquid in one direction but not in the other direction. In this case, the lid allows air into the lid (venting the disinfectant/soap reservoir) when the bidet is not in use. When the bidet is in use, the reservoir will be pressurized with water, but no liquid can flow out of the lid. This allows the water-filled in the disinfectant/soap reservoir to be flushed out at the end of each use. It is necessary to flush the water in the reservoir because the chemical ingredients of the disinfectant/soap can grow mold and/or dissolve if water is present in the reservoir for a prolonged period.

An important concept in check valves is the cracking pressure (unseating head pressure or opening pressure), which is the minimum differential upstream pressure inlet and at which the valve will operate. Typically, the check valve is designed for and can be specified for a specific cracking pressure. Reseal pressure (sealing pressure, seating pressure, seating head pressure, or closing pressure) refers to the pressure differential between the inlet and outlet of the valve during the closing process of the check valve, at which there is no visible leak rate. Backpressure refers to a pressure higher at the outlet of a fitting than that at the inlet or a point upstream.

A ball check valve in the open position allows forward flow and the closed position, allows the device to block reverse flow. A ball check valve is a check valve in which the closing member, the movable part to block the flow, is a ball. In some ball check valves, the ball can be spring-loaded to help keep it shut. For those designs without a spring, reverse flow is required to move the ball toward the seat and create a seal. The interior surface of the main seats of ball check valves is more or less conically tapered to guide the ball into the seat and form a positive seal when stopping reverse flow.

By contrast, a diaphragm check valve uses a flexing rubber diaphragm positioned to create a normally closed valve. Pressure on the upstream side must be greater than the pressure on the downstream side by a certain amount known as the pressure differential, for the check valve to open allowing flow. Once positive pressure stops, the diaphragm automatically flexes back to its original closed position.

Figure 23:
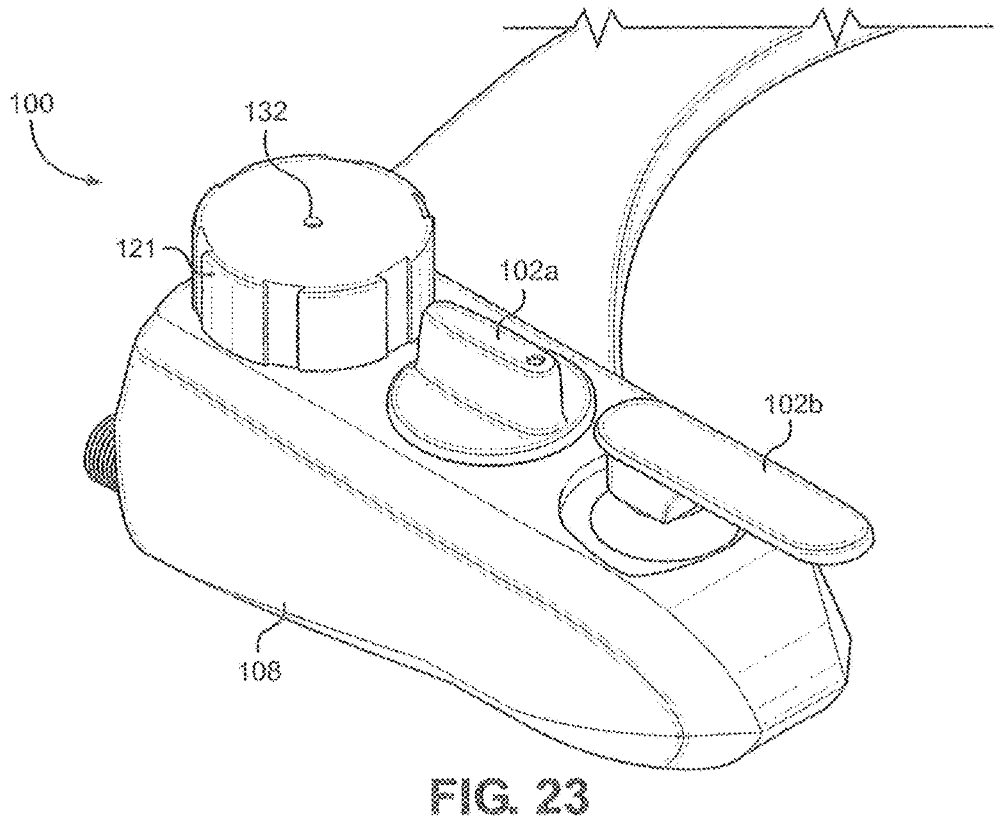
FIG. 23 illustrates an embodiment of a bidet washing apparatus having a reservoir dispenser lid with a built-in check valve and air vent for securing to a reservoir dispenser, a control unit, and control switches of a bidet washing apparatus.

FIG. 23 illustrates an embodiment of reservoir dispenser lid with a built-in check valve system 131 and air vent 132 for securing to the reservoir dispenser 120, the control unit 108, control switches 102*a* and 102*b* of a bidet washing apparatus 100. The soap container (not shown) in the reservoir dispenser can be secured within the control panel using screws. As shown, the lid with the built-in check valve system 131 can be exposed for easy removal.

Figure 24:
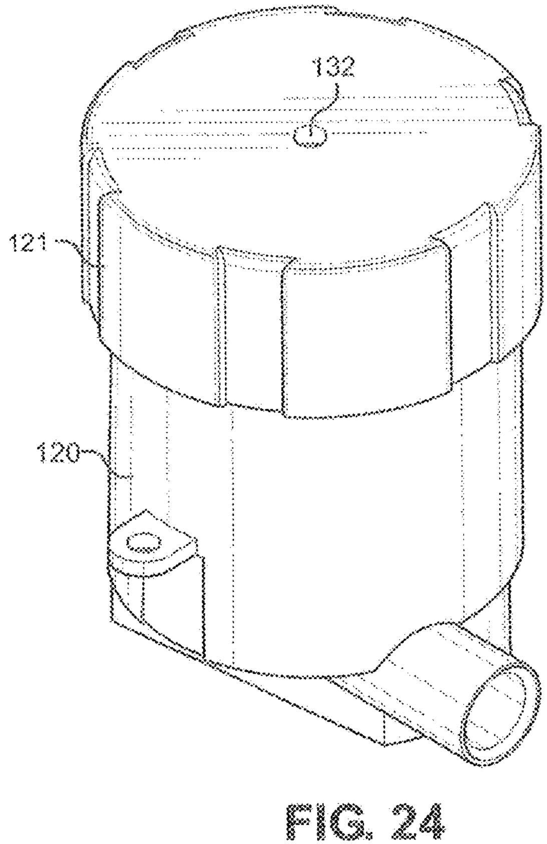
FIG. 24 illustrates an embodiment of a reservoir dispenser lid with a built-in check valve and air vent secured to a reservoir dispenser by being screwed onto or attached to a dispenser.

FIG. 24 illustrates an embodiment of a reservoir dispenser lid 121 with a built-in check valve system 131 and air vent 132 secured to the reservoir dispenser 120 by being screwed onto or attached to the dispenser, i.e., the lid and dispenser can be threaded together, and the lid and dispenser can be snapped together.

Figure 25A:
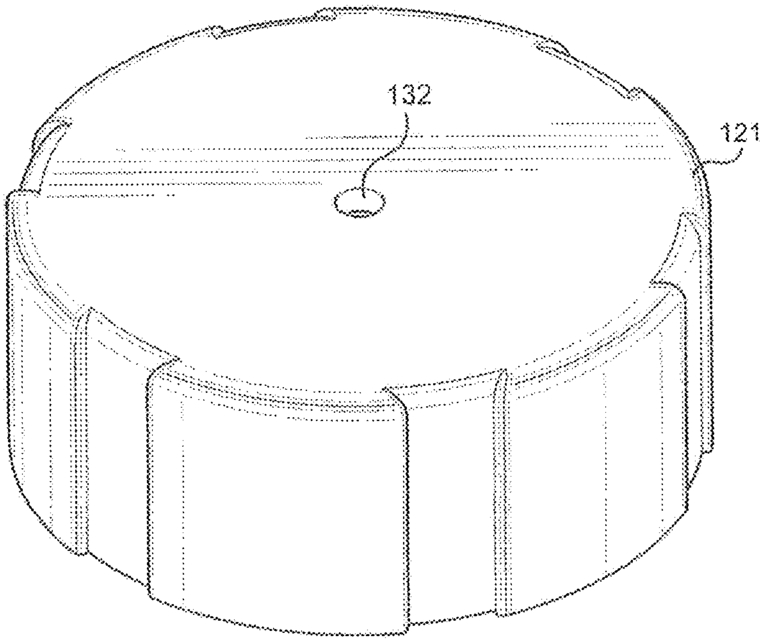
FIG. 25A illustrates an embodiment of an exterior view of a reservoir dispenser lid with a built-in check valve and air vent.
Figure 25B:
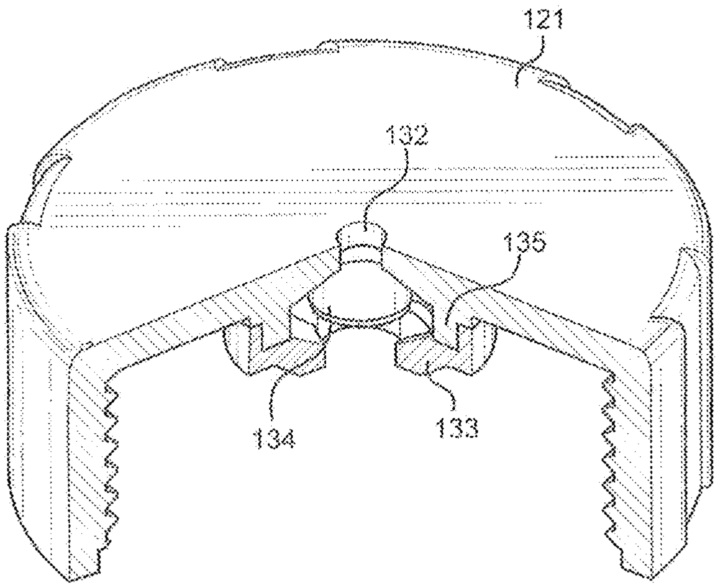
FIG. 25B illustrates an embodiment of a cut-away view of a lid and air vent.

FIG. 25A illustrates an embodiment of the exterior view of the reservoir dispenser lid 121 with a built-in check valve system 131 and air vent 132; and FIG. 25B illustrates an embodiment of a cut-away view of the reservoir dispenser lid 121 and air vent 132. As shown, the inside top of the reservoir dispenser lid 121 can include a check valve 133 and a moveable rubber disk 134, which can be secured to the reservoir dispenser lid 121 via a complementary lip 135.

Figure 26:
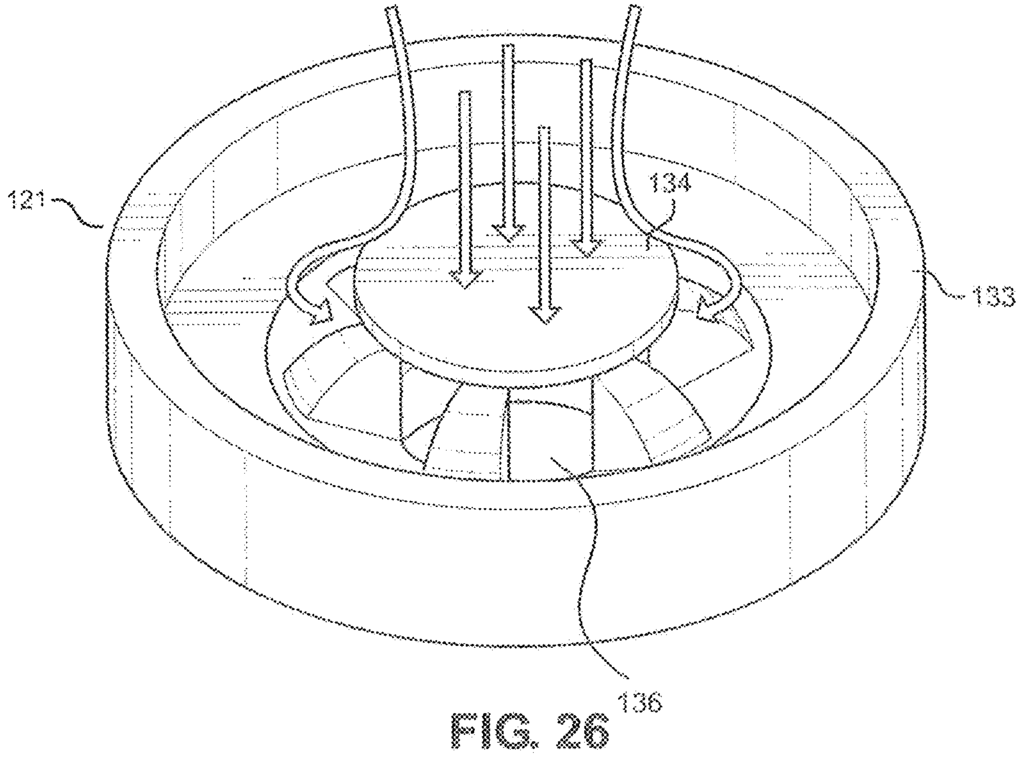
FIG. 26 illustrates an embodiment of a built-in check valve having a moveable rubber disk.

FIG. 26 illustrates an embodiment of the reservoir dispenser lid 121 with a built-in check valve 133 having moveable rubber disk 134. As shown in this figure, air can flow through the valve via air vent openings 136.

Figure 27:
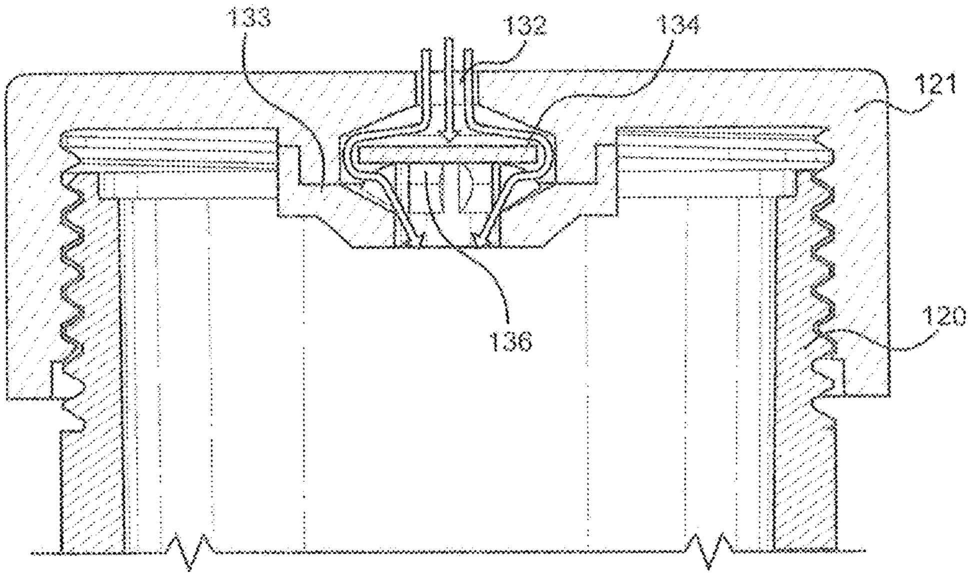
FIG. 27 illustrates an embodiment of a cut-away cross-sectional view of a reservoir dispenser lid with a built-in check valve and air vent with a valve in an opened position.

FIG. 27 illustrates an embodiment of a cut-away cross-sectional view of a reservoir dispenser lid with a built-in check valve system 131 and air vent 132. As shown, air can flow into the lid and the reservoir dispenser 120 through air vent 132 and air vent openings 136. That is the movable rubber disk 134 of the check valve 133 is in the open position, which allows air to enter the reservoir dispenser through the air vent of the lid.

Figure 28:
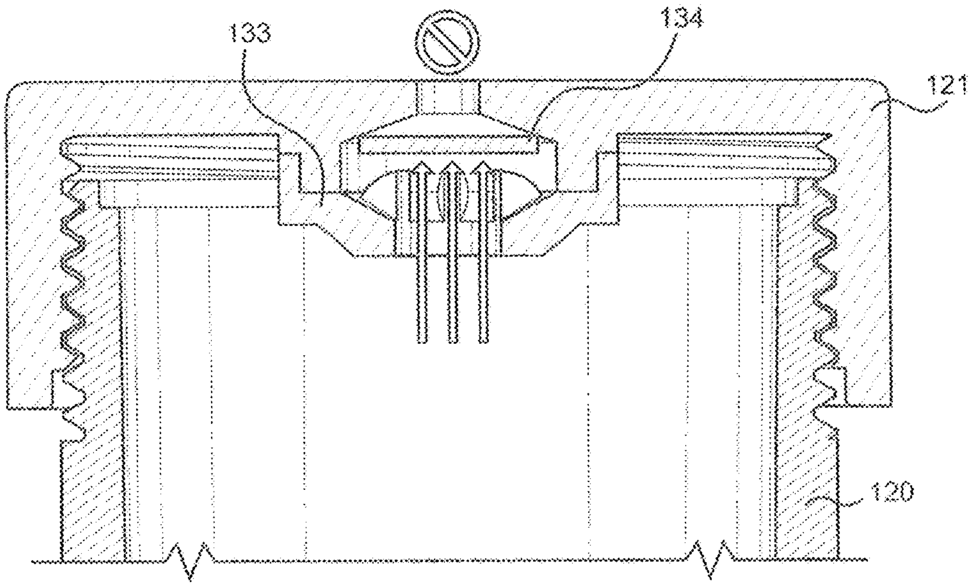
FIG. 28 illustrates an embodiment of a cut-away cross-sectional view of a reservoir dispenser lid with a built-in check valve and air vent with a valve in a closed position.

FIG. 28 illustrates an embodiment of a cut-away cross-sectional view of a reservoir dispenser lid with a built-in check valve system 131 and air vent 132. As shown, air cannot flow into the lid and, into the reservoir dispenser 120 through air vent 132 because it is blocked by the movable rubber disk 134. That is, the movable rubber disk 134 of the check valve 133 is in the closed position due to the high internal pressure of the water pushing up against the rubber disk, which prevents air from entering the reservoir dispenser through the air vent of, the lid and prevents, any liquid from escaping.

In other embodiments, the disclosure provides a reservoir dispenser for a bidet washing apparatus having a plurality of chambers, wherein a first chamber holds a liquid wash solution, and a second chamber holds water for flow through the apparatus. In these embodiments, the liquid wash solution from the first chamber can be added to the water present in the second chamber and mixed therein, in a controlled, measured manner without backflow of water into the first chamber.

It is understood by those of skill in the art that the phrase "liquid wash solution" or "wash solution" is meant in a non-limiting sense and can include any combination of soap or detergent in a solution of water along with other additives. Additives in this type of solution can include but are not limited to disinfectants, antibacterial, anti-inflammatory, moisturizing, antiseptic, anti-fungal, germicidal, soothing, detoxifying, cooling, antipruritic, hydrating, antiviral, cleansing, cleaning, and deodorizing additives, or a combination thereof.

Figure 29:
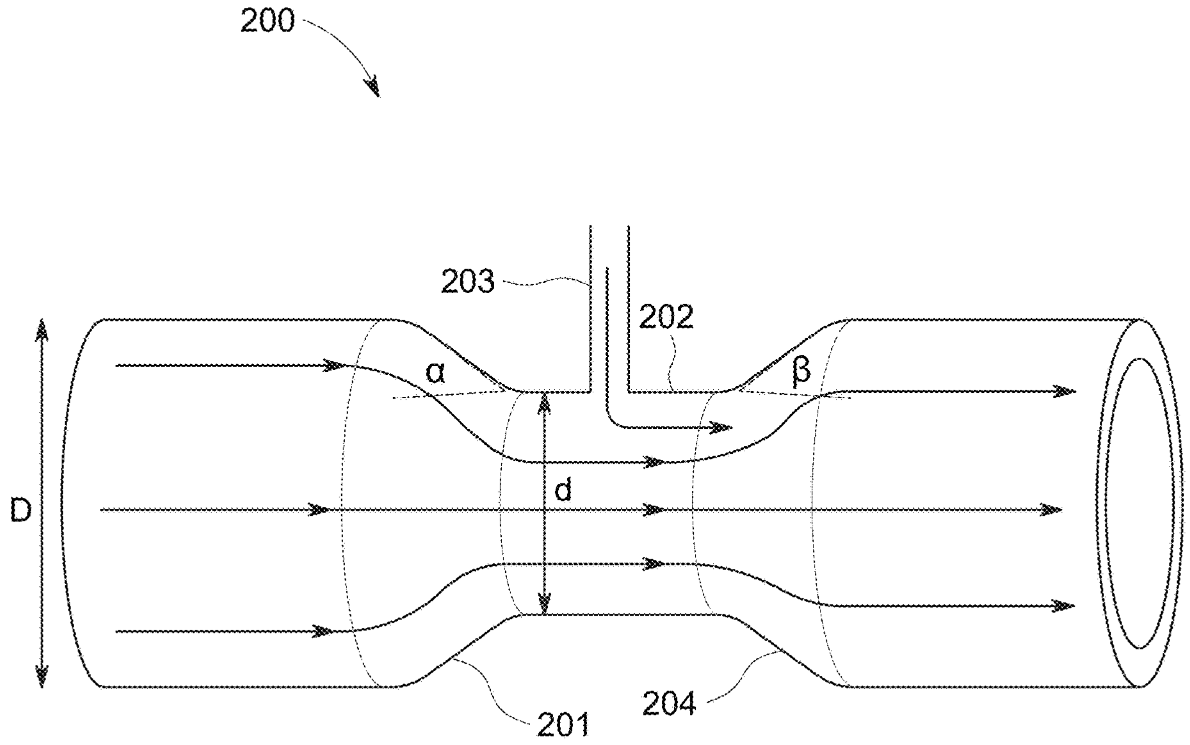
FIG. 29 illustrates an embodiment of the Venturi effect relating to reduction in fluid pressure that results when a fluid flow through a constricted section of a pipe.

FIG. 29 illustrates the principle of the Venturi effect. The Venturi effect is the reduction in fluid pressure that results when a fluid flows through a constricted section of a pipe, i.e., the choke. As shown in this figure, the Venturi tube or pipe 200 includes a first section 201 (contraction section), the choke 202 (throat section), wherein the speed of the flow of the fluid at the choke is faster than the speed of the flow of the fluid at the first section, and a second section 204 (diffusion section). When the cross-sectional area at the choke 202 is smaller than at the first section 201 of the pipe 200, the resulting reduced fluid pressure in the choke entrains or pulls the fluid from a secondary tubing, i.e., a suction tube 203 into the choke 202 and out through the second section 204 of the pipe. As used herein, a suction tube is a short pipe with a constricted inner surface used to pull or entrain a liquid wash solution in a chamber into the choke and out through the water inlet due to reduced pressure in the choke.

For the Venturi effect, the most important parameter is the ratio k, the constriction diameter (d) over the general diameter (D) of the pipe as shown in equation 1:

$$k=d/D \tag{1}$$

For the Venturi effect to function properly, it has been found that k can be in the range from about 0.15 to about 0.70. In general, the reduction in pressure in the choke increases as k becomes smaller. Other parameters for optimization of the Venturi effect include the length and the constriction angle ($\alpha$) and diffusion angle ($\beta$) of the choke, which can be modified to adjust how much reduced pressure is achieved. In particular, the diffusion angle can affect the degree of vacuum in the suction tube: as the diffusion angle decreases, the vacuum degree increases.

In the instant case, the reduced pressure in the choke can be used to pull in a liquid wash solution present in a first chamber and/or a second chamber into the water flow in a bidet washing apparatus.

Figure 30:
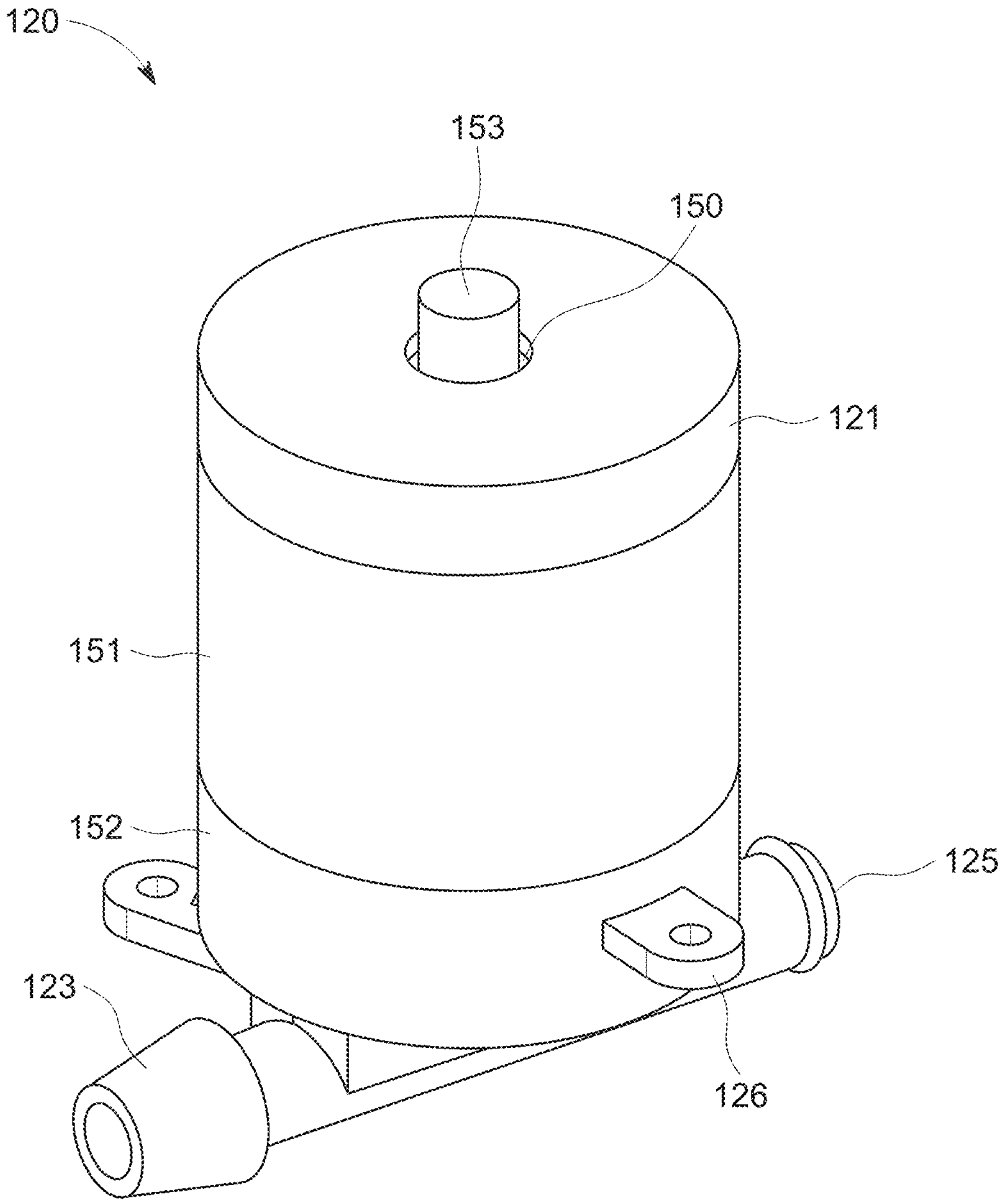
FIG. 30 illustrates an embodiment of a front view of a reservoir dispenser with a water inlet and water outlet, a choke and a suction tube therein.

FIG. 30 illustrates an embodiment of a front view of a reservoir dispenser 120 with a water inlet 123 and water outlet 125, and a choke 202 and a suction tube 203 therein. As shown, the reservoir dispenser 120 includes a first chamber 151, a second chamber 152, and a lid 121, which can be attached to a first chamber 151. In embodiments, the lid 121 can be permanently or reversibly attachable to the first chamber 151. Included within the lid 121 is an opening 150, in which a means for activation such as an activator 153 can fill and protrude therethrough. In some embodiments, the opening 150 can be centrally located within the lid 121. In other embodiments, the activator 153 can include a combination of the lid 121 and the first chamber 151.

As used herein, an "activator" includes but is not limited to a push-button, twist-button, pull up and push down button, a slide button, a plunger button, a lever, a knob, or other similar devices.

In embodiments, the activator 153 can be engaged by manually pushing it downwards to allow for the introduction of the liquid wash solution present in the first chamber 151 to pass into the suction tube 203.

Also shown in this figure is a securing mechanism or tab 126 for attaching the reservoir dispenser 120 to a bidet washing apparatus (not shown); and a water inlet 123 and water outlet 125 for the second chamber 152, which allows water to flow into and out of the second chamber, respectively.

Figure 31:
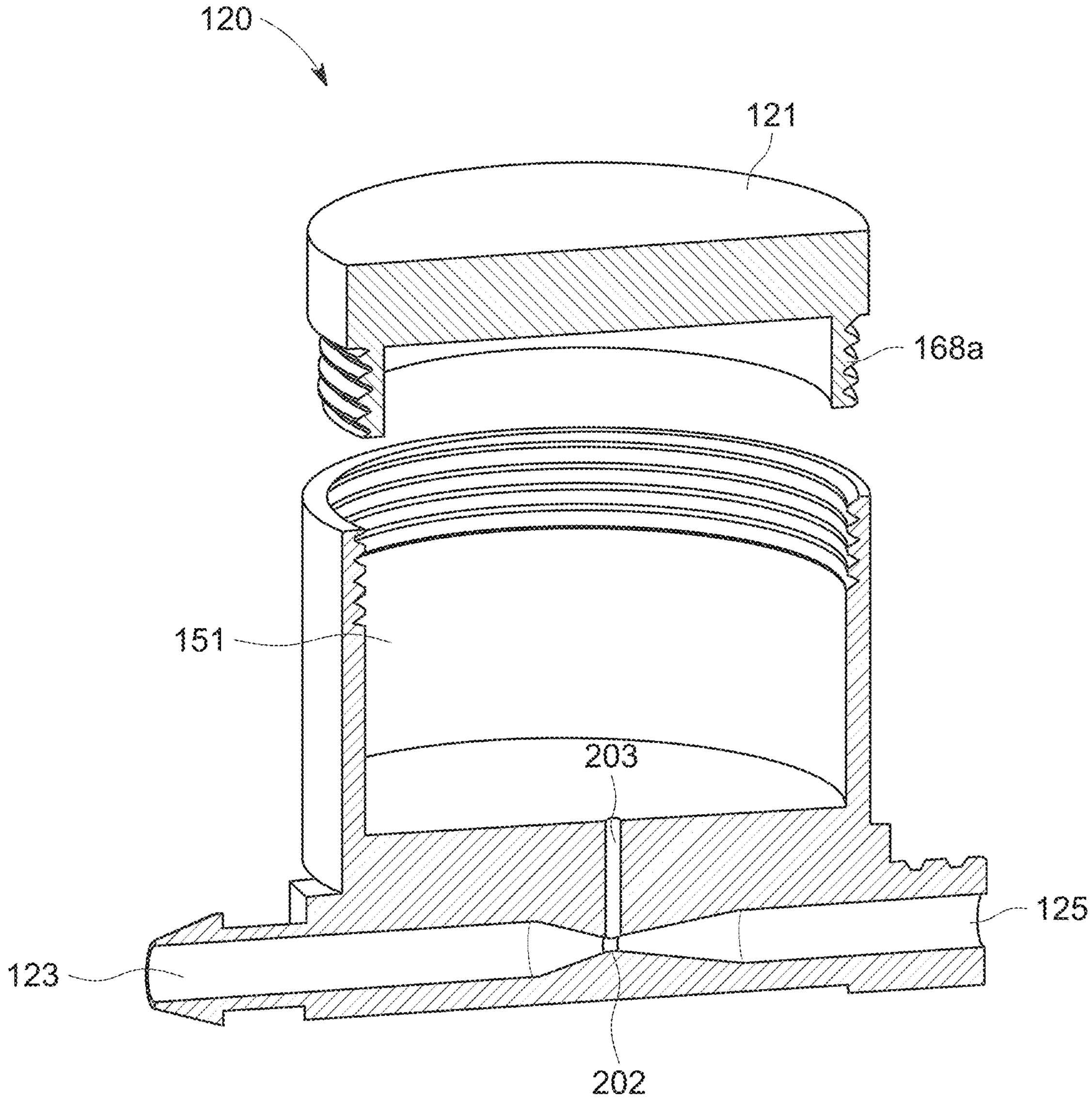
FIG. 31 illustrates an embodiment of a side cut-away view of a reservoir dispenser, which uses a suction tube to pull in a liquid wash solution present in a first chamber to water flowing between a water inlet and a water outlet.

FIG. 31 illustrates an embodiment of a side cut-away view of a reservoir dispenser 120, which uses a suction tube 203 to pull in a liquid wash solution present in a first chamber 151 to water flowing between the water inlet 123 and the water outlet 125 without the use of an activator. As shown, the flow of water follows a linear path through the choke 202, and the suction tube 203 can be vertically inclined relative to the choke. In other embodiments, the flow of water follows a circular path through the choke 202 and the suction tube 203 can be horizontally inclined relative to the choke.

As shown in this figure, the suction tube 203 can be fluidically joined with the choke 202 located between the water inlet 123 and water outlet 125. When water from the water inlet 123 flows through the choke 202, the resulting reduced pressure in the choke 202 entrains the liquid wash solution present in the first chamber 151 or second chamber 152, resulting in a flow of the wash solution out through the suction tube 203, into the choke 202 and out through the water outlet 125. In this embodiment, the water inlet 123, choke 202, and water outlet 125 are presented in a linear arrangement, however, other embodiments include a non-linear arrangement such as a V-shape or circular shape arrangement for these components.

The first chamber 151 can be reversibly connected to the lid 121 through a screw-on, threaded type mechanism 168*a*, or can be snapped on, or can be secured permanently or reversibly or by any other means known in the art. In addition, a gasket 185 can be used between the first chamber 151 and the lid 121, which prevents leakage of the liquid wash solution present in the first chamber 151.

Figure 32A:
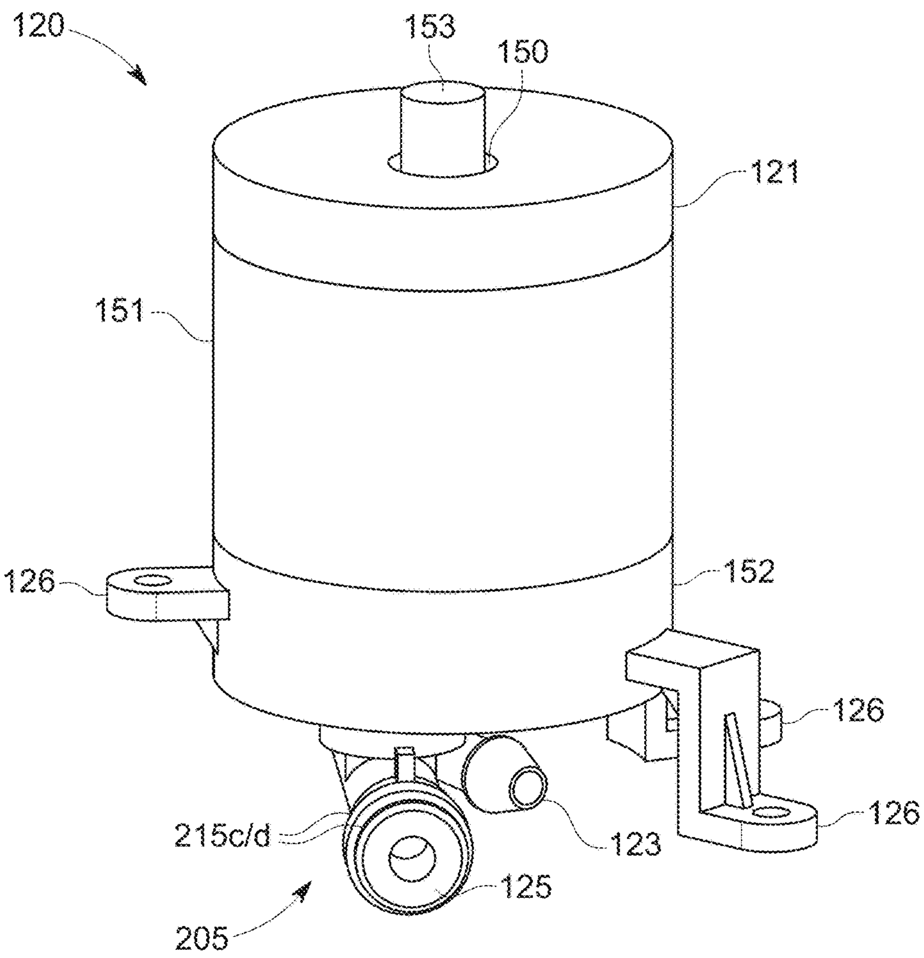
FIGS. 32A and 32B illustrate an embodiment of a front view of a reservoir dispenser, which includes a water inlet and water outlet forming a pipe, with a choke and a suction tube therein.
Figure 32B:
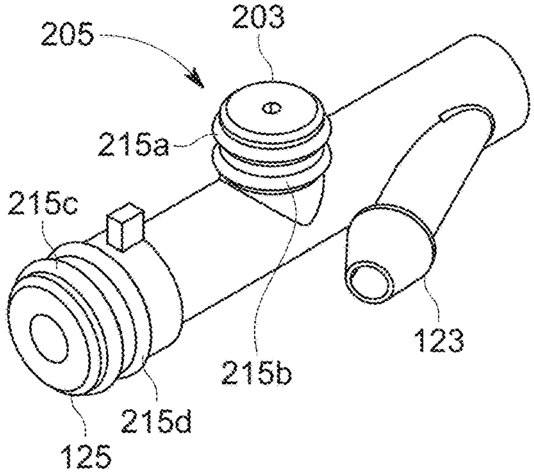

FIG. 32A illustrates an embodiment of a front view of a reservoir dispenser 120 with a water inlet 123 and water outlet 125 forming a connecting tube or pipe 205, with a choke 202 and a suction tube 203 therein; and FIG. 32B illustrates a cut-away view of the connecting tube or pipe 205 that is attachable to the reservoir dispenser. In embodiments, the connecting tube or pipe 205 can be U-shaped or V-shaped pipe to accommodate the water inlet 123 and water outlet 125 and size of the reservoir dispenser 120.

In embodiments, the connecting tube or pipe 205 can be permanently of reversibly attachable to the reservoir dispenser 120 through the suction tube 203 along with a series of O-rings 215*a* and 215*b*. In addition, another series of O-rings 215*c* and 215*d* can be included for attaching the water outlet 125 to a bidet washing apparatus (not shown).

As shown, the reservoir dispenser 120 includes a first chamber 151, a second chamber 152, and a lid 121, which can be attached to a first chamber 151. In embodiments, the lid 121 can be permanently or reversibly attachable to the first chamber 151.

Included within the lid 121 is an opening 150, in which a means for activation such as an activator 153 can fill and protrude therethrough. In some embodiments, the opening 150 can be centrally located within the lid 121. In other embodiments, the activator 153 can include a combination of the lid 121 and the first chamber 151. In embodiments, the activator 153 can be engaged, for example, by manually pushing it downwards to allow for the introduction of the liquid wash solution present in the first chamber 151 to pass into the second chamber 152 and out through the suction tube 203. Also shown in this figure is one or more securing mechanisms or tabs 126 for attaching the reservoir dispenser 120 to a bidet washing apparatus (not shown).

Figure 33:
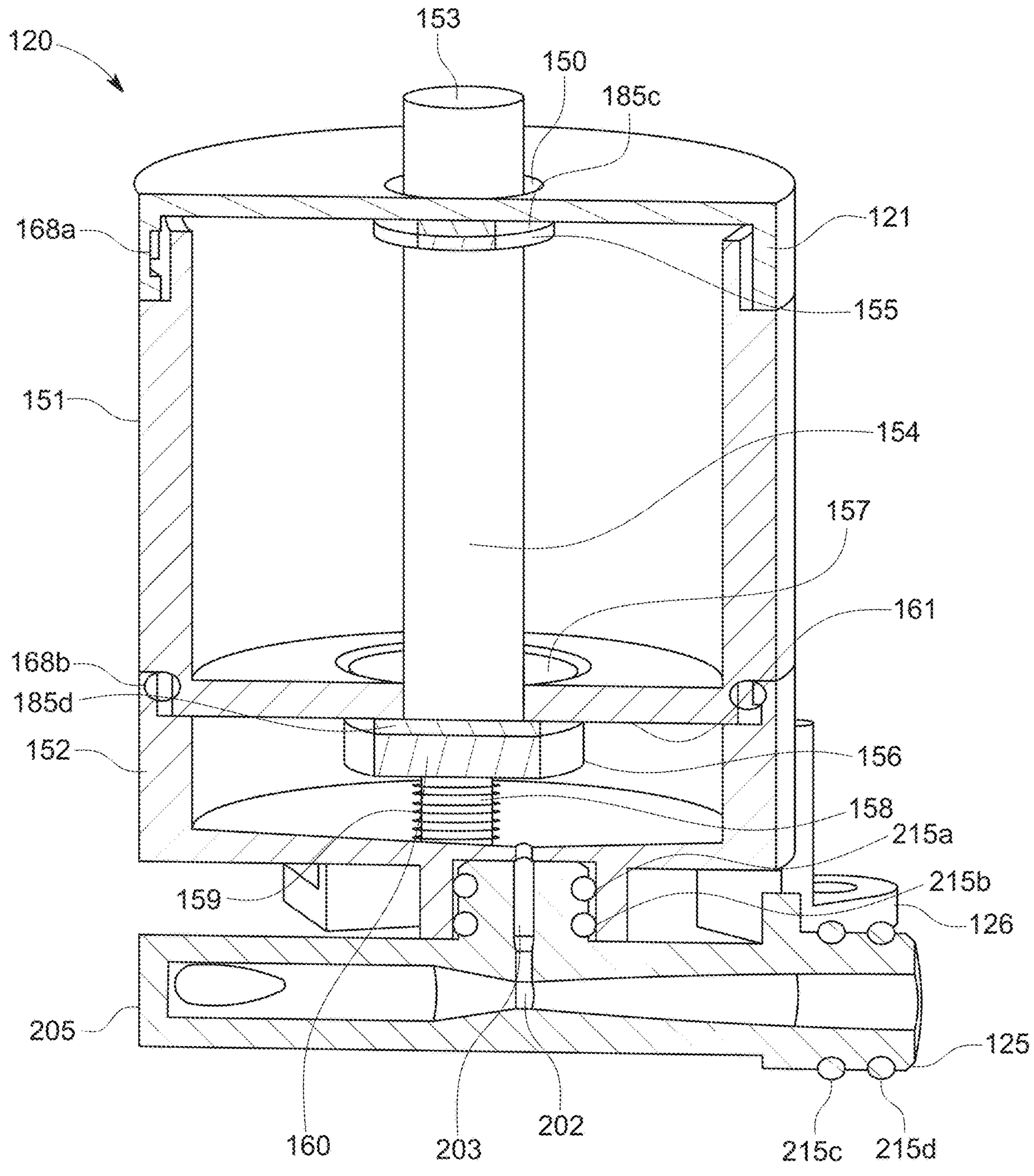
FIG. 33 illustrates an embodiment of a side cut-away view of a reservoir dispenser, which includes a water inlet and water outlet forming a pipe, with a choke and a suction tube therein when in an inactivated position.

FIG. 33 illustrates an embodiment of a side cut-away view of the reservoir dispenser 120 when in an inactivated position. As shown, the reservoir dispenser 120 includes the first chamber 151, the second chamber 152, the lid 121, the opening 150 with an activator 153 therethrough, and the connecting tube or pipe 205 with the choke 202, suction tube 203, O-rings 215*a* and 215*b*, water inlet 123, water outlet 125 and O-rings 215*c* and 215*d* attached thereto.

The first chamber 151 can be reversibly connected to the lid 121 through a screw-on, threaded type mechanism 168*a*, or can be snapped on, or can be secured permanently or reversibly or by any other means known in the art. Additionally, a gasket 185*a* can be used between the first chamber 151 and the lid 121, which prevents leakage of the liquid wash solution present in the first chamber 151.

The second chamber 152 can also be reversibly connected to the first chamber 151 through a screw-on, threaded type mechanism 168*b*, or can be snapped on, or can be secured permanently or reversibly or by any other means known in the art. Additionally, a gasket 185*b* can be used between the second chamber 152 and the first chamber 151, which prevents leakage of the liquid wash solution present in the first chamber 151.

As shown in this figure, the activator 153 includes an activator stem 154 with a stem top end piece 155 present in the first chamber 151, and a stem bottom end piece 156 present in the second chamber 152. Also shown is an opening 157 between the first chamber 151 and the second chamber 152, which surrounds the activator stem 154. A top gasket 185*c* can be located between the stem top end piece 155 and the lid 121; and a bottom gasket 185*d* can be located between the stem bottom end piece 156 and the ceiling 161 of the second chamber 152, thereby preventing any liquid wash solution present in the first chamber 151 from escaping through the opening 150 in the lid 121 or through to the second chamber 152, respectively.

In embodiments, the floor of the second chamber 152 can include a post 158 and a spring 159 that surrounds this post. In addition, the stem bottom end piece 156 can include a hollowed bottom opening or chamber 160, which allows the activator stem 154 to ride down and up on the spring 159 and post 158 configuration when the activator 153 is being activated or deactivated, respectively.

As shown in this figure, when the activator 153 is not engaged, i.e., when the activator is in the up position, the spring 159 surrounding the post 158 is elongated, which forces the stem bottom end piece 156 and bottom gasket 185*d* against the opening 157 and ceiling 161 of the second chamber 152, thereby preventing any liquid wash solution present in the first chamber 151 from entering the second chamber 152.

Figure 34:
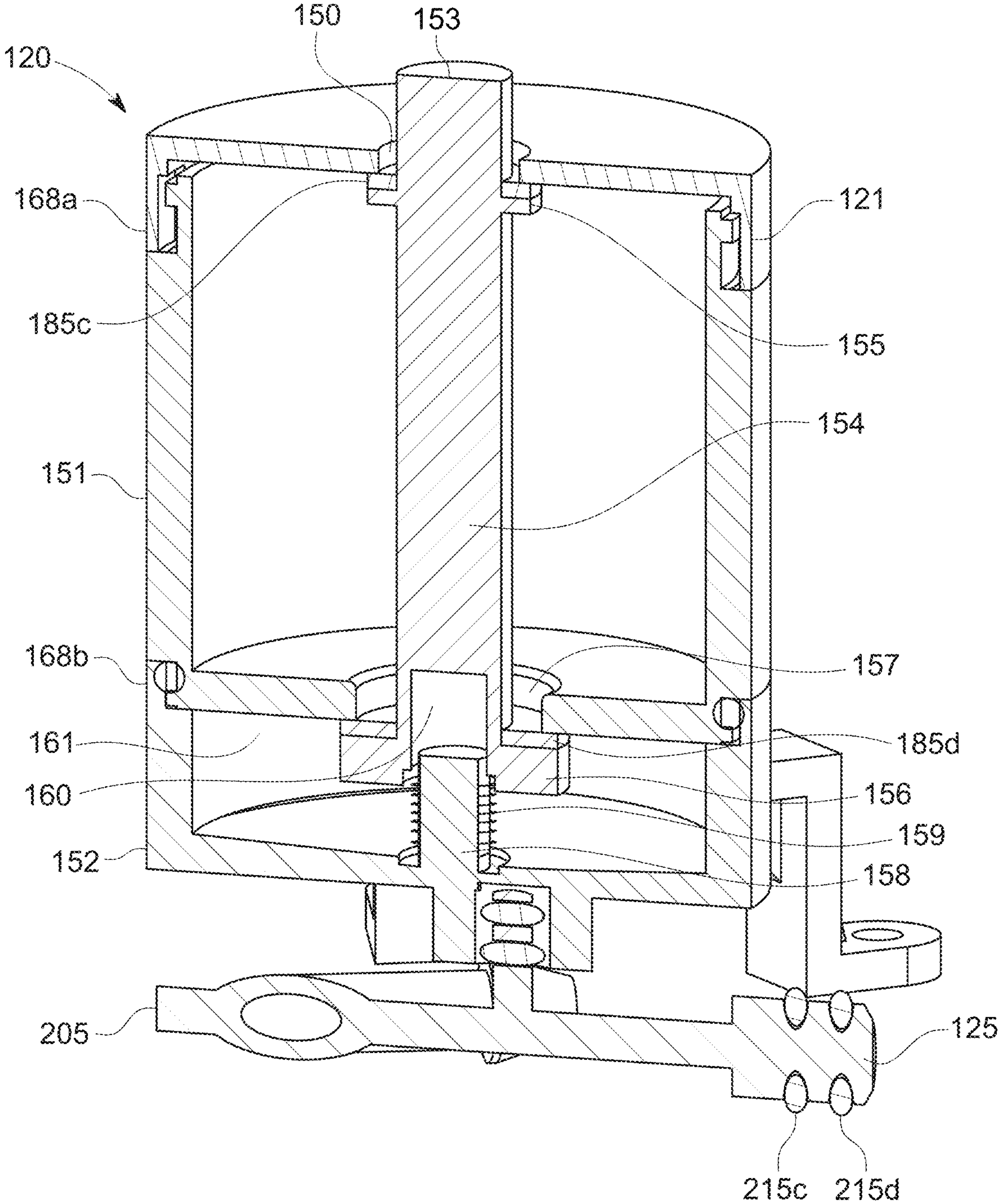
FIG. 34 illustrates an embodiment of a side cut-away view through the middle of the reservoir dispenser when in an inactivated position.

FIG. 34 illustrates an embodiment of a side cut-away view through the middle of the reservoir dispenser 120 when in an inactivated position. As shown, the floor of the second chamber 152 includes the post 158 and spring 159 that surrounds this post. In addition, the stem bottom end piece 156 includes the hollowed bottom opening or chamber 160, which allows the activator stem 154 to ride down and up on the spring 159 and post 158 configuration when the activator 153 is being activated or deactivated, respectively.

Figure 35:
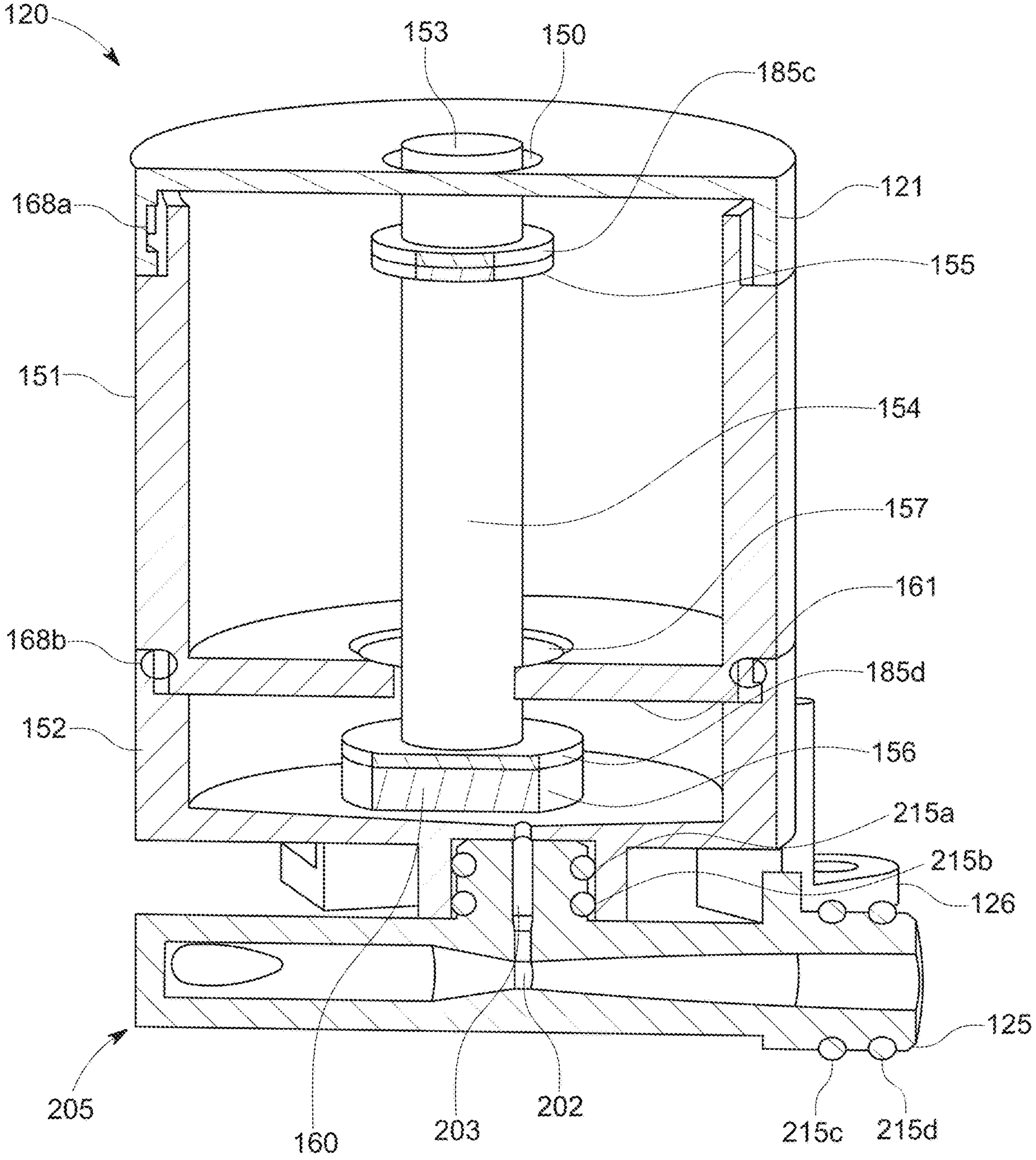
FIG. 35 illustrates an embodiment of a side cut-away view of a reservoir dispenser, which includes a water inlet and water outlet forming a pipe, with a choke and a suction tube therein when in an activated position.

FIG. 35 illustrates an embodiment of a side cut-away view of the reservoir dispenser 120 when in an activated position. As shown, the reservoir dispenser 120 includes the first chamber 151, the second chamber 152, the lid 121, the opening 150 with an activator 153 therethrough, and the connecting tube or pipe 205 with the choke 202, suction tube 203, O-rings 215*a* and 215*b*, water inlet 123, water outlet 125 and O-rings 215*c* and 215*d* attached thereto.

As shown in this figure, the activator 153 includes the activator stem 154 with the stem top end piece 155 present in the first chamber 151, and the stem bottom end piece 156 present in the second chamber 152. Also shown is the opening 157 between the first chamber 151 and the second chamber 152, which surrounds the activator stem 154. The top gasket 185*c* can be located between the stem top end piece 155 and the lid 121; and the bottom gasket 185*d* can be located between the stem bottom end piece 156 and the ceiling 161 of the second chamber 152, thereby preventing any liquid wash solution present in the first chamber 151 from escaping through the opening 150 in the lid 121, or through to the second chamber 152, respectively.

As shown in this figure, when the activator 153 is engaged, i.e., when the activator is in the down position, the spring 159 surrounding the post 158 is compressed, which allows the stem bottom end piece 156 and bottom gasket 185*d* to release against the ceiling 161 of the second chamber 152, thereby allowing any liquid wash solution present in the first chamber 151 to enter the second chamber 152.

Figure 36B:
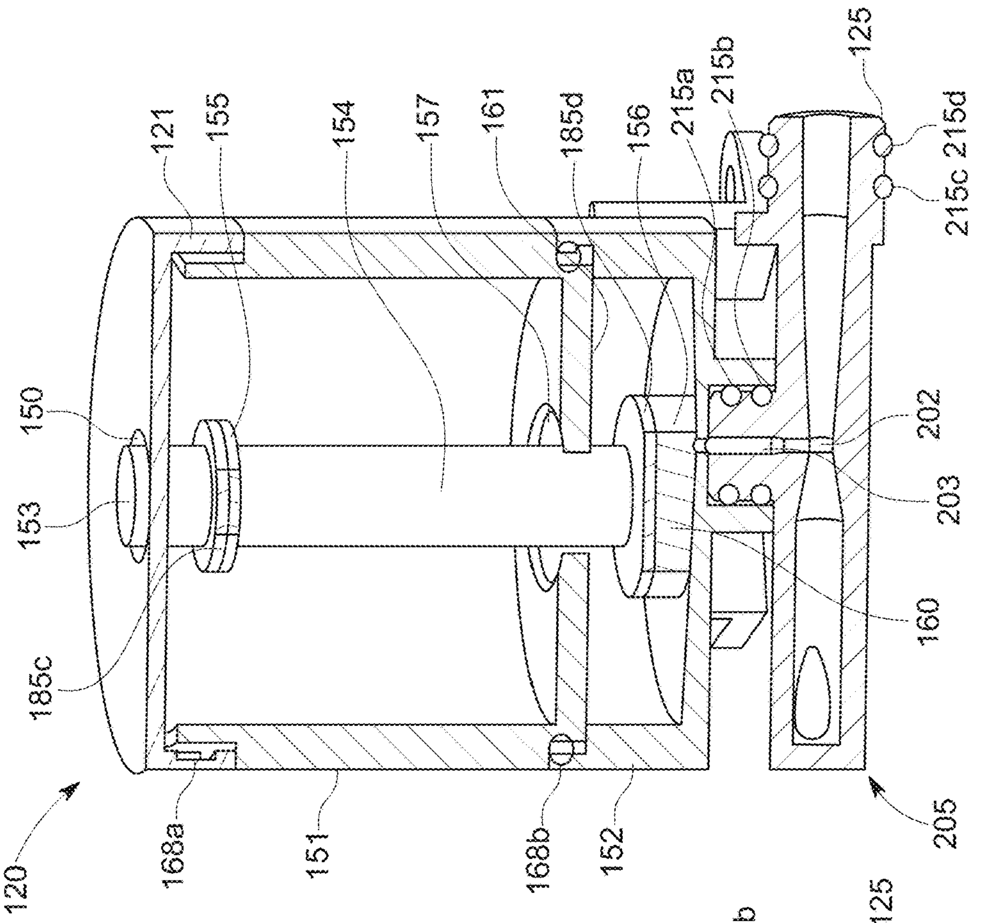
FIG. 36B illustrates an embodiment of a side cut-away view of the reservoir dispenser when in the activated position.
Figure 36A:
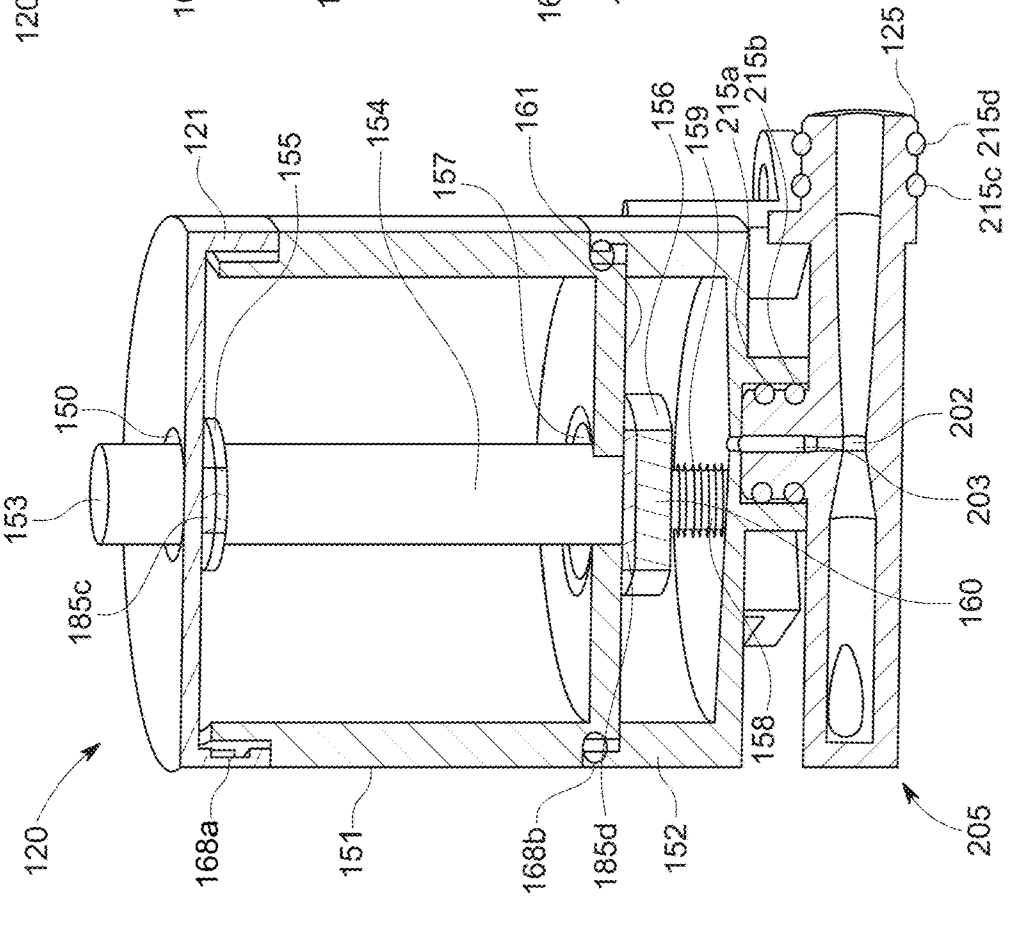
FIG. 36A illustrates an embodiment of a side cut-away view of the reservoir dispenser when in the inactivated position.

FIGS. 36A and 36B illustrate an embodiment of a side cut-away view of the reservoir dispenser 120, when in the inactivated position and in the activated position, respectively.

As shown in FIG. 36A, when the activator 153 is not engaged, i.e., when the activator is in the up position, the spring 159 surrounding the post 158 is elongated, which forces the stem bottom end piece 156 and bottom gasket 185*d* against the ceiling 161 of the second chamber 152, thereby preventing any liquid wash solution present in the first chamber 151 from entering the second chamber 152.

As shown in FIG. 36B, when the activator 153 is engaged, i.e., when the activator is in the down position, the spring 159 surrounding the post 158 is compressed, which allows the stem bottom end piece 156 and bottom gasket 185*d* to release against the ceiling 161 of the second chamber 152, thereby allowing any liquid wash solution present in the first chamber 151 to pass into the second chamber 152 through the opening 157 between these chambers, wherein the passed liquid wash solution can be pulled into the suction tube 203, the choke 202 and the water outlet 125 through the Venturi effect.

Figure 37:
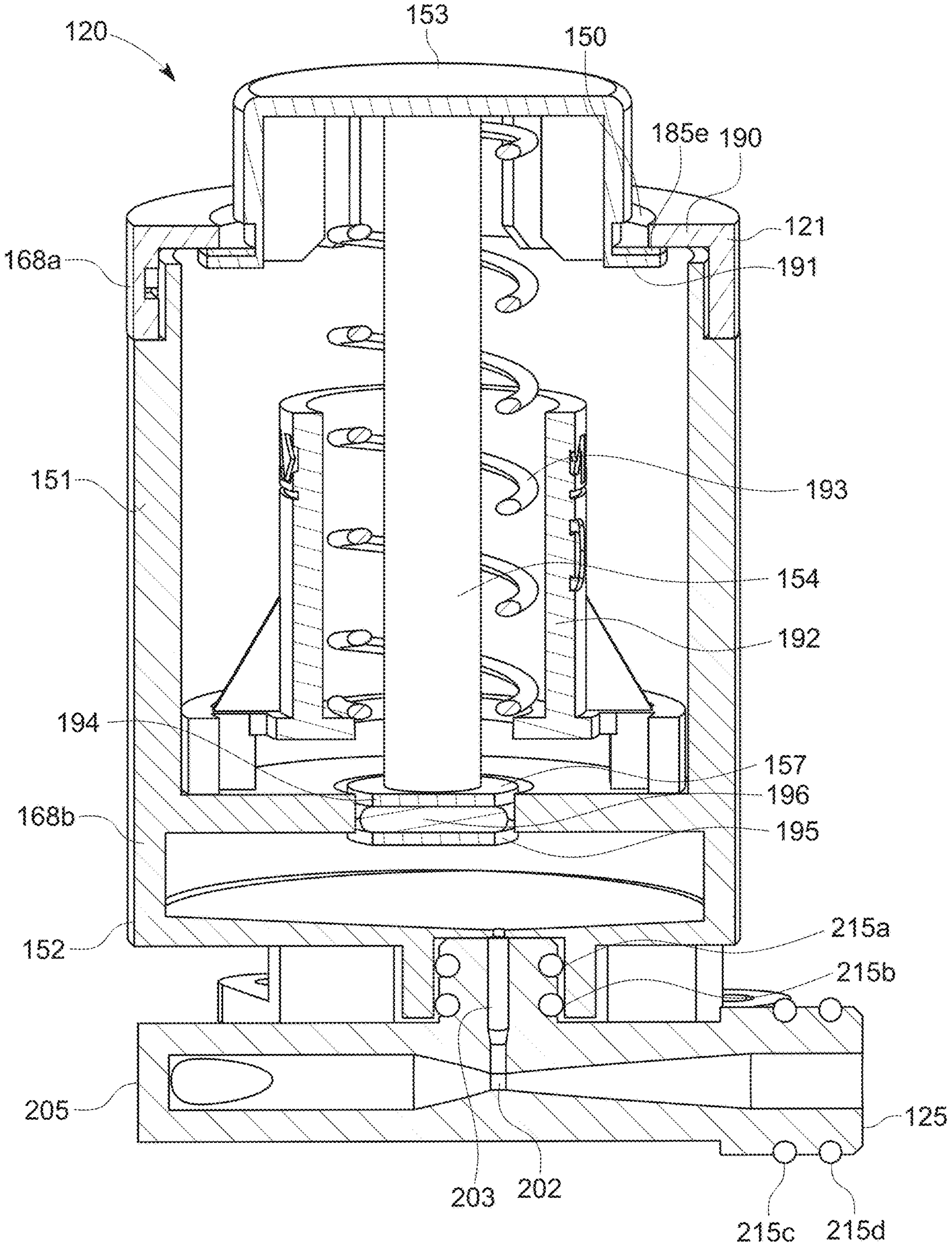
FIG. 37 illustrates another embodiment of a side cut-away view of the reservoir dispenser which includes a water inlet and water outlet forming a pipe, with a choke and a suction tube therein when in an inactivated position.

FIG. 37 illustrates another embodiment of a side cut-away view of the reservoir dispenser 120 when in an inactivated position. As shown, the reservoir dispenser 120 includes the first chamber 151, the second chamber 152, the lid 121, the opening 150 with the activator 153 therethrough, and the connecting tube or pipe 205 with the choke 202, suction tube 203, O-rings 215*a* and 215*b*, water inlet 123, water outlet 125 and O-rings 215*c* and 215*d* attached thereto.

The first chamber 151 can be reversibly connected to the lid 121 through a screw-on, threaded type mechanism 168*a*, or can be snapped on, or can be secured permanently or reversibly or by any other means known in the art. Additionally, a gasket 185*a* can be used between the first chamber 151 and the lid 121, which prevents leakage of the liquid wash solution present in the first chamber 151.

The second chamber 152 can also be reversibly connected to the first chamber 151 through a screw-on, threaded type mechanism 168*b*, or can be snapped on, or can be secured permanently or reversibly or by any other means known in the art. Additionally, a gasket 185*b* can be used between the second chamber 152 and the first chamber 151, which prevents leakage of the liquid wash solution present in the first chamber 151.

As shown in this figure, activator 153 includes an activator stem 154 with a stem lower end piece 194 present in the first chamber 151, a stem bottom end piece 195 present in the second chamber 152, and a gasket 196 located between the stem lower end piece 194 and the stem bottom end piece 195 and in the opening 157 between first and second chambers. The activator 153 includes an activator lip 191, which interacts with a lid lip 190 of the lid 121. Also shown is an activator guide 192, which supports and guides the activator stem 154. Encircling the activator stem 154 is a spring 193, which is situated between the base of the activator guide 192 and the lid 121. An upper gasket 185*e* can be located between the activator lip 191 and the lid lip 190, thereby preventing any liquid wash solution present in the first chamber 151 from escaping through the opening 150 in the lid 121. In addition, the stem lower end piece 194 is flush with the floor of the first chamber 151, and the gasket 196 sandwiched between the stem lower end piece 194 and the stem bottom end piece 195 prevents any liquid wash solution present in the first chamber 151 from escaping through to the second chamber 152.

As shown in this figure, when the activator 153 is not engaged, i.e., when the activator is in the up position, the spring 193 surrounding the activator stem 154 is elongated, which causes the stem lower end piece 194 to be flush with the floor of the first chamber 151, and the gasket 196 sandwiched between the stem lower end piece 194 and the stem bottom end piece 195 acts as a barrier thereby preventing any liquid wash solution present in the first chamber 151 from entering the second chamber 152 through the opening 157.

Figure 38:
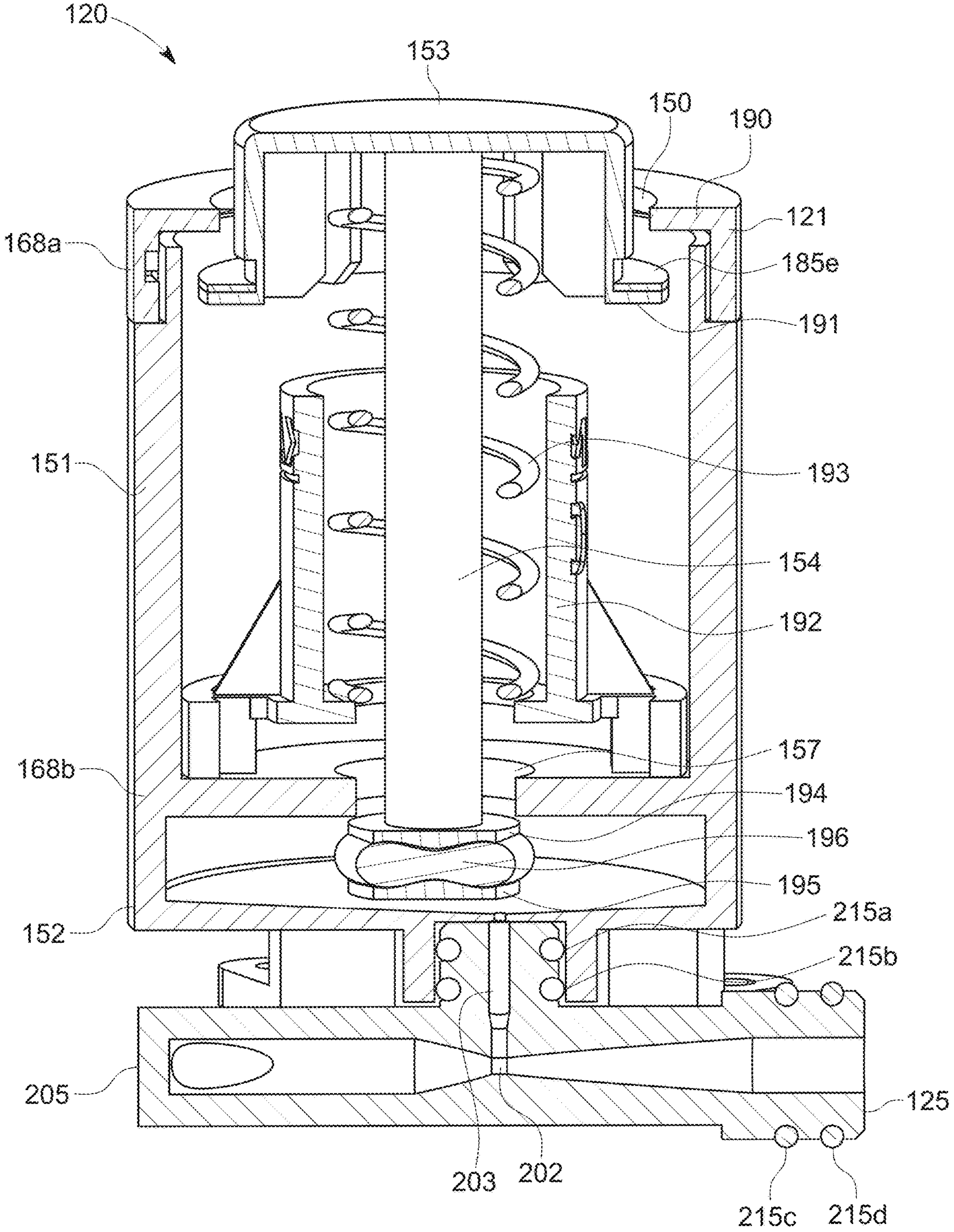
FIG. 38 illustrates another embodiment of a side cut-away view of the reservoir dispenser which includes a water inlet and water outlet forming a pipe, with a choke and a suction tube therein when in an activated position.

FIG. 38 illustrates another embodiment of a side cut-away view of the reservoir dispenser which includes a water inlet and water outlet forming a V-shaped pipe, with a choke and a suction tube therein when in an activated position. As shown, the reservoir dispenser 120 includes the first chamber 151, the second chamber 152, the lid 121, the opening 150 with an activator 153 therethrough, and the connecting tube or pipe 205 with the choke 202, suction tube 203, O-rings 215*a* and 215*b*, water inlet 123, water outlet 125 and O-rings 215*c* and 215*d* attached thereto.

As shown in this figure, the activator 153 includes the activator stem 154 with the stem lower end piece 194, the stem bottom end piece 195, and the gasket 196 all present in the second chamber 152, with the opening 157 cleared between first chamber 151 and the second chamber 152. When activated, the lid lip 190 separates from the activator lip 191 and the activator stem 154 is depressed downwards. Also shown is the activator guide 192, which supports and guides the activator stem 154. Encircling the activator stem 154 is a spring 193, which is situated between the base of the activator guide 192 and the lid 121. In addition, the stem lower end piece 194, the gasket 196 and the stem bottom end piece 195 are pressed below the floor of the first chamber 151 thereby allowing any liquid wash solution present in the first chamber 151 to enter the second chamber 152 through the opening 157.

Figure 39B:
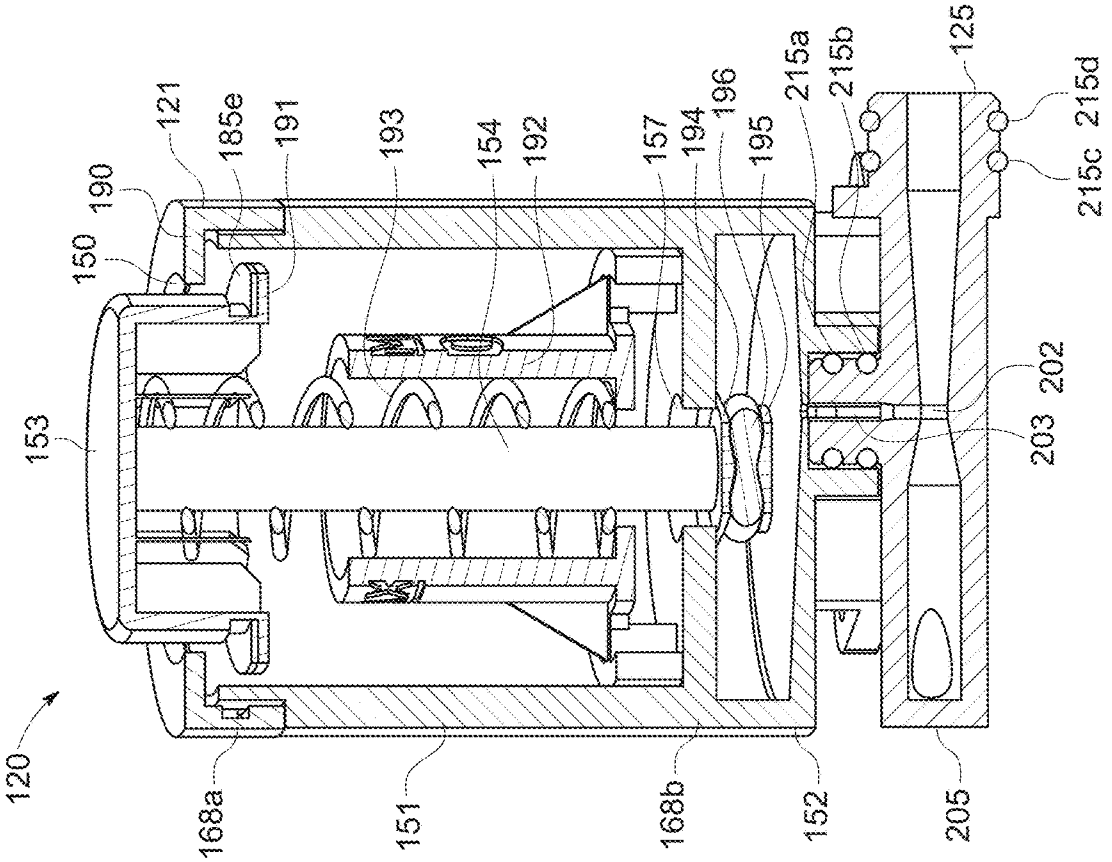
FIG. 39B illustrates an embodiment of a side cut-away view of the reservoir dispenser when in the activated position.
Figure 39A:
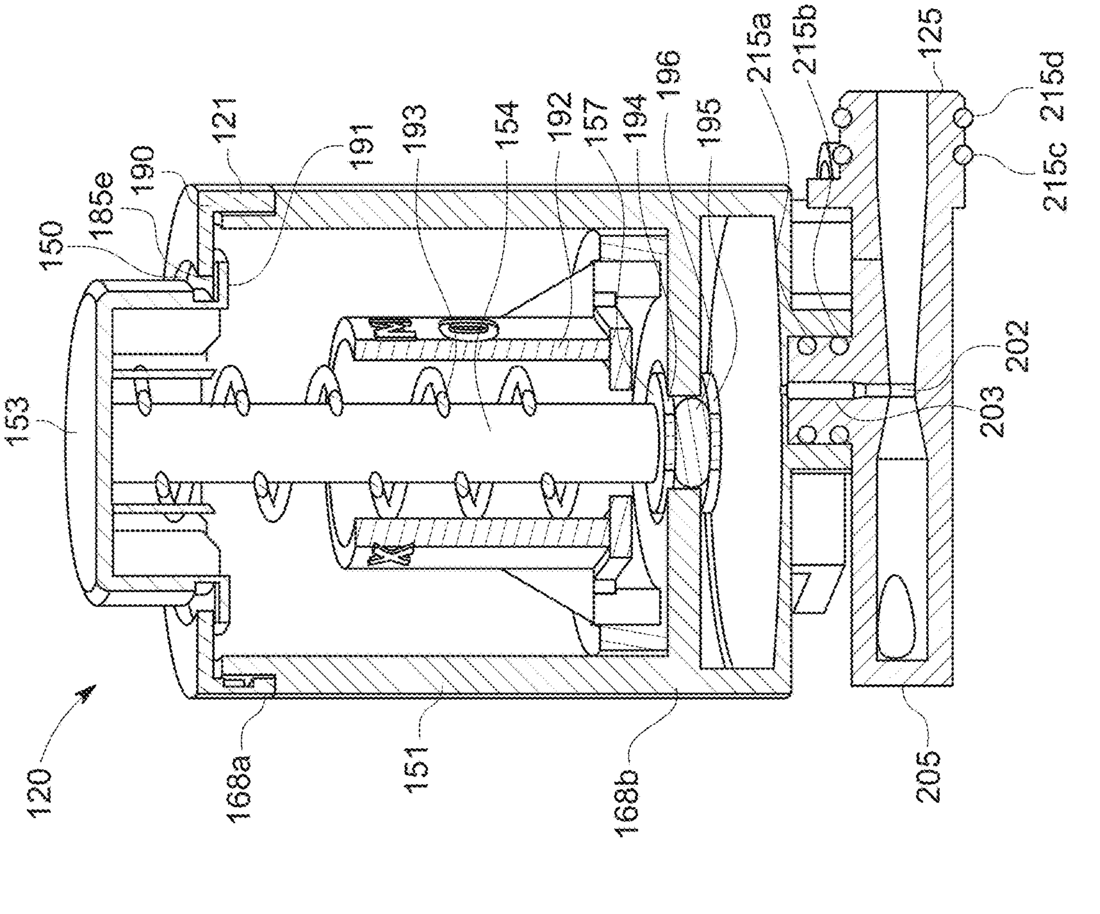
FIG. 39A illustrates an embodiment of a side cut-away view of the reservoir dispenser when in the inactivated position.

FIGS. 39A and 39B illustrate an embodiment of a side cut-away view of the reservoir dispenser 120, when in the inactivated position and in the activated position, respectively.

As shown in FIG. 39A, when the activator 153 is not engaged, i.e., when the activator is in the up position, the spring 193 surrounding the activator stem 154 is elongated, which forces the stem bottom lower end piece 194, stem bottom end piece 195, and the gasket 196 to block the opening 157 between the first chamber 151 and the second chamber 152, thereby preventing any liquid wash solution present in the first chamber from entering the second chamber.

As shown in FIG. 39B, when the activator 153 is engaged, i.e., when the activator is in the down position, the spring 193 surrounding the activator stem 154 is compressed, which causes the stem lower end piece 194, the gasket 196, and the stem bottom end piece 195 to enter the second chamber 152. This allows the opening 157 between the first chamber 151 and the second chamber 152 to be cleared and any liquid wash solution present in the first chamber can pass into the second chamber, wherein the passed liquid wash solution can be pulled into the suction tube 203, the choke 202 and the water outlet 125 through the Venturi effect.

In another embodiment, the disclosure provides a reservoir dispenser with a shaft having an external bar, handle, or knob, which can be manually turned to open and close the chamber and its liquid wash solution contents to the suction tube of the connecting tube or pipe.

As previously described, FIG. 32B illustrates a cut-away view of the connecting tube or pipe 205 attached to a reservoir dispenser 120. The connecting tube or pipe 205 can be U-shaped or V-shaped pipe to accommodate the water inlet 123, water outlet 125 and the size of the reservoir dispenser 120. The connecting tube or pipe 205 includes the suction tube 203, which connects to the choke 202, the water inlet 123 and water outlet 125. The connecting tube or pipe 205 can be permanently or reversibly attached to the reservoir dispenser 120 through the suction tube 203 along with a series of O-rings 215*a* and 215*b*. In addition, another series of O-rings 215*c* and 215*d* can be used for attaching the water outlet 125 to a bidet washing apparatus (not shown).

Figure 40:
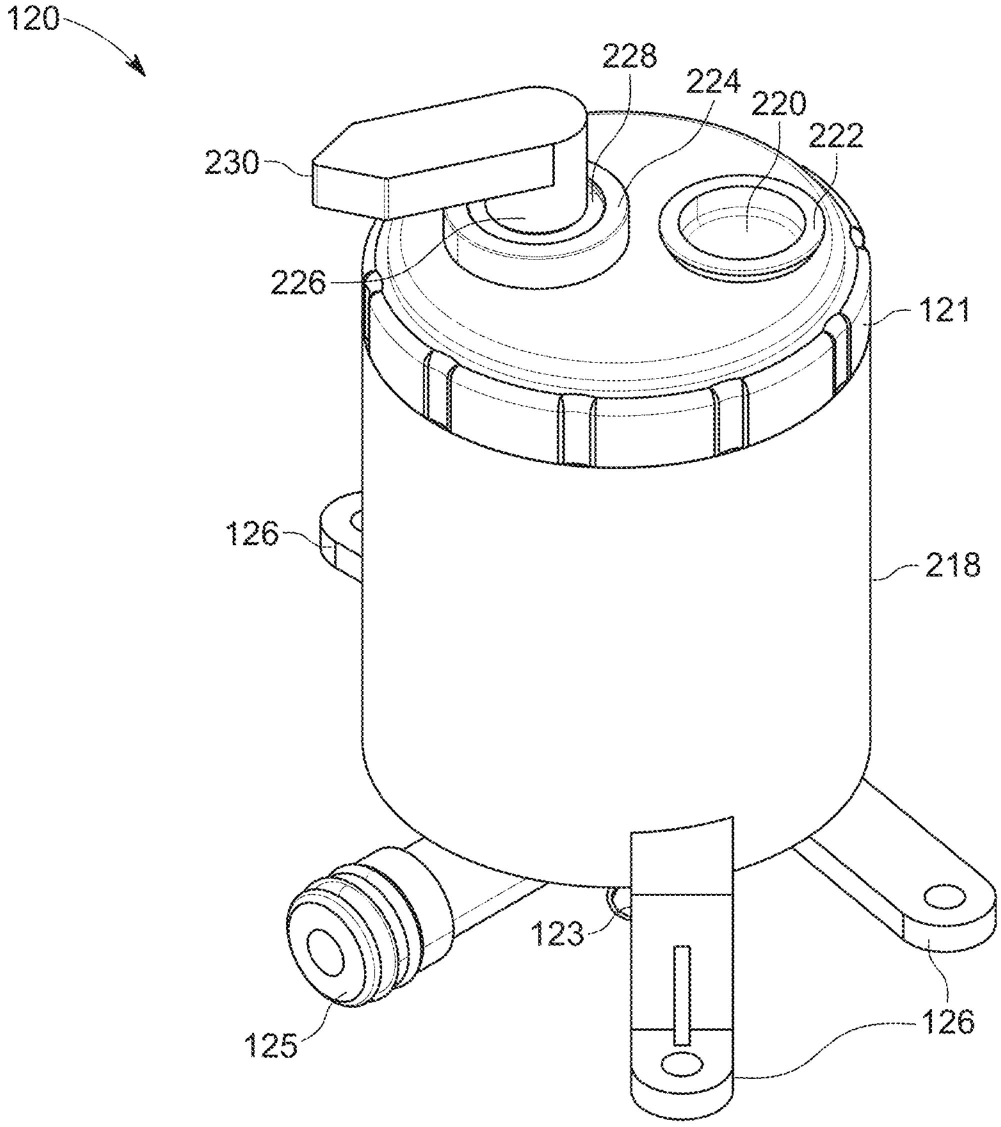
FIG. 40 illustrates an embodiment of a front view of a reservoir dispenser with a water inlet and water outlet, which forms a connecting tube or pipe with a choke and a suction tube therein.

FIG. 40 illustrates an embodiment of a front view of a reservoir dispenser 120 with a water inlet 123 and water outlet 125, which forms a connecting tube or pipe 205 with a choke 202 and a suction tube 203 therein (not shown). The reservoir dispenser 120 includes a chamber 218 and a lid 121, which can be reversibly or permanently attached to the chamber. Also shown in this figure are one or more securing mechanisms or tabs 126 for attaching the reservoir dispenser 120 to a bidet washing apparatus (not shown).

Included within the lid 121 is a lid opening 220 and optionally, a removable lid cover 222 for reversibly sealing the lid opening. The lid opening 220 can be centrally located or placed off-center of the lid 121. The lid opening 220 allows for entry of a liquid wash solution into the chamber 218. That is, the lid 121 need not be removed during refilling, and need only be removed for repair. The lid 121 can also include snap fit slots for easy removal (not shown).

The lid 121 can also include a shaft opening 224, in which a shaft 226 can protrude therethrough. The shaft 226 can extend from an external bar 230 down to an internal distal rubber gasket 232 in the chamber 218. In some embodiments, the bar 230 can be a handle, a knob and the like. That is, the shaft 226 can pass through the shaft opening 224 down into the chamber 218, and end with a distal rubber gasket 232, which can be used to seal the chamber 218 and its liquid wash solution contents from the suction tube 203. The shaft opening 224 and the shaft 226 can further include complimentary threads, i.e. shaft threads 234 and shaft opening threads 236, which allows the bar 230 to be manually turned and the shaft 226 to ride up and down these threads.

In embodiments, the shaft 226 and distal rubber gasket 232 can be lowered into the chamber 218 and pressed against the suction tube 203, for example, by manually turning the bar 230 in one direction, which seals off the liquid wash solution present in the chamber 218 from the suction tube 203 and the connecting tube or pipe 205. Conversely, manually turning the bar 230 in an opposite direction raises the shaft 226 and rubber gasket 232 from the suction tube 203, which opens the liquid wash solution present in the chamber 218 to the suction tube 203 and the connecting tube or pipe 205. The bar 230 can also serve as a pointer or indicator as to whether the chamber 218 is open or closed to the suction tube 203.

Figure 41:
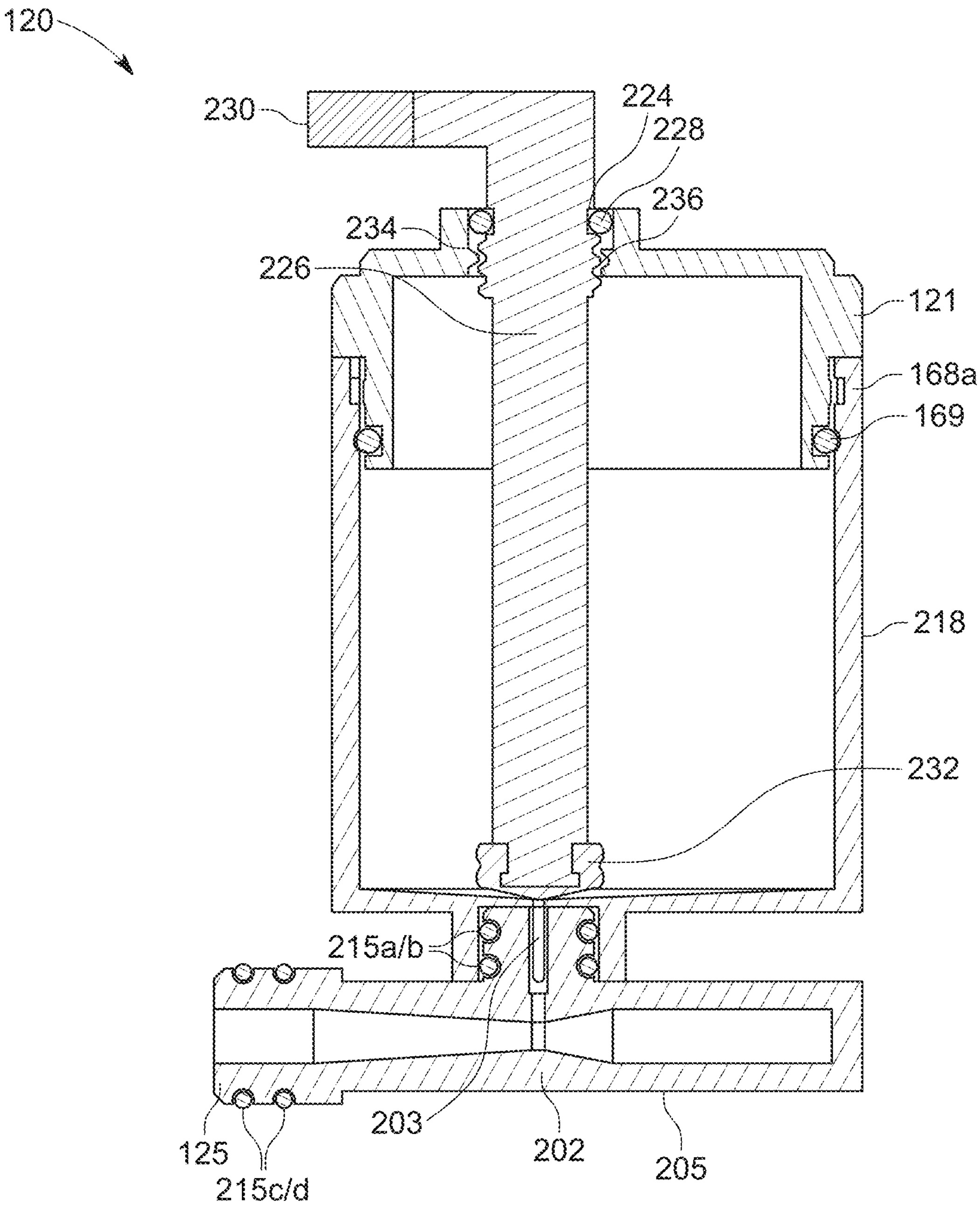
FIG. 41 illustrates an embodiment of a side cut-away view of a reservoir dispenser in an inactivated or closed position.

FIG. 41 illustrates an embodiment of a side cut-away view of the reservoir dispenser 120 in an inactivated or closed position, i.e., with the shaft 226 and rubber gasket 232 pressed against the suction tube 203. As shown, the reservoir dispenser 120 includes the lid 121, the chamber 218, the water inlet 123, the water outlet 125, O-rings 215*a*, 215*b*, 215*c*, 215*d*, and the connecting tube or pipe 205 containing the suction tube 203 and choke region 202.

The chamber 218 can be reversibly connected to the lid 121 through a screw-on, threaded type mechanism 168*a*, or can be snapped on, or can be secured permanently or reversibly or by any other means known in the art. Additionally, an O-ring 169 can be used between the chamber 218 and the lid 121, which prevents leakage of the liquid wash solution present in the chamber.

As shown in FIG. 41, the shaft 226 can extend downwards from the bar 230, through the shaft opening 224 and surrounding O-ring 228, and into the chamber 218 down to the distal rubber gasket 232. The distal rubber gasket 232 can press against and close the suction tube 203. The shaft threads 234 and the shaft opening threads 236 allows the shaft 262 and rubber gasket 232 to move up and down in the chamber 218 when the bar 230 is manually turned.

Figure 42A:
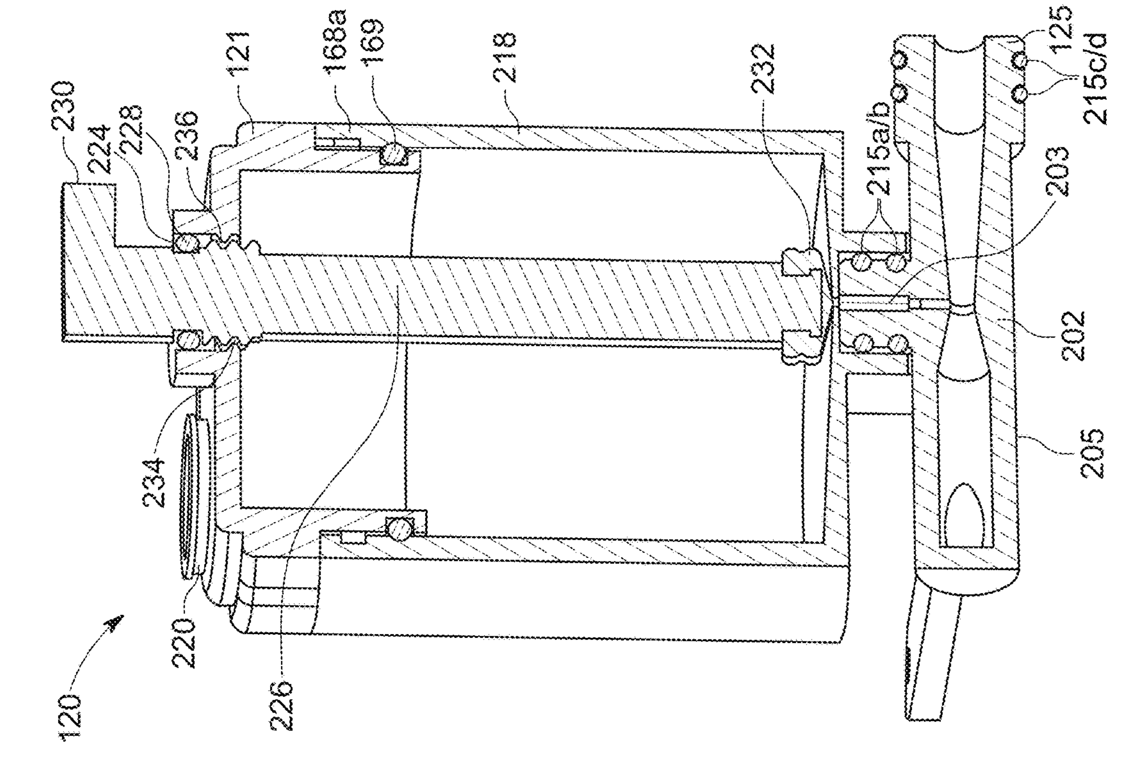
FIG. 42A illustrates an embodiment of a side cut-away view of a reservoir dispenser in an inactivated or closed position.
Figure 42B:
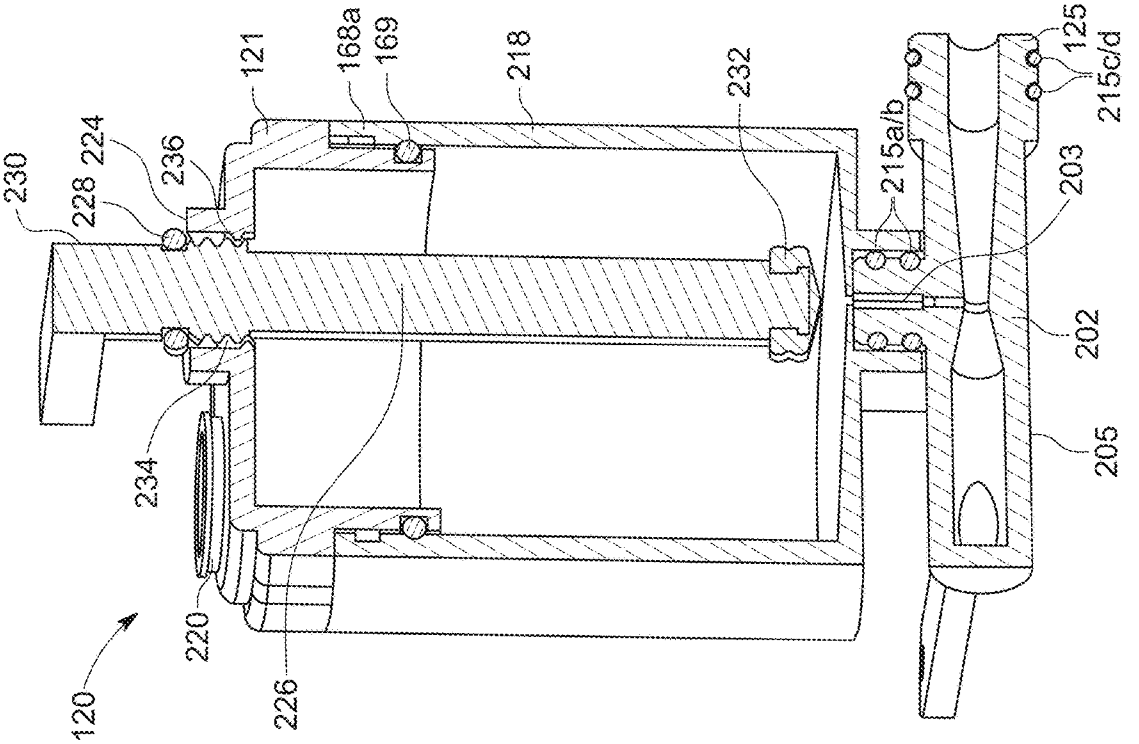
FIG. 42B illustrates an embodiment of a side cut-away view of a reservoir dispenser in an activated or opened position.

FIGS. 42A and 42B illustrate an embodiment of a side cut-away view of the reservoir dispenser 120 in an inactivated and activated position, respectively. As shown in these figures, the reservoir dispenser includes the lid 121, the water inlet 123, the water outlet, 125, the securing mechanisms 126, the chamber 218, the junction 168*a*, the O-ring 169, the choke 202, the suction tube 203, the connecting tube or pipe 205, the O-rings 215*a*, 215*b*, 215*c*, and 215*d*, the lid opening 220, the lid cover 222, the shaft opening 224, the shaft 226, the O-ring 228, the bar 230, the complimentary threads, i.e., shaft threads 234 and shaft opening threads 236, and the rubber gasket 232 as previously described.

As shown in FIG. 42A, when in the inactivated or closed position, the rubber gasket 232 on the distal end of shaft 226, is located on top of the suction tube 203, which thereby closes off the chamber and its contents of liquid wash solution from the suction tube. Conversely, when the bar 230 is manually turned as shown in FIG. 42B in an activated or opened position, the complimentary threads, i.e., shaft threads 234 and shaft opening threads 236, allow the shaft 226 and rubber gasket 232 to ride up in the chamber 218 thereby causing the suction tube 203 to open allowing the liquid wash solution present in the chamber 218 to be pulled through to the water outlet 125 by virtue of the Venturi effect.

In another embodiment, the disclosure provides a reservoir dispenser having a lid connected to a shaft, which can act as a dial to manually turn the shaft to open and close the chamber and its liquid wash solution contents to the suction tube of the connecting tube or pipe.

Figure 43:
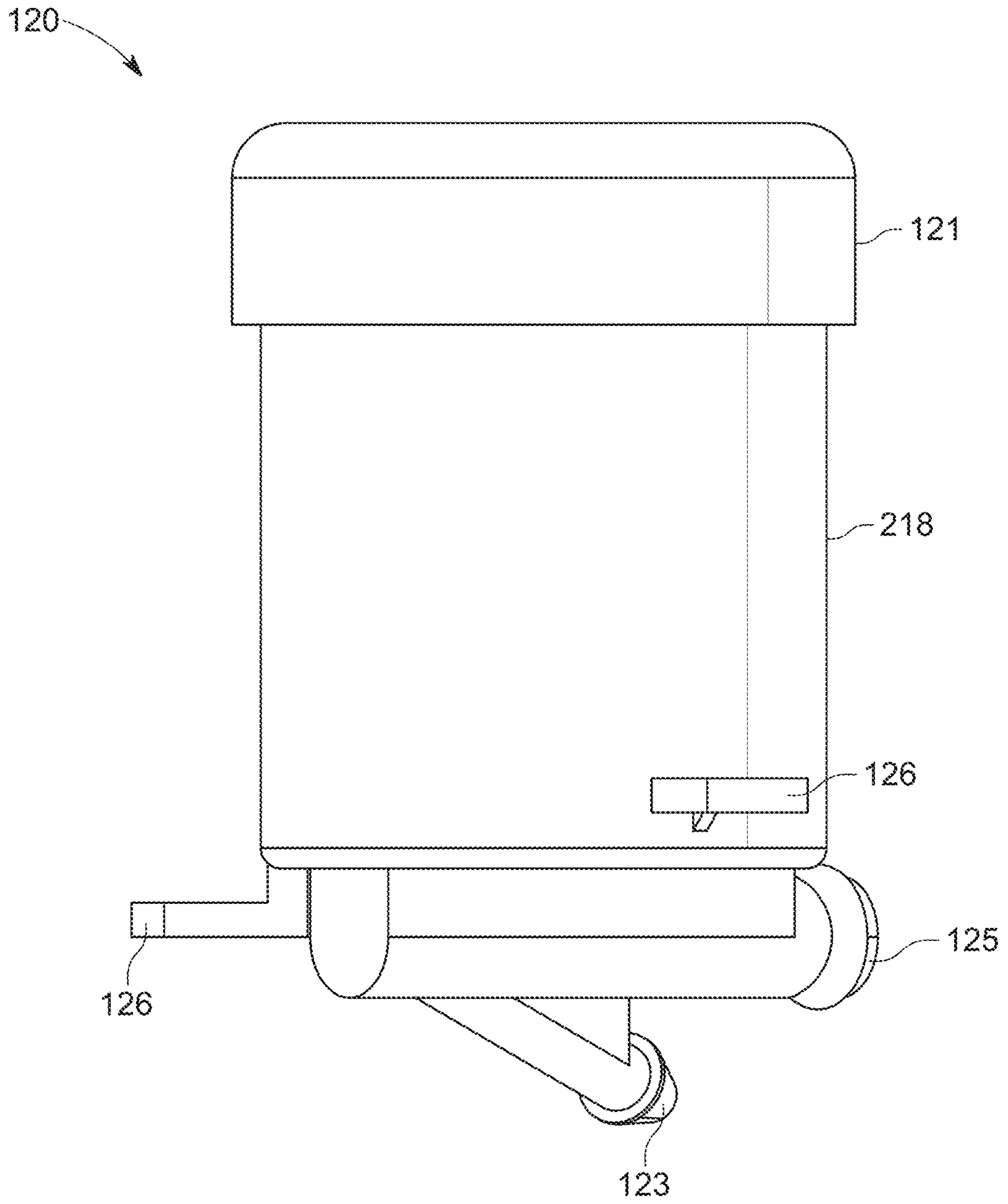
FIG. 43 illustrates an embodiment of a front view of a reservoir dispenser with a water inlet and water outlet, which forms a connecting tube or pipe with a choke and a suction tube therein.

FIG. 43 illustrates an embodiment of a front view of a reservoir dispenser 120 with a water inlet 123 and water outlet 125, which forms a connecting tube or pipe 205, with a choke 202 and a suction tube 203 therein (not shown). The reservoir dispenser 120 includes a chamber 218 and a lid 121, which can be reversibly or permanently attached to the chamber. Also shown in this figure are one or more securing mechanisms or tabs 126 for attaching the reservoir dispenser 120 to a bidet washing apparatus (not shown).

Figure 44:
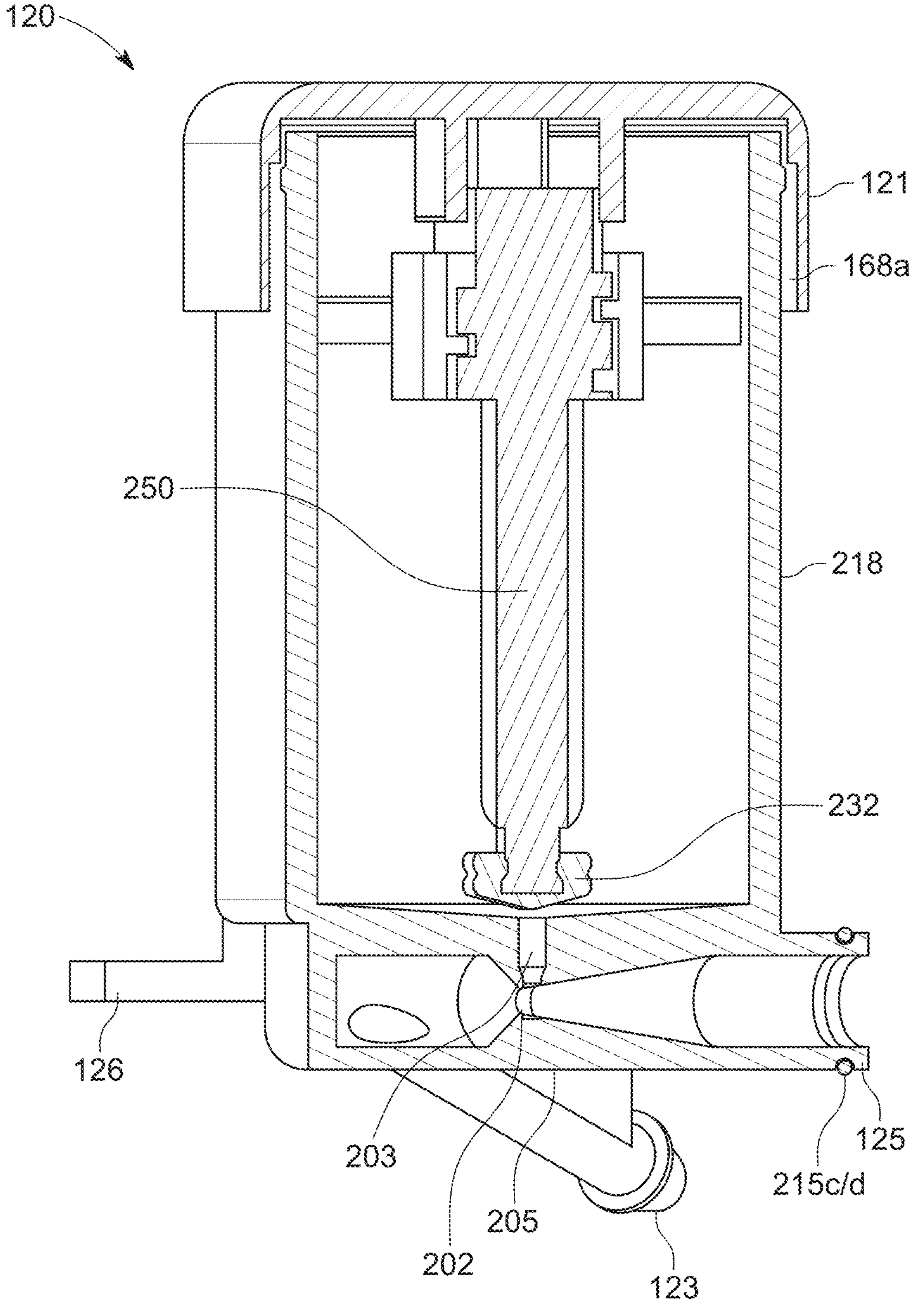
FIG. 44 illustrates an embodiment of a side cut-away view of a reservoir dispenser in an inactivated position.

FIG. 44 illustrates an embodiment of a side cut-away view of the reservoir dispenser 120 in an inactivated position, i.e., with the shaft 250 and rubber gasket 232 pressed against the suction tube 203. As shown, the reservoir dispenser 120 includes the lid 121, the chamber 218, the water inlet 123, the water outlet 125, O-rings 215*c* and 215*d*, and the connecting tube or pipe 205 containing the suction tube 203 and choke region 202.

The chamber 218 can be reversibly connected to the lid 121 through a screw-on, threaded type mechanism 168*a*, or can be snapped on, or can be secured permanently or reversibly or by any other means known in the art.

As described herein, by manually turning the lid 121, the shaft 250 can be raised or lowered against the opening of the suction tube 203 thereby allowing the liquid wash solution present in the chamber 218 to be pulled into the connecting tube or pipe 205 by virtue of the Venturi effect or can be cut off from the connecting tube or pipe and remain in the chamber, respectively.

The shaft 250 can extend downwards from the lid 121 through the chamber 218, down to a distal rubber gasket 232 attached thereto. The distal rubber gasket 232 can press against and close the suction tube 203. In some embodiments, there is a drive mechanism (described below) between the lid and shaft that allows the shaft to move up and down in the chamber 218 when the lid 121 is dialed or turned.

Figure 45:
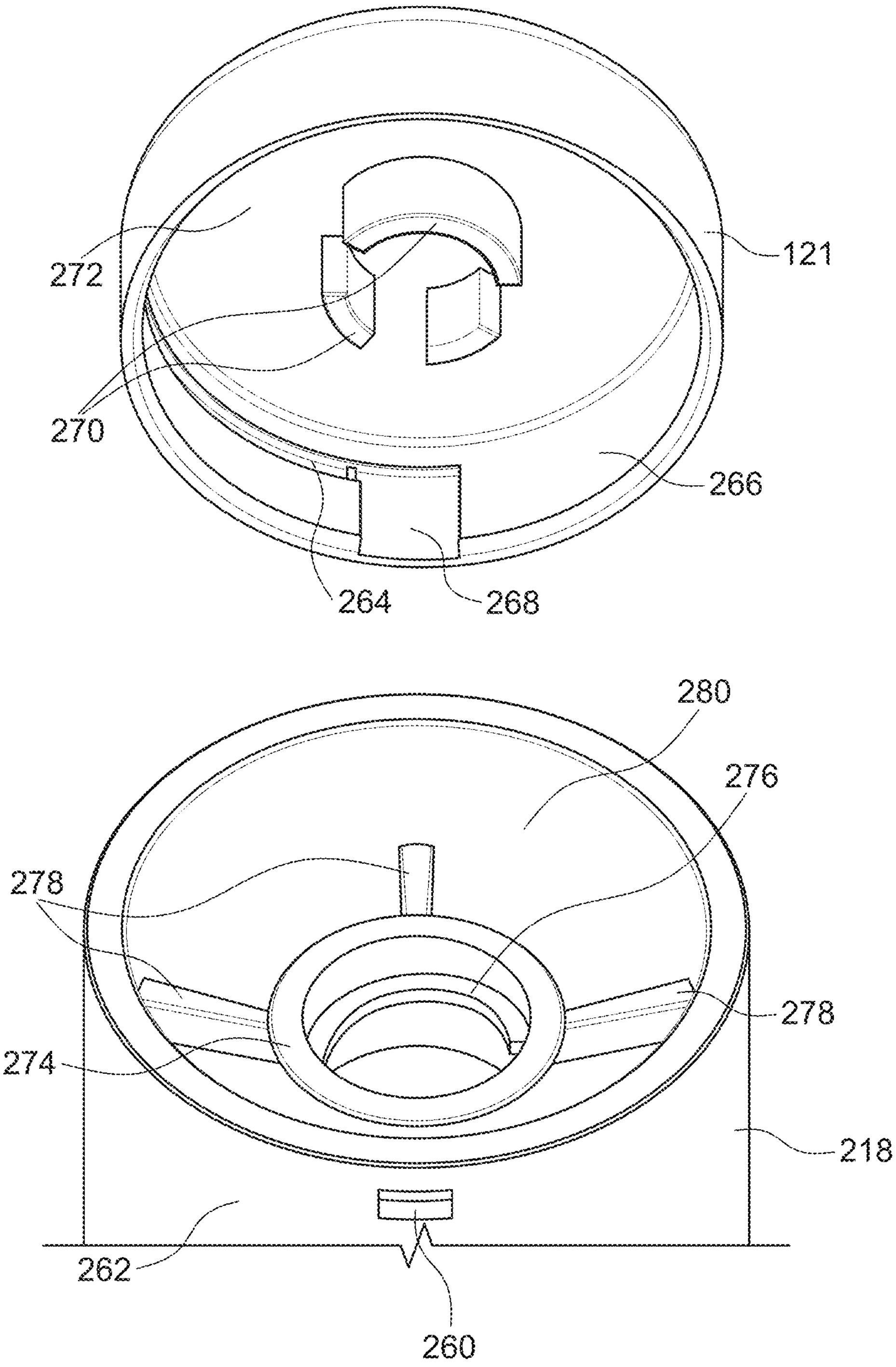
FIG. 45 illustrates an embodiment of an exploded view of the lid, the chamber and the drive mechanism including a hollow ring with internal ring threads.

FIG. 45 illustrates an embodiment of an exploded view of the lid 121, the chamber 218 and the drive mechanism including a hollow ring 274 with internal ring threads 276. The chamber 218 can include a tab 260 on an upper exterior wall 262 of the chamber, which can be inserted into and rode along an internal semi-circular track 264 present on an internal wall 266 of the lid 121. There is also a corresponding opening or slot 268 present on the internal semi-circular track 264 of the lid 121, which allows the tab 260 to engage with the track and allows the lid to act as a dial and drive the shaft upwards and downwards in the chamber. The tab 260 also locks the lid in place so that the lid cannot be removed unless aligned exactly.

The lid 121 further includes a plurality of circularly arranged posts 270 present on a top inner wall or ceiling 272 of the lid. In addition, the chamber 218 includes a hollow ring 274 with internal ring threads 276 for raising and lowering the shaft 250. The hollow ring 274 can be supported by a series of support arms 278, which connects the hollow ring 274 to the upper internal wall 280 of the chamber 218.

Figure 46:
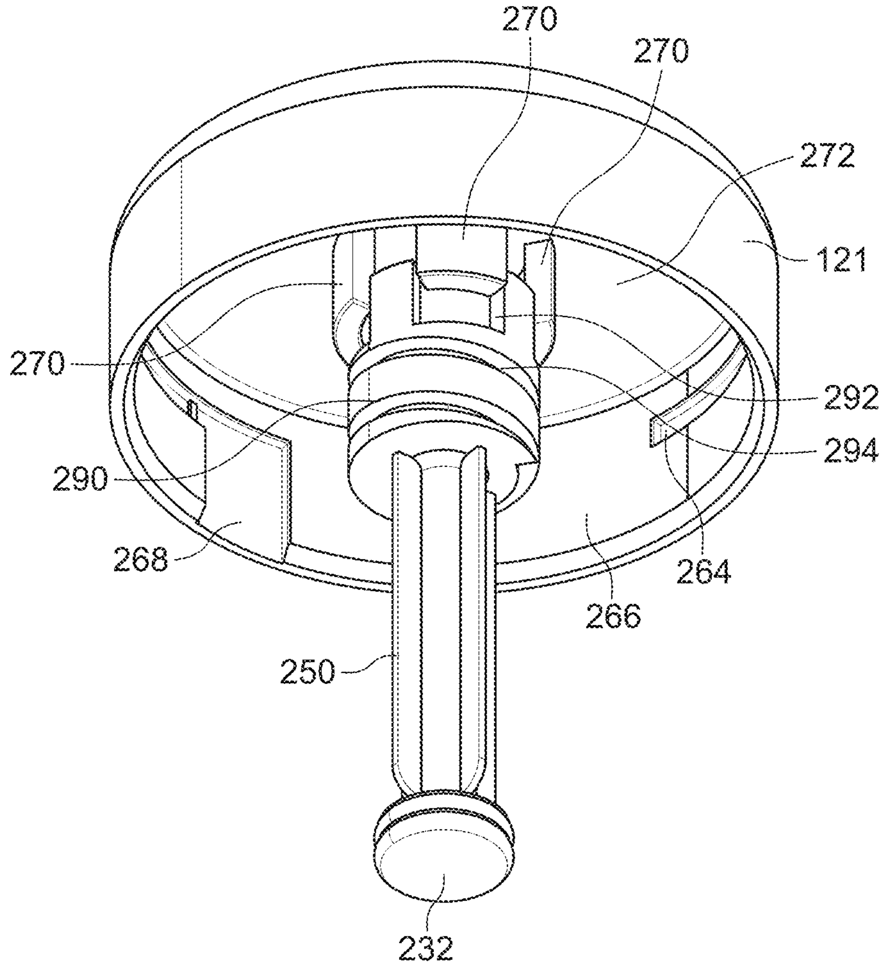
FIG. 46 illustrates an embodiment of a cut-away view of the lid, the shaft and rubber gasket.

FIG. 46 illustrates an embodiment of a cut-away view of the lid 121, shaft 250 and rubber gasket 232. As described herein, the lid 121 includes the internal semi-circular track 264 on the internal wall 266 of the lid 121, an opening or slot 268 for access to the track by the tab 260 on the chamber 218 (not shown), and a plurality of circularly arranged posts 270.

The shaft 250 includes the distal rubber gasket 232 and a proximal head unit 290 with a complimentary set of slots 292 for securing the plurality of circularly arranged posts 270 on the upper inner wall 272 of the lid 121. Also shown on the head unit 290, is a set of head unit threads 294, which are complimentary to and engage with the internal ring threads 276 on the hollow ring 274. These complimentary set of threads allow the lid to raise and lower the shaft, e.g., similar to a bolt and nut configuration.

Figure 47:
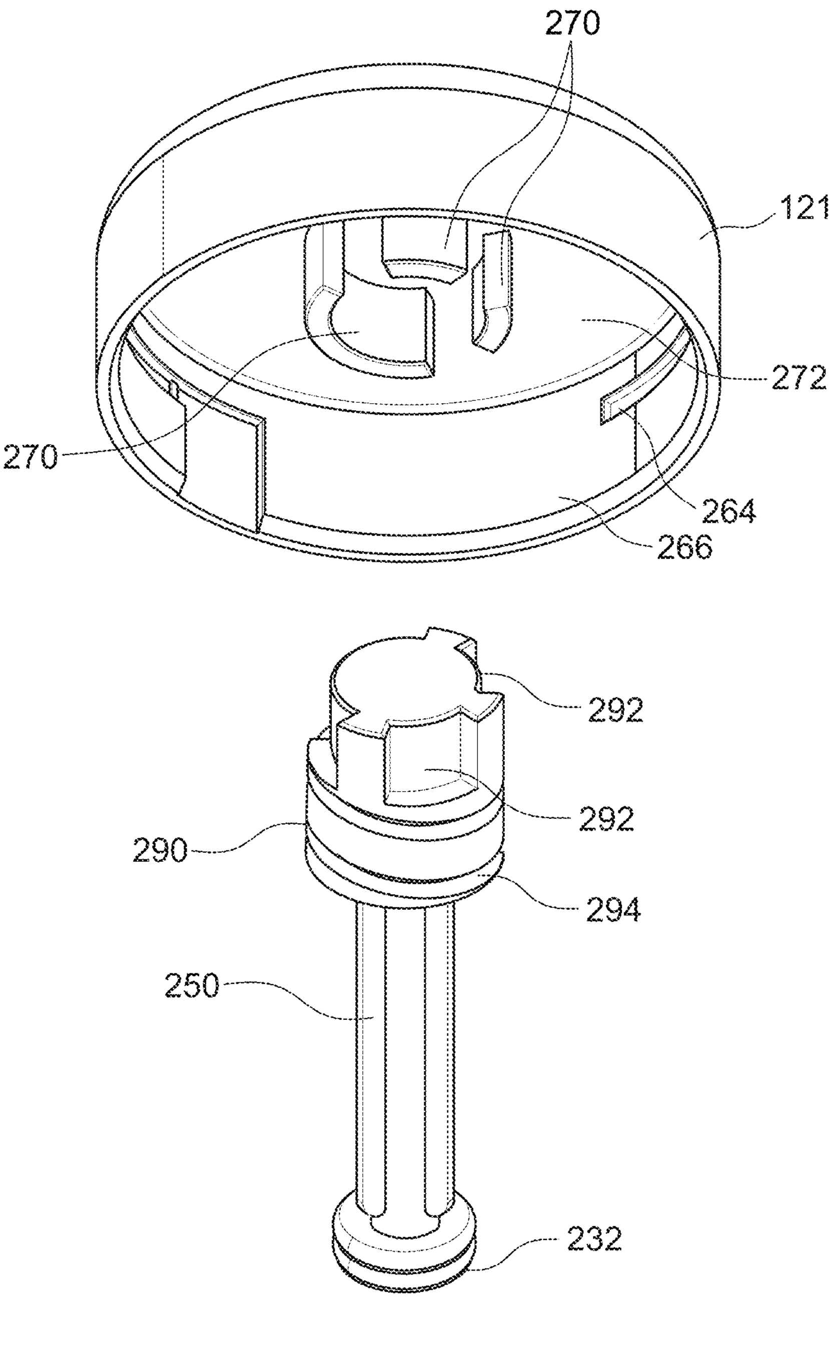
FIG. 47 illustrates an embodiment of an exploded view of the lid and shaft, showing the internal semi-circular track, the opening or slot, and the plurality of circularly arranged posts on the lid.

FIG. 47 illustrates an embodiment of an exploded view of the lid 121 and shaft 250, showing the internal semi-circular track 264, the opening or slot 268, and the plurality of circularly arranged posts 270 on the lid. Also shown is the shaft 250 with the distal rubber gasket 232, proximal head unit 290, and a complimentary set of slots 292 for securing the plurality of circularly arranged posts 270. Also shown on the head unit 290 is the set of head unit threads 294, for engaging with the internal ring threads 276 on the hollow ring 274.

Figure 48:
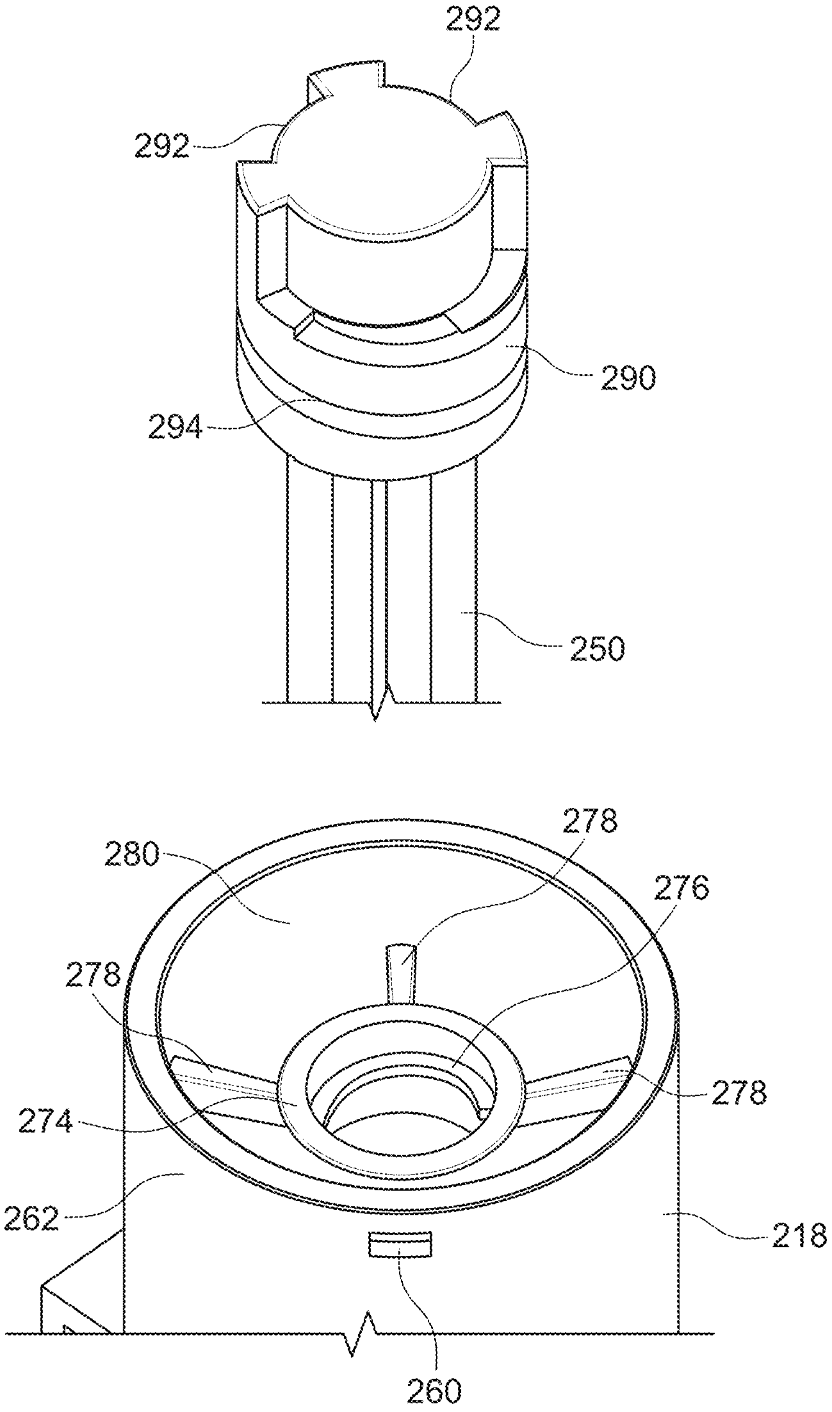
FIG. 48 illustrates an embodiment of an exploded cut-away view of the chamber and the shaft.

FIG. 48 illustrates an embodiment of an exploded cut-away view of the chamber 218 and shaft 250. The chamber 218 includes the tab 260 along its upper exterior wall 262, the hollow ring 274 with support arms 278 along the upper inner wall 280 of the chamber, in which the hollow ring includes internal ring threads 276. The shaft 250 includes the shaft head unit 290 and slots for securing the plurality of circularly arranged posts 292 on the top inner wall or ceiling 272 of the lid 121 (not shown). In addition, the shaft head unit 290 includes a set of head unit threads 294, which are complimentary to and engage with the internal ring threads 276 on the hollow ring 274.

Figure 49B:
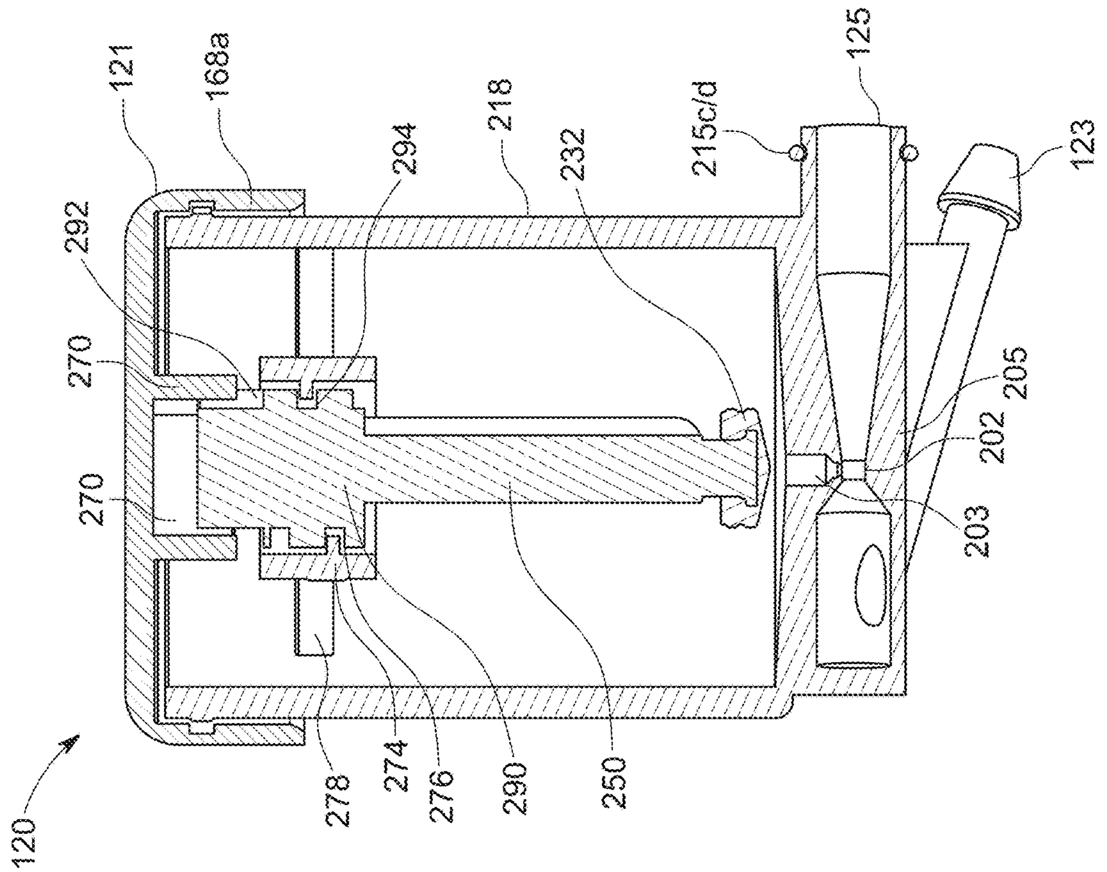
FIG. 49B illustrates an embodiment of a side cut-away view of the reservoir dispenser in an activated position.
Figure 49A:
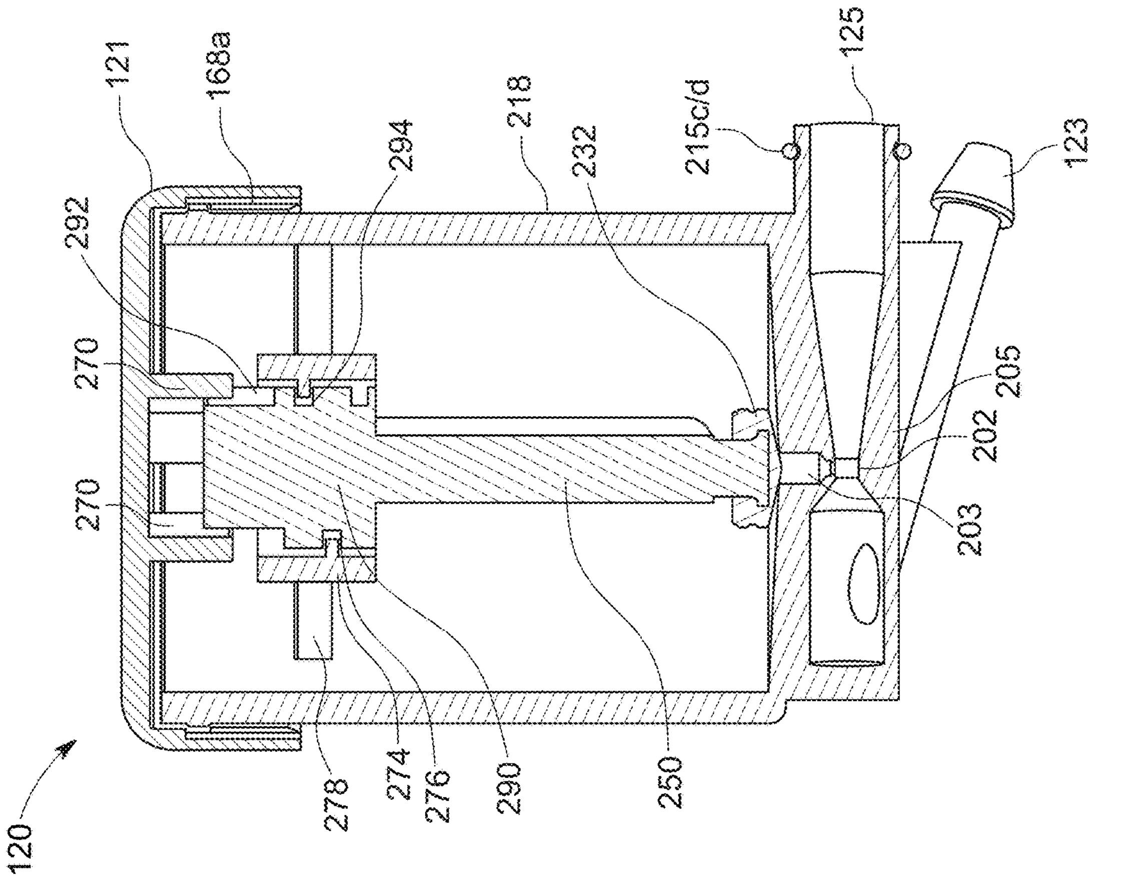
FIG. 49A illustrates an embodiment of a side cut-away view of the reservoir dispenser in an inactivated position.

FIGS. 49A and 49B illustrate an embodiment of a side cut-away view of the reservoir dispenser 120 in an inactivated and activated position, respectively. As shown in these figures, the reservoir dispenser includes the lid 121, the water inlet 123, the water outlet, 125, the securing mechanisms 126, the chamber 218, the junction 168*a*, the O-ring 169, the choke 202, the suction tube 203, the connecting tube or pipe 205, the O-rings 215*a*, 215*b*, 215*c*, and 215*d*, the shaft 250 and the rubber gasket 232.

When in an inactivated position, manually turning the lid 121 causes the tab 260 on the upper exterior wall 262 of the chamber 218 to run along the internal semi-circular track 264 of the internal wall 266 of the lid 121. This movement causes the plurality of circularly arranged posts 270 on the upper inner wall 270 of the lid 121 engaged in the slots 292 of the head unit 290 of the shaft 250 to move the head shaft threads 292 up the internal ring threads 276 of the hollow ring 274, which results in the shaft 250 being raised and the distal rubber gasket 232 on the distal end of the shaft 250 to uncover the suction tube 203, allowing the reservoir dispenser 120 to be activated and the liquid wash solution in the chamber 218 can be pulled through to the water outlet 125 by virtue of the Venturi effect.

Conversely, manually turning the lid 121 in an opposite direction, causes the tab 260 on the upper exterior wall 262 of the chamber 218 to run along the internal semi-circular track 264 of the internal wall 266 of the lid 121 in an opposite direction. This movement causes the plurality of circularly arranged posts 270 on the upper inner wall 270 of the lid 121 engaged in the slots 292 of the head unit 290 of the shaft 250 to move the head shaft threads 292 down the internal ring threads 276 of the hollow ring 274, which results in the shaft 250 being lowered and the distal rubber gasket 232 on the distal end of the shaft 250 to covers the suction tube 203, allowing the reservoir dispenser 120 to be inactivated and the liquid wash solution in the chamber 218 cannot be pulled through to the water outlet 125.

While the inventive natures have been particularly shown and described concerning preferred embodiments thereof, it will be understood by those in the art that the foregoing and other changes can be made therein without departing from the spirit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the disclosure should not be limited by any of the above-described exemplary embodiments.

What is claimed is:

1. A reservoir dispenser for a bidet washing apparatus, comprising:
- a housing unit having a chamber, wherein the chamber is capable of holding a liquid wash solution;
- a lid with one or more openings therethrough, wherein the lid is attachable to the chamber;
- an activator having a proximal knob, a stem, and a distal stem bottom end piece, wherein activator is located through one of the one or more openings in the lid; and
- a connecting tube having a water inlet, a choke region, a suction tube, and a water outlet, wherein the connecting tube is permanently or reversibly attachable to the chamber.

2. The reservoir dispenser of claim 1, wherein the knob can be manually turned to lower or raise the stem bottom end piece to cover or uncover the suction tube, respectively.

3. The reservoir dispenser of claim 2, wherein the chamber is in fluid communication with the suction tube when the knob is turned or raised; and wherein the chamber is not in fluid communication with the suction tube when the knob is turned or lowered.

4. The reservoir dispenser of claim 1, wherein the one of the one or more openings in the lid where the activator is located through includes internal threads, and the stem of the activator includes external threads.

5. The reservoir dispenser of claim 1, wherein another of the one or more openings in the lid allows for refilling the reservoir dispenser with the liquid wash solution without removing the lid from the chamber.

6. The reservoir dispenser of claim 1, wherein the connecting tube includes an attachable V-shaped pipe including the water inlet, the choke region, the suction tube, and the water outlet.

7. The reservoir dispenser of claim 1, wherein the suction tube is vertically inclined relative to the choke region.

8. The reservoir dispenser of claim 1, wherein the stem bottom end piece includes a rubber gasket.

9. The reservoir dispenser of claim 1, wherein when the knob of the activator is manually turned to raise the stem and stem bottom end piece to uncover the suction tube, water flowing through the choke region causes a reduced pressure in the choke region causing the liquid wash solution present in the chamber to be pulled into the suction tube, the choke region, and the water outlet of the connecting pipe.

10. The reservoir dispenser of claim 1, wherein when the knob of the activator is manually turned to lower the stem and stem bottom end piece to cover the suction tube, the liquid wash solution present in the chamber cannot be pulled into the suction tube, the choke region, and the water outlet of the connecting pipe.

11. A reservoir dispenser for a bidet washing apparatus, comprising:

a housing unit having a chamber, wherein the chamber is capable of holding a liquid wash solution;

a lid, wherein the lid is attachable to the chamber;

a stem having a stem head unit and a stem bottom end piece within the chamber, wherein the stem head unit is in communication with the lid;

a hollow ring attachable to an inner wall of the chamber, wherein the stem head unit is located within the hollowed ring; and a connecting tube having a water inlet, a choke region, a suction tube, and a water outlet, wherein the connecting tube is permanently or reversibly attachable to the chamber.

12. The reservoir dispenser of claim 11, wherein the hollow ring is attachable to an inner wall of the chamber through a plurality of ring support arms, or through a support mesh, or through a drain cover.

13. The reservoir dispenser of claim 11, wherein a ceiling of the lid includes a plurality of circularly arranged posts, and the stem head unit includes a plurality of circularly arranged slots, wherein the plurality of circularly arranged posts on the ceiling of the lid can be secured to the plurality of circularly arranged slots on the stem head unit.

14. The reservoir dispenser of claim 11, further comprising the lid having an internal track on an inner wall of the lid, and wherein a tab on an outer side wall of the chamber can run along the track when the lid is turned.

15. The reservoir dispenser of claim 11, wherein the hollow ring includes internal threads, and the stem head unit includes external threads.

16. The reservoir dispenser of claim 15, wherein turning the lid causes the stem and stem bottom end piece to move up or down in the chamber.

17. The reservoir dispenser of claim 11, wherein the lid can be manually turned to lower or raise the stem and stem bottom end piece to cover or uncover the suction tube, respectively.

18. The reservoir dispenser of claim 11, wherein the chamber is in fluid communication with the suction tube when the stem and stem bottom end piece are raised by turning the lid in a first direction, and wherein the chamber is not in fluid communication with the suction tube when the stem and stem bottom end piece are lowered by turning the lid in a second direction.

19. The reservoir dispenser of claim 11, wherein the connecting tube includes an attachable V-shaped pipe including the water inlet, the choke region, the suction tube, and the water outlet.

20. The reservoir dispenser of claim 11, wherein the stem bottom end piece includes a rubber gasket.

21. The reservoir dispenser of claim 11, wherein when the lid can be manually turned to raise the stem and stem bottom end piece to uncover the suction tube, and water flowing through the choke region causes a reduced pressure in the choke region causing the liquid wash solution present in the chamber to be pulled into the suction tube, the choke region, and the water outlet of the connecting pipe.

22. The reservoir dispenser of claim 11, wherein when the lid can be manually turned to lower the stem and stem bottom end piece to cover the suction tube, and the liquid wash solution present in the chamber cannot be pulled into the suction tube, the choke region, and the water outlet of the connecting pipe.

* * * * *